(12) United States Patent
Kang

(10) Patent No.: US 11,956,378 B2
(45) Date of Patent: Apr. 9, 2024

(54) ELECTRONIC DEVICE INCLUDING TORQUE STRUCTURE

(71) Applicant: SAMSUNG ELECTRONICS CO., LTD., Suwon-si (KR)

(72) Inventor: Jaeho Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 17/526,373

(22) Filed: Nov. 15, 2021

(65) Prior Publication Data

US 2022/0159109 A1 May 19, 2022

Related U.S. Application Data

(63) Continuation of application No. PCT/KR2021/015890, filed on Nov. 4, 2021.

(30) Foreign Application Priority Data

Nov. 18, 2020 (KR) .................. 10-2020-0154908

(51) Int. Cl.
*G06F 1/16* (2006.01)
*H04M 1/02* (2006.01)

(52) U.S. Cl.
CPC .......... *H04M 1/022* (2013.01); *G06F 1/1616* (2013.01); *G06F 1/1652* (2013.01); *G06F 1/1681* (2013.01); *H04M 1/0268* (2013.01)

(58) Field of Classification Search
CPC ...... H04M 1/022; H04M 1/0268; H04M 1/02; H04M 1/0216; H04M 1/0249;

(Continued)

(56) References Cited

U.S. PATENT DOCUMENTS 9,611,680 B2 4/2017 Xu
9,874,906 B1 * 1/2018 Hsu .................. G06F 1/1681
(Continued)

FOREIGN PATENT DOCUMENTS

KR 10-2019-0007788 A 1/2019
KR 10-2019-0079033 A 7/2019
(Continued)

OTHER PUBLICATIONS

International Search Report (PCT/ISA/210), dated Mar. 2, 2022 by the International Search Authority in International Application No. PCT/KR2021/015890.

(Continued)

*Primary Examiner* — Rockshana D Chowdhury
(74) *Attorney, Agent, or Firm* — Sughrue Mion, PLLC

(57) ABSTRACT

An electronic device is provided. The electronic device includes a first housing, a second housing, and a hinge structure connected to the first housing and the second housing such that the first housing rotates about a first axis of rotation parallel to a first axial direction and the second housing rotates about a second axis of rotation parallel to the first axial direction. The first housing and the second housing form an angle. The hinge structure includes a first arm shaft configured to operate based on rotation of the first housing, the first arm shaft being parallel to the first axial direction, a second arm shaft configured to operate based on rotation of the second housing, the second arm shaft being parallel to the first axial direction, and a torque structure.

24 Claims, 27 Drawing Sheets

(58) Field of Classification Search
CPC .... G06F 1/1616; G06F 1/1652; G06F 1/1681; F16C 11/04
See application file for complete search history.

(56) References Cited

U.S. PATENT DOCUMENTS

| | | | |
|---|---|---|---|
| 9,921,613 | B2 | 3/2018 | Kuramochi |
| 9,999,144 | B2 | 6/2018 | Xu |
| 10,356,919 | B2 | 7/2019 | Bi |
| 10,545,541 | B1* | 1/2020 | Dighde ............... F16M 11/38 |
| 10,677,387 | B2 | 6/2020 | Han et al. |
| 10,824,197 | B1* | 11/2020 | Hsu ...................... G06F 1/1641 |
| 10,845,850 | B1 | 11/2020 | Kang et al. |
| 10,912,213 | B2 | 2/2021 | Woo |
| 10,963,020 | B2 | 3/2021 | Kim et al. |
| 11,153,421 | B2 | 10/2021 | Kang et al. |
| 2016/0060927 | A1 | 3/2016 | Xu |
| 2016/0370829 | A1* | 12/2016 | Hsu ...................... G06F 1/1681 |
| 2017/0351303 | A1 | 12/2017 | Kuramochi |
| 2019/0090363 | A1 | 3/2019 | Bi |
| 2019/0112852 | A1* | 4/2019 | Hsu ...................... G06F 1/1618 |
| 2020/0029451 | A1* | 1/2020 | Ran ...................... H05K 5/0086 |
| 2020/0097051 | A1* | 3/2020 | Liu ...................... G06F 1/1652 |
| 2020/0225711 | A1* | 7/2020 | Pelissier ............... G06F 1/1624 |
| 2020/0233466 | A1* | 7/2020 | Sanchez ............... H05K 5/0017 |
| 2020/0264673 | A1 | 8/2020 | Kim et al. |
| 2020/0267244 | A1 | 8/2020 | Kim et al. |
| 2021/0032931 | A1* | 2/2021 | Jang ..................... E06B 9/72 |
| 2021/0041921 | A1 | 2/2021 | Kang et al. |
| 2021/0263565 | A1* | 8/2021 | Yen ....................... G06F 1/1681 |
| 2021/0373614 | A1 | 12/2021 | Kim et al. |
| 2021/0392213 | A1 | 12/2021 | Kim et al. |
| 2022/0038563 | A1 | 2/2022 | Kang et al. |
| 2022/0137675 | A1* | 5/2022 | Kuramochi ........... G06F 1/1641 |
| | | | 361/679.27 |
| 2023/0021638 | A1* | 1/2023 | Yun ....................... F16C 11/04 |
| 2023/0180409 | A1* | 6/2023 | Park ..................... G06F 1/1681 |
| | | | 361/679.01 |
| 2023/0209752 | A1* | 6/2023 | Yun ...................... G06F 1/1652 |
| | | | 361/807 |
| 2023/0213983 | A1* | 7/2023 | Yun ...................... H04M 1/022 |
| | | | 361/679.27 |

FOREIGN PATENT DOCUMENTS

| | | |
|---|---|---|
| KR | 10-2020-0045856 A | 5/2020 |
| KR | 10-2020-0052371 A | 5/2020 |
| KR | 10-2020-0101238 A | 8/2020 |
| KR | 10-2020-0101241 A | 8/2020 |
| KR | 10-2020-0101251 A | 8/2020 |
| KR | 10-2020-0117773 A | 10/2020 |
| KR | 10-2020-0127617 A | 11/2020 |
| KR | 1020200126524 A | 11/2020 |

OTHER PUBLICATIONS

Communication dated Jan. 5, 2024, issued by the European Patent Office in European Application No. 21894970.9.

* cited by examiner

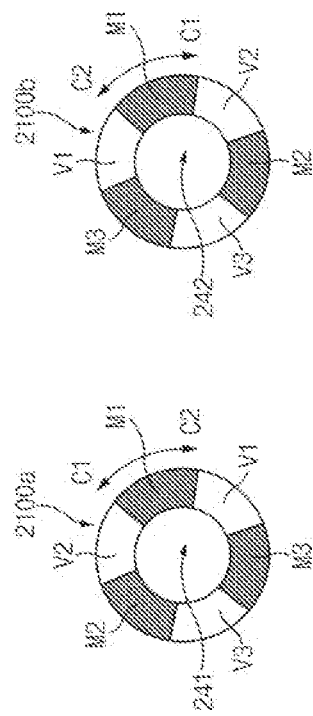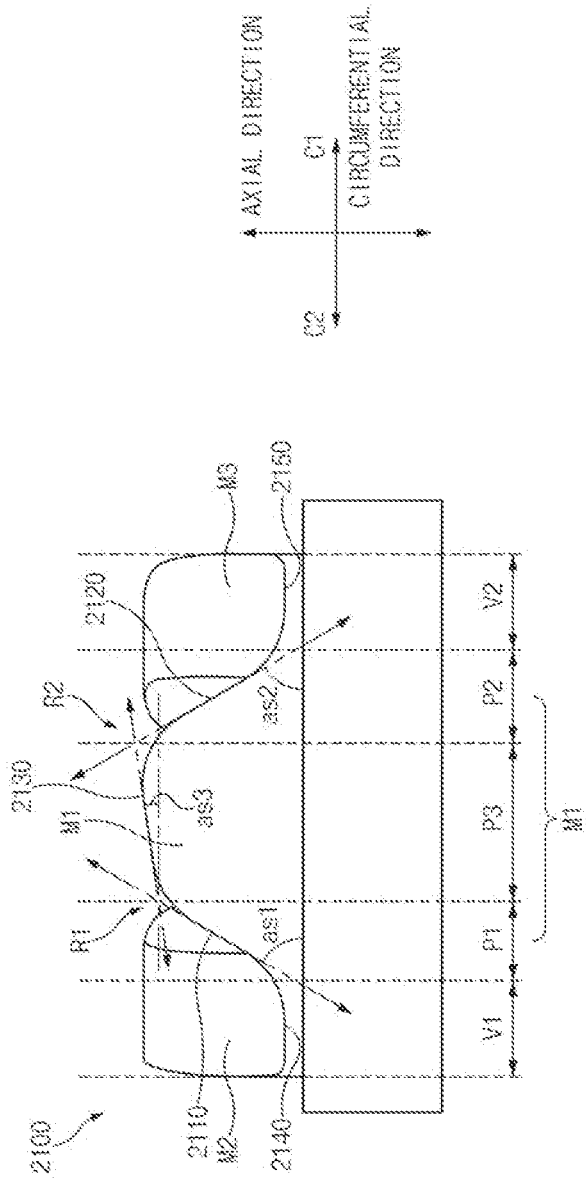
FIG. 21A
FIG. 21B

ELECTRONIC DEVICE INCLUDING TORQUE STRUCTURE

CROSS-REFERENCE TO RELATED APPLICATIONS

This application is a bypass continuation of International Application No. PCT/KR2021/015890, filed on Nov. 4, 2021 in the Korean Intellectual Property Receiving Office, which is based on and claims priority to Korean Patent Application Serial No. 10-2020-0154908, filed on Nov. 18, 2020, in the Korean Intellectual Property Office, the disclosures of which are incorporated by reference herein in their entirety.

BACKGROUND

1. Field

The disclosure relates generally to an electronic device including a torque structure.

2. Description of Related Art

A portable electronic device such as a smartphone may provide various functions, such as telephone call, video playback, Internet search, and the like, based on various types of applications. A user may want to use the aforementioned various functions through a wider screen. However, portability may be decreased with an increase in the size of the screen of the portable electronic device. Accordingly, a foldable electronic device including a flexible display, a partial area of which is deformable to be curved or flat, is being developed. The foldable electronic device may include a hinge structure to fold or unfold the flexible display.

The hinge structure of the foldable electronic device may be connected with adjacent housings such that each of the adjacent housings rotates at a predetermined angle. As the adjacent housings rotate, the flexible display may be unfolded or folded.

A curved area of the flexible display in a folded state may have a property of returning to a flat state. Due to the property, restoring torque may act on the foldable electronic device in the folded state in the unfolding directions. In this regard, the foldable electronic device may include a torque structure that provides friction torque of a predetermined magnitude to stably maintain an arbitrary folded state. In particular, as the display is made larger, the restoring torque of the display and the friction torque provided by the torque structure may increase. Due to the increased friction torque, a user has to apply greater torque to fold or unfold the foldable electronic device. For example, the user cannot unfold or fold the foldable electronic device with one hand.

SUMMARY

Embodiments of the disclosure provide a hinge structure including a torque structure for providing a section in which friction torque does not increase, when the hinge structure is unfolded from a fully folded state to a free stop section.

In accordance with an aspect of the disclosure, an electronic device may include a first housing, a second housing, and a hinge structure connected to the first housing and the second housing such that the first housing rotates about a first axis of rotation parallel to a first axial direction and the second housing rotates about a second axis of rotation parallel to the first axial direction. The first housing and the second housing may form an angle. The hinge structure may include a first arm shaft configured to operate based on rotation of the first housing, the first arm shaft being parallel to the first axial direction, a second arm shaft configured to operate based on rotation of the second housing, the second arm shaft being parallel to the first axial direction, and a torque structure. The torque structure may include first cam structures disposed on the first arm shaft, where at least one of the first cam structures linearly moves in the first axial direction along the first arm shaft, a first elastic member configured to be compressed or uncompressed by at least one of the first cam structures, second cam structures disposed on the second arm shaft, where at least one of the second cam structures linearly moves in the first axial direction along the second arm shaft, and a second elastic member configured to be compressed or uncompressed by at least one of the second cam structures. The torque structure may be configured to provide a first friction torque in a fully folded state, provide a third friction torque greater than the first friction torque in a free stop section defined between the fully folded state and a flat state, and provide a second friction torque independently of the angle in a first section defined between the fully folded state and the free stop section. The second friction torque may be greater than the first friction torque and less than the third friction torque.

In accordance with an aspect of the disclosure, an electronic device may include a first housing, a second housing, and a hinge structure connected to the first housing and the second housing such that the first housing rotates about a first axis of rotation parallel to an axial direction and the second housing rotates about a second axis of rotation parallel to the axial direction. The first housing and the second housing may form a first angle. The hinge structure may include a first arm shaft configured to operate based on rotation of the first housing, a first elastic member disposed on the first arm shaft configured to provide a first elastic force in a first extension direction of the first arm shaft, a second arm shaft configured to operate based on rotation of the second housing, a second elastic member disposed on the second arm shaft configured to provide a second elastic force in a second extension direction of the second arm shaft, a folding detent section defined from a fully folded state to a first state having a second angle, where the first elastic member and the second elastic member are compressed by a first displacement as the second angle increases in the folding detent section, an unfolding section defined from the first state to a third state having a third angle greater than the second angle, where, in the third state, the first elastic member and the second elastic member have a greater depression by a second displacement than in the first state, and a free stop section defined from the third state, where, in the free stop section, the first elastic member and the second elastic member have a greater depression by at least the second displacement than in the first state. The unfolding section may include a first section in which the first elastic member and the second elastic member remain in a constant compressed state independently of the second angle, and a second section in which the first elastic member and the second elastic member are compressed as the second angle increases.

The torque structure according to the embodiments of the disclosure may provide a section in which friction torque does not increase when the hinge structure is unfolded from the fully folded state to the free stop section. Thus, a user may fold or unfold the foldable electronic device by applying relatively small rotational torque. Furthermore, the torque structure may provide the free stop section capable of maintaining folded states at various angles.

In addition, the disclosure may provide various effects that are directly or indirectly recognized.

BRIEF DESCRIPTION OF THE DRAWINGS

FIGS. 21A and 21B are views illustrating another example of cams of a hinge structure according to an embodiment.

DETAILED DESCRIPTION

Figure 1:
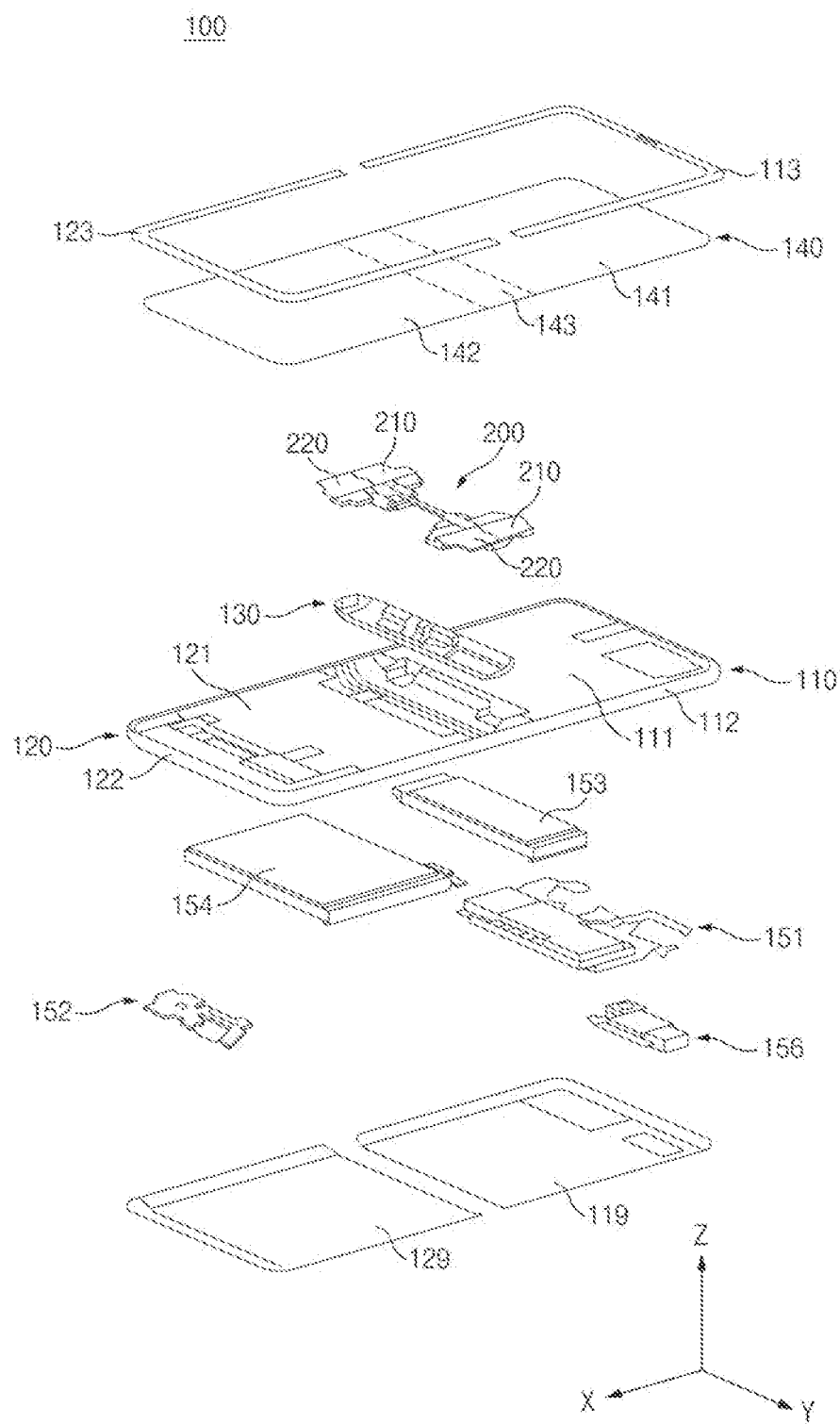
FIG. 1 is an exploded perspective view of an electronic device according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

In the following description made with respect to the accompanying drawings, similar components will be assigned with similar reference numerals.

FIG. 1 is an exploded perspective view of an electronic device according to an embodiment.

Referring to FIG. 1, the electronic device 100 may include a first housing 110, a second housing 120, a hinge housing 130, a hinge structure 200, and a display 140.

In an embodiment, the first housing 110 may be connected with the second housing 120 through the hinge structure 200. The first housing 110 may include a first plate 111 on which the display 140 is seated and a first frame 112 surrounding at least part of the first plate 111. For example, the first frame 112 may form a part of surfaces (e.g., side surfaces) of the electronic device 100. For example, at least a portion of a first area 141 of the display 140 and at least a portion of a folding area 143 of the display 140 may be disposed on the first plate 111. First rotary structures 210 of the hinge structure 200 may be connected to the first plate 111. In an embodiment, at least part of the first housing 110 may be attached to the first area 141 of the display 140. Alternatively, part of the periphery of the front surface of the first housing 110 may be attached to the periphery of the first area 141 of the display 140. In this regard, an adhesive layer may be disposed between the first plate 111 of the first housing 110 and the first area 141 of the display 140.

In an embodiment, at least part of the inside of the first housing 110 may be provided in a hollow form. A first circuit board 151, a first battery 153, and a camera module 156 may be disposed in the first housing 110. The first circuit board 151 and the first battery 153 may be electrically connected with a second circuit board 152 and a second battery 154 disposed in the second housing 120 through a flexible circuit board. For example, a processor and a memory may be disposed on the first circuit board 151. For example, the first battery 153 and the first circuit board 151 may be disposed on the first plate 111. In an embodiment, for example, at least part of the first housing 110 may be formed of a metallic material, or at least part of the first housing 110 may be formed of a non-metallic material. To support at least part of the display 140, the first housing 110 may be formed of a material having a predetermined rigidity. In an embodiment, the portion of the first housing 110 that faces the second housing 120 may include a depression, at least part of which has a predetermined curvature such that the hinge housing 130 is disposed therein.

In various embodiments, the first housing 110 may include a first decorative member 113 surrounding the periphery of the display 140 and a first back cover 119 facing the first plate 111 and forming a surface of the electronic device 100. For example, the first decorative member 113 may be disposed to cover the peripheral portion of the first area 141 of the display 140 and the periphery of part of the folding area 143. For example, in a flat state (e.g., FIG. 2A), the first back cover 119 may form the rear surface of the electronic device 100, and the display 140 may form the front surface of the electronic device 100.

In an embodiment, the second housing 120 may be connected with the first housing 110 through the hinge structure 200. The second housing 120 may include a second plate 121 on which the display 140 is seated and a second frame 122 surrounding at least part of the second plate 121. For example, the second frame 122 may form a part of the surfaces (e.g., the side surfaces) of the electronic device 100. For example, at least a portion of a second area 142 of the display 140 and at least part of the folding area 143 of the display 140 may be disposed on the second plate 121. Second rotary structures 220 of the hinge structure 200 may be connected to the second plate 121. In an embodiment, at least part of the second housing 120 may be attached to the second area 142 of the display 140. Alternatively, part of the periphery of the front surface of the second housing 120 may be attached to the periphery of the second area 142 of the display 140. In this regard, an adhesive layer may be disposed between the second plate 121 of the second housing 120 and the second area 142 of the display 140.

In an embodiment, at least part of the inside of the second housing 120 may be provided in a hollow form. The second circuit board 152 and the second battery 154 may be disposed in the second housing 120. The second circuit board 152 and the second battery 154 may be electrically connected with the first circuit board 151 and/or the first battery 153 disposed in the first housing 110 through the flexible circuit board. For example, the second battery 154 and the second circuit board 152 may be disposed on the second plate 121. In an embodiment, for example, at least part of the second housing 120 may be formed of a metallic material, or at least part of the second housing 120 may be formed of a non-metallic material. To support at least part of the display 140, the second housing 120 may be formed of a material having a predetermined rigidity. In an embodiment, the portion of the second housing 120 that faces the first housing 110 may include a depression, at least part of which has a predetermined curvature such that the hinge housing 130 is disposed therein.

In various embodiments, the second housing 120 may include a second decorative member 123 surrounding the periphery of the display 140 and a second back cover 129 facing the second plate 121 and forming a surface of the electronic device 100. For example, the second decorative member 123 may be disposed to cover the peripheral portion of the second area 142 of the display 140 and the periphery of part of the folding area 143. For example, in the flat state (e.g., FIG. 2A), the second back cover 129 may form the rear surface of the electronic device 100, and the display 140 may form the front surface of the electronic device 100.

In various embodiments, the electronic device 100 may further include a lattice structure and/or a bracket disposed between the display 140 and the adhesive layers. The lattice structure may include a slit area including a plurality of slits at least partially overlapping the folding area 143. The plurality of slits may extend in the extension direction (e.g., the Y-axis direction) of the folding area 143. The plurality of slits may support the folding area 143 that is flat in the flat state (e.g., FIG. 2A) and may support deformation of the folding area 143 in a folding or unfolding motion. In various embodiments, only part of the lattice structure or the bracket may be stacked on the display 140.

In an embodiment, the hinge housing 130 may be disposed in the depressions of the first housing 110 and the second housing 120. The hinge housing 130 may have a form extending in the Y-axis direction as a whole. Bosses for fixing the hinge structure 200 may be disposed on partial areas of the inside surface of the hinge housing 130.

In an embodiment, at least part of the display 140 may have flexibility. For example, the display 140 may include the first area 141 disposed on the first housing 110, the second area 142 disposed on the second housing 120, and the folding area 143 located between the first area 141 and the second area 142. In an embodiment, the first area 141 and the second area 142 may be formed to be flat, and the folding area 143 may be deformable to be flat or curved.

According to various embodiments, the hinge structure 200 may include the first rotary structures 210 connected to the first housing 110 and the second rotary structures 220 connected to the second housing 120. The hinge structure 200 may be configured such that the first rotary structures 210 and the second rotary structures 220 are rotatable about axes of rotation thereof (e.g., virtual axes parallel to the Y-axis direction). For example, when the first housing 110 and the second housing 120 are folded or unfolded, the first rotary structures 210 and the second rotary structures 220 may rotate about the axes of rotation thereof.

Figure 2A:
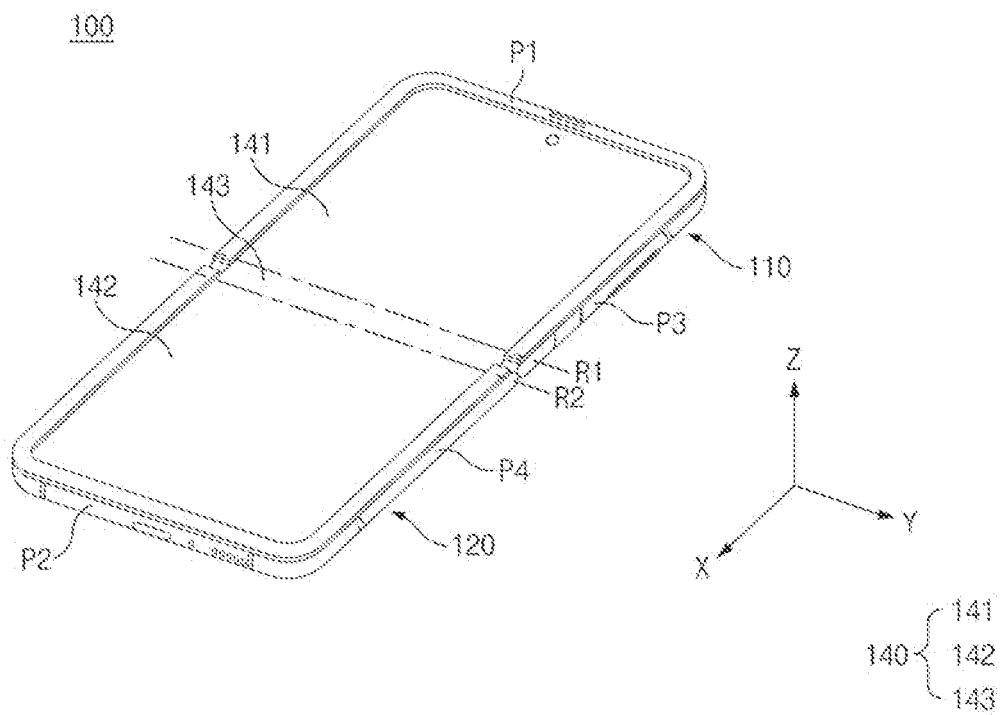
FIG. 2A is a view illustrating a flat state of an electronic device according to an embodiment.
Figure 2A:
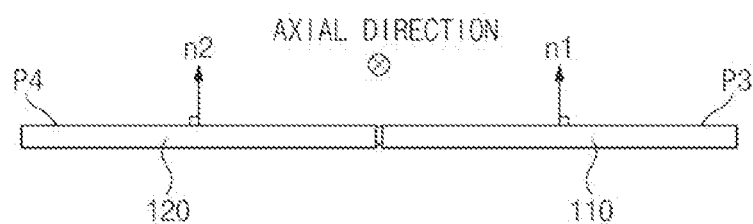
Figure 2B:
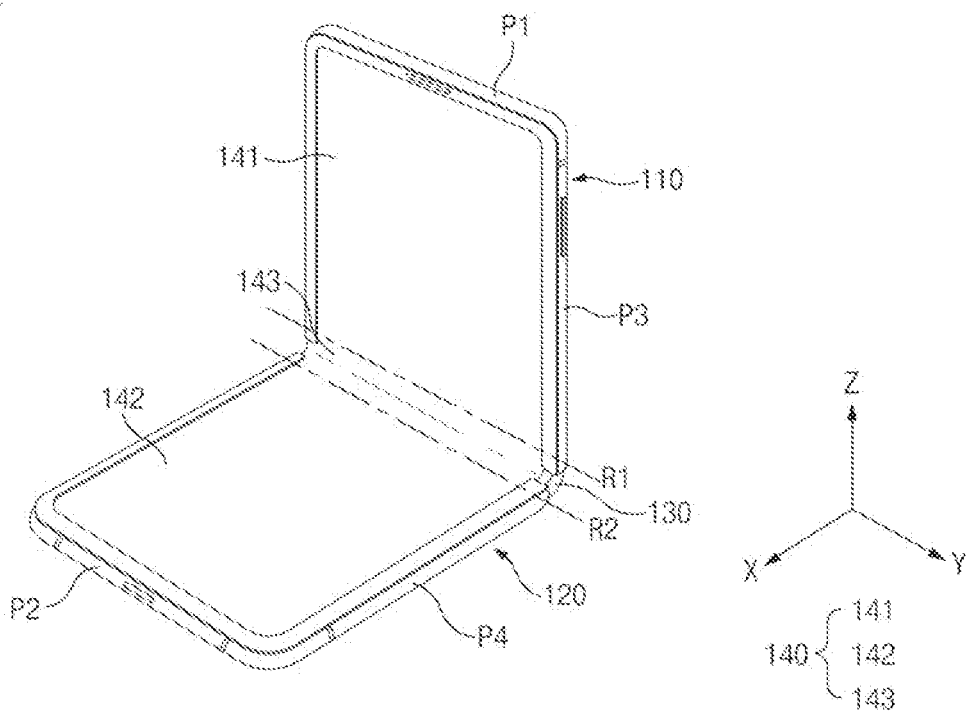
FIG. 2B is a view illustrating a folded state of an electronic device according to an embodiment.
Figure 2B:
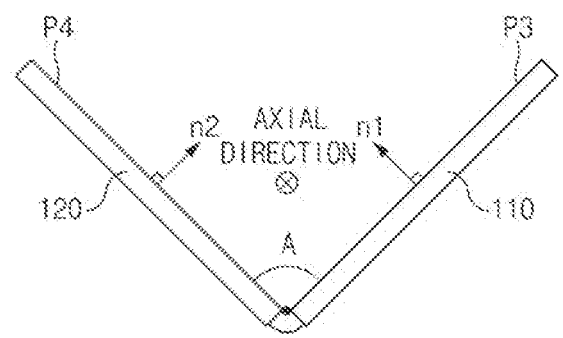
Figure 2C:
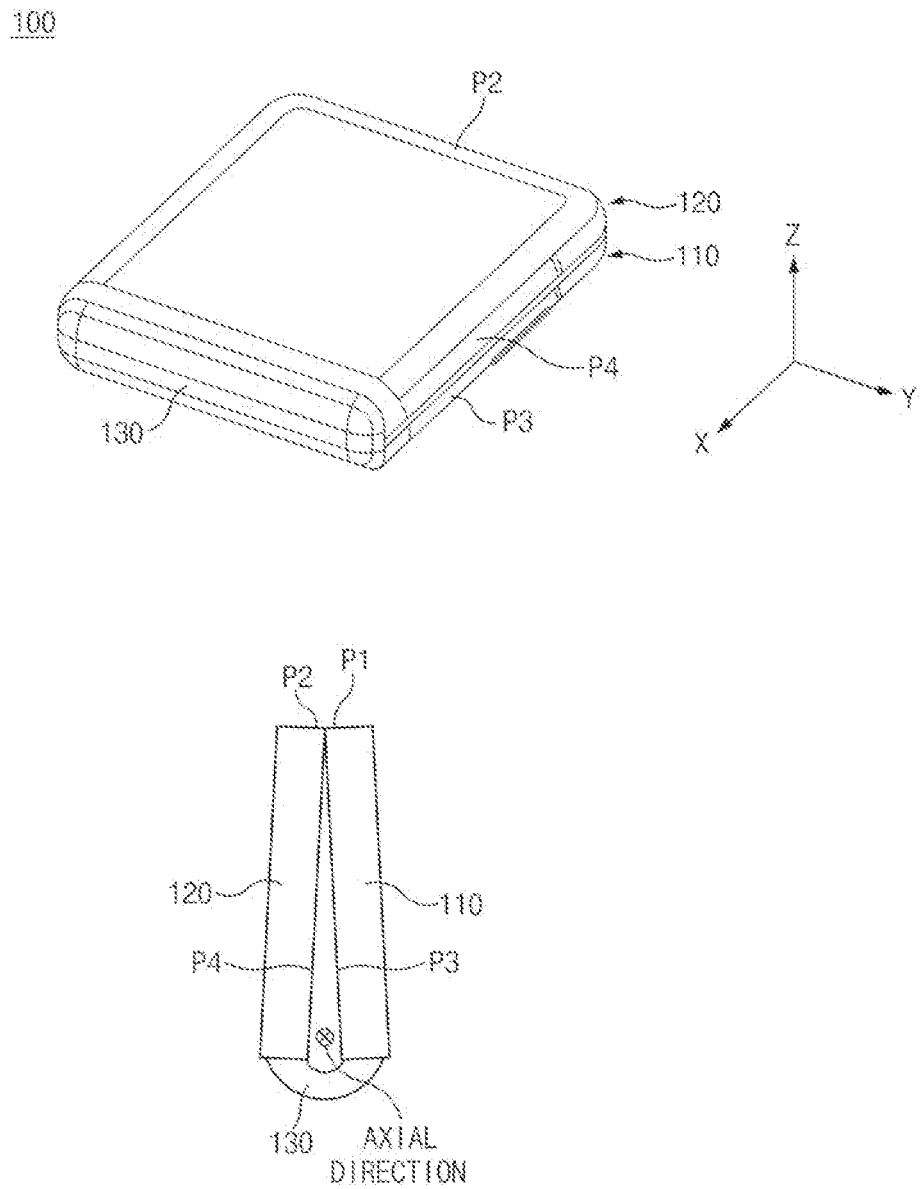
FIG. 2C is a view illustrating a fully folded state of an electronic device according to an embodiment.

FIG. 2A is a view illustrating a flat state of an electronic device according to an embodiment. FIG. 2B is a view illustrating a folded state of an electronic device according to an embodiment. FIG. 2C is a view illustrating a fully folded state of an electronic device according to an embodiment.

In an embodiment, the first housing 110 and the second housing 120 may rotate about axes of rotation R1 and R2 in opposite directions, respectively. For example, in a folding motion performed in the flat state, the first housing 110 may rotate in the counterclockwise direction, and the second housing 120 may rotate in the clockwise direction.

In an embodiment, an axial direction parallel to the axes of rotation R1 and R2 of the first housing 110 and the second housing 120 may be defined. The axial direction may be defined as the extension direction of the folding area 143 of the display 140. For example, the axial direction may be defined as the direction of the long sides of the folding area 143. For example, the axial direction may refer to the direction parallel to the Y-axis of FIG. 1.

A state of the electronic device 100 according to an embodiment of the disclosure in which a first edge P1 of the electronic device 100 and a second edge P2 of the electronic device 100 that are parallel to the axial direction may be defined. A state of the electronic device 100 according to an embodiment of the disclosure in which a third edge P3 of the electronic device 100 and a fourth edge P4 of the electronic device 100 that are perpendicular to the axial direction may be defined. For example, the first edge P1 and the third edge P3 may include part of the first frame 112 of the first housing 110. For example, the second edge P2 and the fourth edge P4 may include part of the second frame 122 of the second housing 120.

The flat state of the electronic device 100 will be described below with reference to FIG. 2A.

For example, the flat state may include the state in which the folding area 143 of the display 140 is flat. For example, the flat state may include the state in which the first area 141 and the second area 142 of the display 140 are flat to face the same direction. For example, the flat state may include the state in which a first normal vector n1 of the first area 141 and a second normal vector n2 of the second area 142 of the display 140 are parallel to each other. For example, the flat state may include the state in which the third edge P3 and the fourth edge P4 form substantially one straight line. For example, the flat state may include the state in which the third edge P3 and the fourth edge P4 form an angle of 180 degrees.

The folded state of the electronic device 100 will be described below with reference to FIG. 2B.

For example, the folded state may include the state in which the folding area 143 of the display 140 is curved. For example, the folded state may include the state in which the first normal vector n1 of the first area 141 and the second normal vector n2 of the second area 142 of the display 140 form a certain angle rather than 180 degrees. For example, the folded state may include the state in which the third edge P3 and the fourth edge P4 form a certain angle rather than 180 degrees.

The fully folded state of the electronic device 100 will be described below with reference to FIG. 2C.

For example, the fully folded state may refer to the state in which the first edge P1 and the second edge P2 substantially make contact with each other, among folded states. For example, the folding area 143 in the fully folded state may be curved with a curvature greater than that of the folding area 143 in the folded state.

Referring to FIGS. 2B and 2C, in the folded state and the fully folded state, at least part of the hinge housing 130 may form a surface of the electronic device 100. For example, the hinge housing 130 may be visually exposed between the first housing 110 and the second housing 120.

Figure 3:
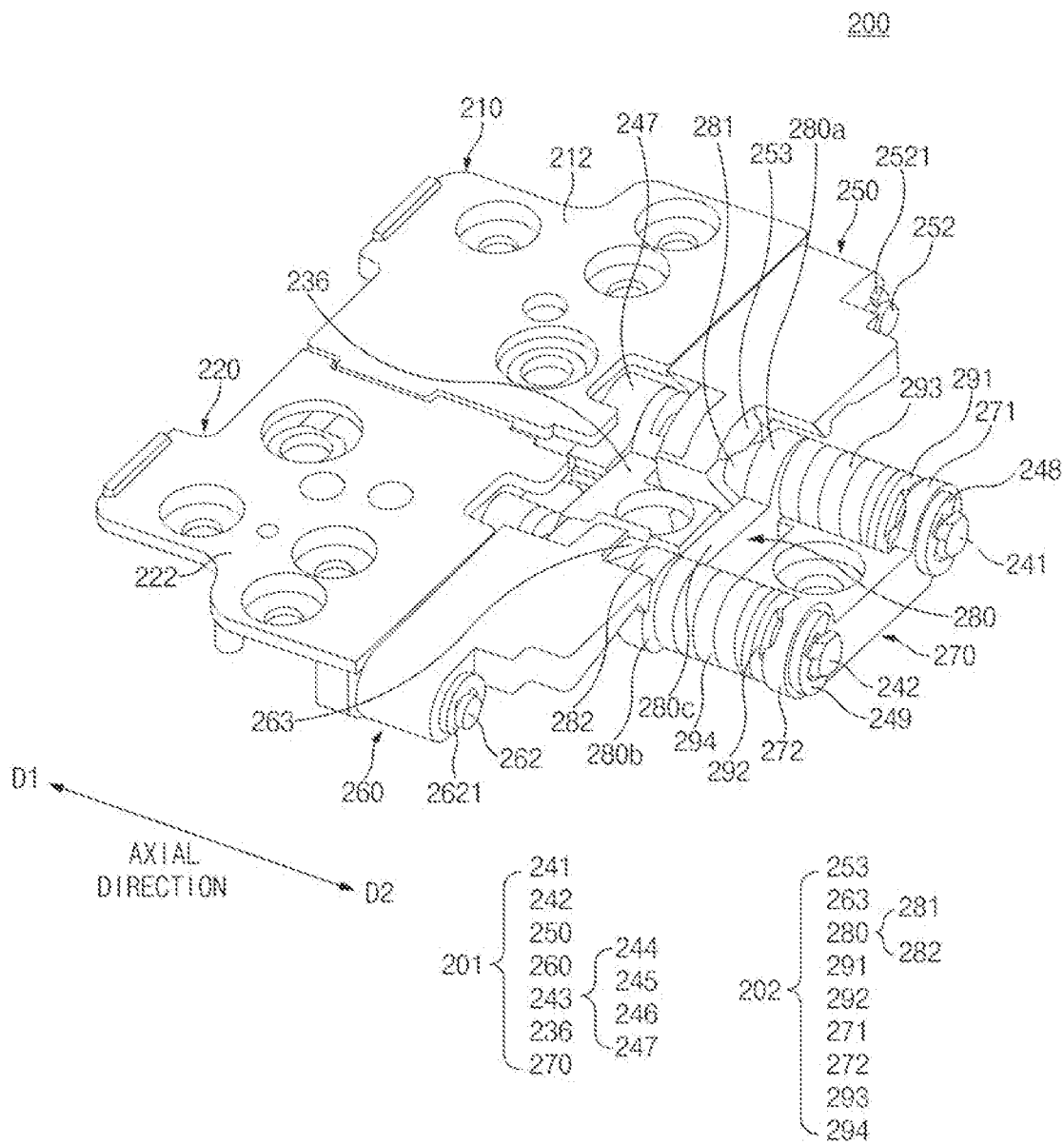
FIG. 3 is a perspective view illustrating a hinge structure according to an embodiment.
Figure 4A:
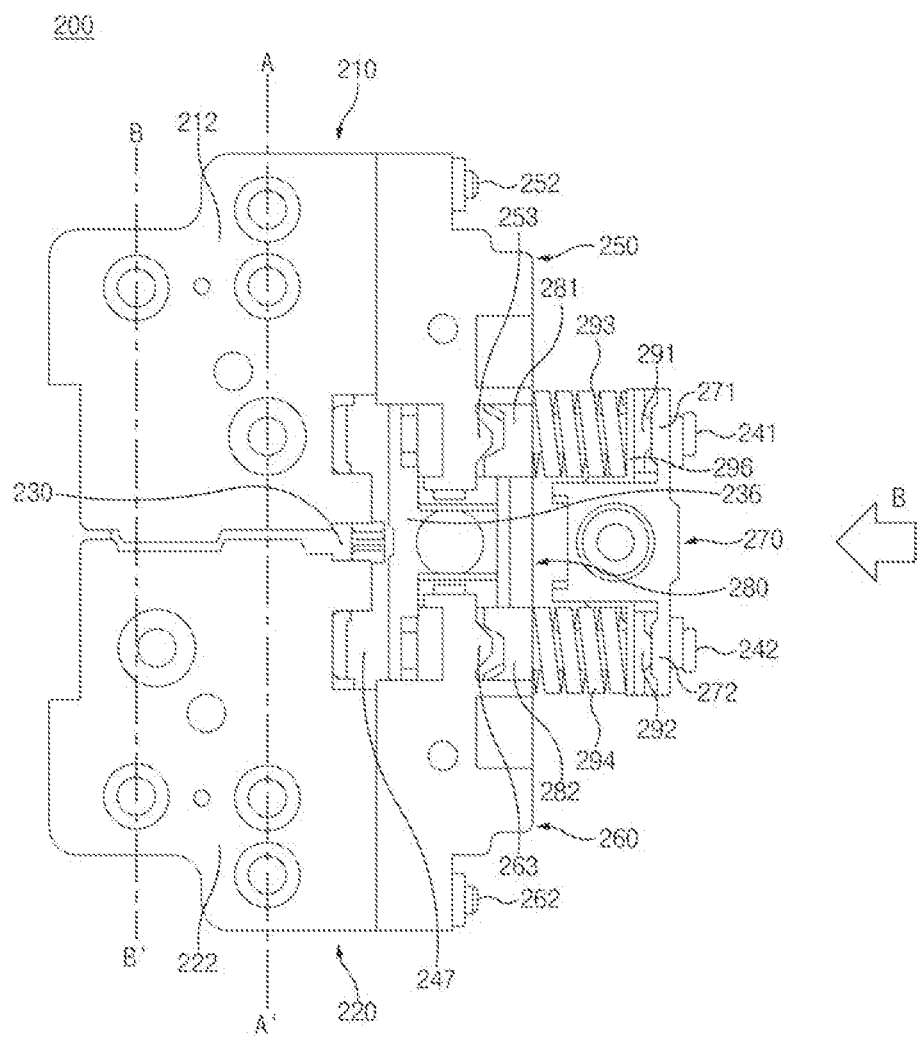
FIG. 4A is a view of a hinge structure according to an embodiment.
Figure 4B:
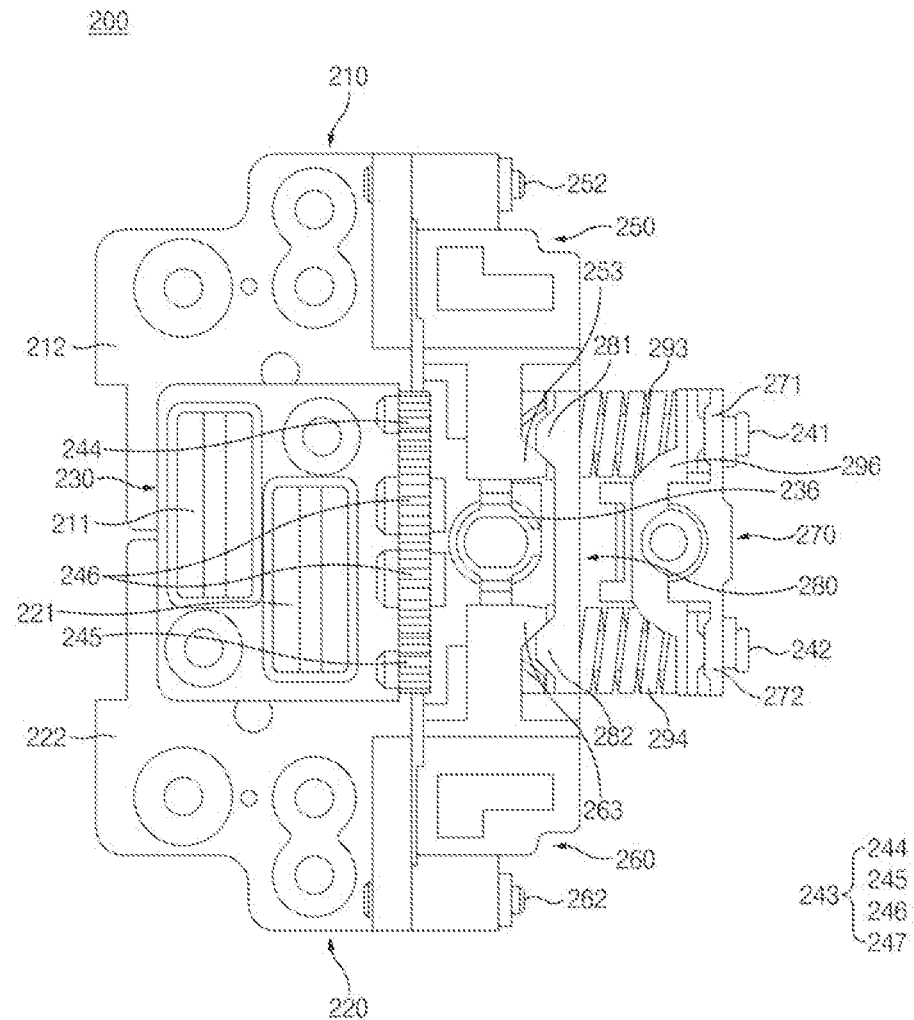
FIG. 4B is a rear view of a hinge structure according to an embodiment.
Figure 5:
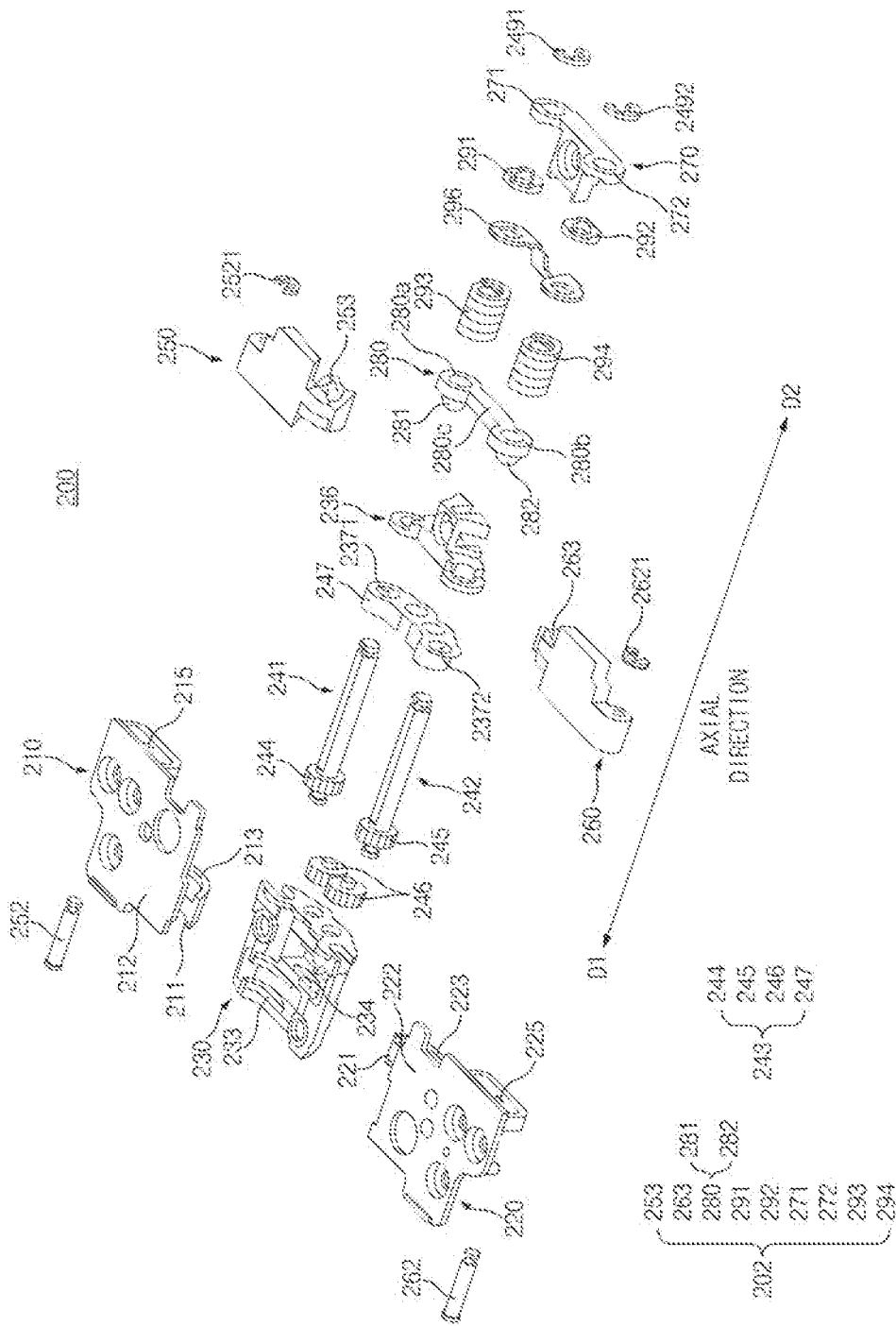
FIG. 5 is an exploded perspective view of a hinge structure according to an embodiment.

FIG. 3 is a perspective view illustrating a hinge structure according to an embodiment. FIG. 4A is a view of a hinge structure according to an embodiment. FIG. 4B is a rear view of a hinge structure according to an embodiment. FIG. 5 is an exploded perspective view of a hinge structure according to an embodiment.

Axial directions may be defined in the hinge structure 200. The axial directions may be directions parallel to the extension direction of the first axis of rotation R1 and the second axis of rotation R2. A first axial direction D1 may be a direction toward a fixed structure 230, and a second axial direction D2 may be a direction toward a fixed member 270.

Referring to FIGS. 3, 4A, 4B and 5, in an embodiment, the hinge structure 200 may include the fixed structure 230, the first rotary structure 210, the second rotary structure 220, an arm structure 201, and a torque structure 202.

In an embodiment, at least part of the fixed structure 230 may be fixedly disposed in a hinge housing (e.g., the hinge housing 130 of FIG. 1). The first rotary structure 210 and the second rotary structure 220 may be coupled to the fixed structure 230 so as to be rotatable.

In an embodiment, the fixed structure 230 may include a first guide rail 233 for guiding a rotational path of the first rotary structure 210. In an embodiment, a first guide portion 213 of the first rotary structure 210 may be accommodated in the first guide rail 233.

In an embodiment, the fixed structure 230 may include a second guide rail 234 for guiding a rotational path of the second rotary structure 220. In an embodiment, a second guide portion 223 of the second rotary structure 220 may be accommodated in the second guide rail 234.

In an embodiment, the first rotary structure 210 may rotate along a predetermined path relative to the fixed structure 230, which is fixedly disposed in the hinge housing (e.g., the hinge housing 130 of FIG. 1), when a first housing (e.g., the first housing 110 of FIG. 1) is folded or unfolded. In an embodiment, the first rotary structure 210 may include a first coupling portion 211 rotatably coupled to the fixed structure 230 and a first extending portion 212 connected to the first housing 110. The first extending portion 212 may rotate about the first axis of rotation R1 together with the first housing 110 when the electronic device 100 is folded or unfolded. In an embodiment, the first rotary structure 210 may include the first guide portion 213 formed on the first coupling portion 211. The first guide portion 213, together with the first guide rail 233, may guide the rotational path of the first rotary structure 210. In an embodiment, the first guide portion 213 may protrude from the first coupling portion 211 in the second axial direction D2. For example, at least part of the first guide portion 213 may be accommodated in the first guide rail 233.

In an embodiment, the second rotary structure 220 may rotate along a predetermined path relative to the fixed structure 230, which is fixedly disposed in the hinge housing (e.g., the hinge housing 130 of FIG. 1), when a second housing (e.g., the second housing 120 of FIG. 1) is folded or unfolded. In an embodiment, the second rotary structure 220 may include a second coupling portion 221 rotatably coupled to the fixed structure 230 and a second extending portion 222 connected to the second housing 120. The second extending portion 222 may rotate about the second axis of rotation R2 together with the second housing 120 when the electronic device 100 is folded or unfolded. In an embodiment, the second rotary structure 220 may include the second guide portion 223 formed on the second coupling portion 221. The second guide portion 223, together with the second guide rail 234, may guide the rotational path of the second rotary structure 220. In an embodiment, the second guide portion 223 may protrude from the second coupling portion 221 in the second axial direction D2. For example, at least part of the second guide portion 223 may be accommodated in the second guide rail 234.

In an embodiment, the arm structure 201 may include a first arm shaft 241, a second arm shaft 242, a first arm 250, a second arm 260, a gear structure 243, the fixed member 270, and a stopper 236.

In an embodiment, the gear structure 243 may include a first gear 244 formed on the outer circumferential surface of the first arm shaft 241, a second gear 245 formed on the outer circumferential surface of the second arm shaft 242, and a connecting gear 246 connecting the first gear 244 and the second gear 245. The first arm shaft 241 and the second arm shaft 242 may be fastened with each other through the gear structure 243 to rotate in opposite directions by the same angle. For example, the connecting gear 246 may include an even number of gears. The gear structure 243 may further include a gear cover 247. The gear cover 247 may be formed to cover the first gear 244, the second gear 245, and the connecting gear 246. The gear cover 247 may have a plurality of through-holes formed therein through which the first arm shaft 241 and the second arm shaft 242 pass.

In an embodiment, the stopper 236 may be fixedly disposed in the hinge housing (e.g., the hinge housing 130 of FIG. 1). The stopper 236 may limit the range of rotation of the first arm 250 and the second arm 260. For example, the stopper 236 may be located between the first arm 250 and the second arm 260.

In an embodiment, the fixed member 270 may be fixedly disposed in the hinge housing (e.g., the hinge housing 130 of FIG. 1). The fixed member 270 may be located on end portions of the first arm shaft 241 and the second arm shaft 242 that face the second axial direction D2. The fixed member 270, together with the fixed structure 230, may support rotation of the first arm shaft 241 and the second arm shaft 242. The fixed member 270 may axially support a first elastic member 293 and a second elastic member 294. For example, the first arm shaft 241 and the second arm shaft 242 may pass through the fixed member 270.

In an embodiment, the first arm 250 may be coupled to the first arm shaft 241 so as to rotate about the first arm shaft 241. In an embodiment, the first arm 250 may be coupled to the first arm shaft 241 so as to slide relative to the first rotary structure 210. For example, the first arm 250 may include a first sliding pin 252 coupled to the first rotary structure 210. At least part of the first sliding pin 252 may be accommodated in a first sliding groove 215 of the first rotary structure 210. In an embodiment, the first sliding pin 252 may pass through a portion of the first arm 250. For example, a fixing ring 2521 may be coupled to an end portion of the first sliding pin 252. In an embodiment, when the first rotary structure 210 rotates about the first axis of rotation R1, the first arm 250 may rotate about the first arm shaft 241 while sliding relative to the first rotary structure 210. For example, the first arm 250 may slide in the state in which the first sliding pin 252 is accommodated in the first rotary structure 210.

In an embodiment, the first arm shaft 241 may be coupled to the fixed structure 230 so as to be rotatable. For example, an end portion of the first arm shaft 241 that faces the first axial direction D1 may be rotatably inserted into a recess or opening 2371 formed in the fixed structure 230. A first fixing ring 2491 may be coupled to an end portion of the first arm shaft 241 that faces the second axial direction D2. The first fixing ring 2491 may prevent separation of the first arm shaft 241 from the fixed member 270. In an embodiment, when viewed in the second axial direction D2, the fixed structure 230, the gear cover 247, the stopper 236, the first arm 250, a cam member 280, the first elastic member 293, a first moving cam 291, the fixed member 270, and the first fixing ring 2491 may be coupled to the first arm shaft 241.

In an embodiment, the second arm 260 may be coupled to the second arm shaft 242 so as to rotate about the second arm shaft 242. In an embodiment, the second arm 260 may be coupled to the second arm shaft 242 so as to slide relative to the second rotary structure 220. For example, the second arm 260 may include a second sliding pin 262 coupled to the second rotary structure 220. At least part of the second sliding pin 262 may be accommodated in a second sliding groove 225 of the second rotary structure 220. In an embodiment, the second sliding pin 262 may pass through a portion of the second arm 260. For example, a fixing ring 2621 may be coupled to an end portion of the second sliding pin 262. In an embodiment, when the second rotary structure 220 rotates about the second axis of rotation R2, the second arm 260 may rotate about the second arm shaft 242 while sliding relative to the second rotary structure 220. For example, the second arm 260 may slide in the state in which the second sliding pin 262 is accommodated in the second rotary structure 220.

In an embodiment, the second arm shaft 242 may be coupled to the fixed structure 230 so as to be rotatable. For example, an end portion of the second arm shaft 242 that faces the first axial direction D1 may be rotatably inserted into a recess or opening 2372 formed in the fixed structure 230. A second fixing ring 2492 may be coupled to an end portion of the second arm shaft 242 that faces the second axial direction D2. The second fixing ring 2492 may prevent separation of the second arm shaft 242 from the fixed member 270. In an embodiment, when viewed in the second axial direction D2, the fixed structure 230, the gear cover 247, the stopper 236, the second arm 260, the cam member 280, the second elastic member 294, a second moving cam 292, the fixed member 270, and the second fixing ring 2492 may be coupled to the second arm shaft 242.

In an embodiment, the torque structure 202 (e.g., a structure for providing torque) may provide, to the first arm shaft 241 and the second arm shaft 242, friction torques acting about the first arm shaft 241 and the second arm shaft 242. For example, the torque structure 202 may provide friction torques corresponding to restoring torque of the display 140. For example, in a folded state (e.g., FIGS. 2B and 2C) in which a partial area of the display 140 is curved, the restoring torque of the display 140 may act on the first rotary structure 210 and the second rotary structure 220. For example, the restoring torque of the display 140 may be torque that acts on the first arm shaft 241 and the second arm shaft 242 by a restoring force to return the display 140 to a flat state. For example, the restoring torque of the display 140 may be proportional to the size of the display 140. Accordingly, the torque structure 202 of the hinge structure 200 according to an embodiment may provide toque capable of cancelling out the restoring torque of the display 140.

In an embodiment, the torque structure 202 may include a first arm cam 253, a second arm cam 263, the cam member 280, the first moving cam 291, the second moving cam 292, a first fixed cam 271, a second fixed cam 272, the first elastic member 293, and the second elastic member 294.

In an embodiment, the torque structure 202 may include first cam structures coupled to and/or disposed on the first arm shaft 241 to provide friction torque to the first arm shaft 241, and the first elastic member 293 compressed or uncompressed by at least some of the first cam structures. For example, the first cam structures may include the first arm cam 263, a first cam 281 (e.g., a first engaged cam) of the cam member 280, the first moving cam 291, and the first fixed cam 271. The first elastic member 293 may be disposed between the first cam 281 and the first moving cam 291. The first elastic member 293 may be directly changed in length (compressed or uncompressed) by linear movements of the first cam 281 and the first moving cam 291.

In an embodiment, the torque structure 202 may include second cam structures coupled to and/or disposed on the second arm shaft 242 to provide friction torque to the second arm shaft 242, and the second elastic member 294 compressed or uncompressed by at least some of the second cam structures. For example, the second cam structures may include the second arm cam 263, a second cam 282 (e.g., an engaged cam) of the cam member 280, the second moving cam 292, and the second fixed cam 272. The second elastic member 294 may be disposed between the second cam 282 and the second moving cam 292. The second elastic member 294 may be directly changed in length (compressed or uncompressed) by linear movements of the second cam 282 and the second moving cam 292.

In an embodiment, the first arm cam 253 may be formed on the first arm 250. For example, the first arm cam 253 may be formed to surround the first arm shaft 241. The first arm cam 253 may be engaged with the first cam 281 of the cam member 280.

In an embodiment, the second arm cam 263 may be formed on the second arm 260. For example, the second arm cam 263 may be formed to surround the second arm shaft 242. The second arm cam 263 may be engaged with the second cam 282 of the cam member 280.

In an embodiment, the cam member 280 may include a first portion 280a through which the first arm shaft 241 passes, a second portion 280b through which the second arm shaft 242 passes, and a connecting portion 280c connecting the first portion 280a and the second portion 280b. The first cam 281 may be formed on the first portion 280a, and the second cam 282 may be formed on the second portion 280b. In an embodiment, when the arm shafts 241 and 242 rotate, the cam member 280 may axially move without rotating. As the cam member 280 axially moves, the elastic members 293 and 294 may be compressed or uncompressed. In an embodiment, the cam member 280 may be disposed between the arms 250 and 260 and the elastic members 293 and 294 such that the first cam 281 of the first portion 280a is engaged with the first arm cam 253 and the second cam 282 of the second portion 280b is engaged with the second arm cam 263.

In an embodiment, the first moving cam 291 may be coupled to the first arm shaft 241. The first moving cam 291 may be disposed between the fixed member 270 and the first elastic member 293. The first moving cam 291 may be engaged with the first fixed cam 271 of the fixed member 270. For example, the first moving cam 291 may rotate together with the first arm shaft 241 and may linearly move along the first arm shaft 241. For example, the first moving cam 291 may axially move depending on a state of being engaged with the first fixed cam 271. As the first moving cam 291 linearly moves, the first elastic member 293 may be compressed or uncompressed.

In an embodiment, the second moving cam 292 may be coupled to the second arm shaft 242. The second moving cam 292 may be disposed between the fixed member 270 and the second elastic member 294. The second moving cam 292 may be engaged with the second fixed cam 272 of the fixed member 270. For example, the second moving cam 292 may rotate together with the second arm shaft 242 and may linearly move along the second arm shaft 242. For example, the second moving cam 292 may axially move depending on a state of being engaged with the second fixed cam 272. As the second moving cam 292 linearly moves, the second elastic member 294 may be compressed or uncompressed.

In an embodiment, the first elastic member 293 may be disposed between the first moving cam 291 and the cam member 280. The first elastic member 293 may be coupled to the first arm shaft 241. For example, the first elastic member 293 may include a spring structure surrounding the first arm shaft 241. The first elastic member 293 may be compressed or uncompressed when the first arm shaft 241 rotates. For example, the first elastic member 293 may be compressed or uncompressed as the cam member 280 and the first moving cam 291 axially move. For example, the first elastic member 293 may be compressed as the cam member 280 moves in the second axial direction D2 and/or the first moving cam 291 moves in the first axial direction D1. For example, the first elastic member 293 may be further compressed as the axial distance between the cam member 280 and the first moving cam 291 is decreased. In an embodiment, the compressed first elastic member 293 may exert an axial elastic force on the cam member 280 and the first moving cam 291. The elastic force may increase the frictional force between the first arm cam 253 and the first cam 281 of the cam member 280 and the frictional force between the first moving cam 291 and the first fixed cam 271. In addition, the friction torque acting on the first arm shaft 241 may be increased by the increased frictional forces.

In an embodiment, the second elastic member 294 may be disposed between the second moving cam 292 and the cam member 280. The second elastic member 294 may be coupled to the second arm shaft 242. For example, the second elastic member 294 may include a spring structure surrounding the second arm shaft 242. The second elastic member 294 may be compressed or uncompressed when the second arm shaft 242 rotates. For example, the second elastic member 294 may be compressed or uncompressed as the cam member 280 and the second moving cam 292 axially move. For example, the second elastic member 294 may be compressed as the cam member 280 moves in the second axial direction D2 and/or the second moving cam 292 moves in the first axial direction D1. For example, the second elastic member 294 may be further compressed as the axial distance between the cam member 280 and the second moving cam 292 is decreased. In an embodiment, the compressed second elastic member 294 may exert an axial elastic force on the cam member 280 and the second moving cam 292. The elastic force may increase the frictional force between the second arm cam 263 and the second cam 282 of the cam member 280 and the frictional force between the second moving cam 292 and the second fixed cam 272. In addition, the friction torque acting on the second arm shaft 242 may be increased by the increased frictional forces.

Figure 6A:
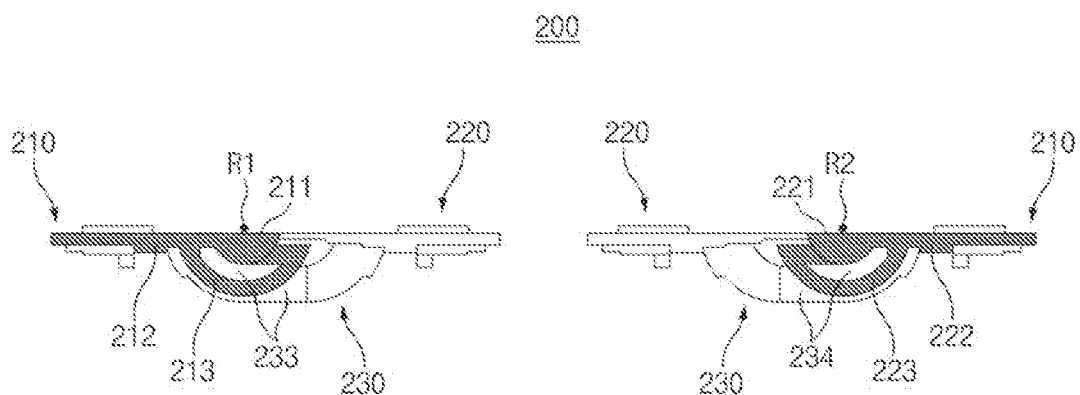
FIGS. 6A, 6B and 6C are views illustrating rotational motions of the rotary structures of a hinge structure according to an embodiment.
Figure 6B:
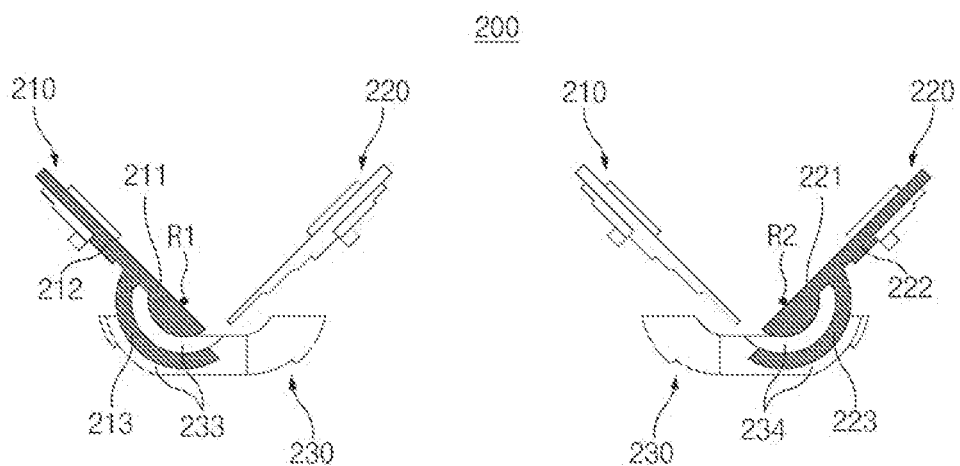
Figure 6C:
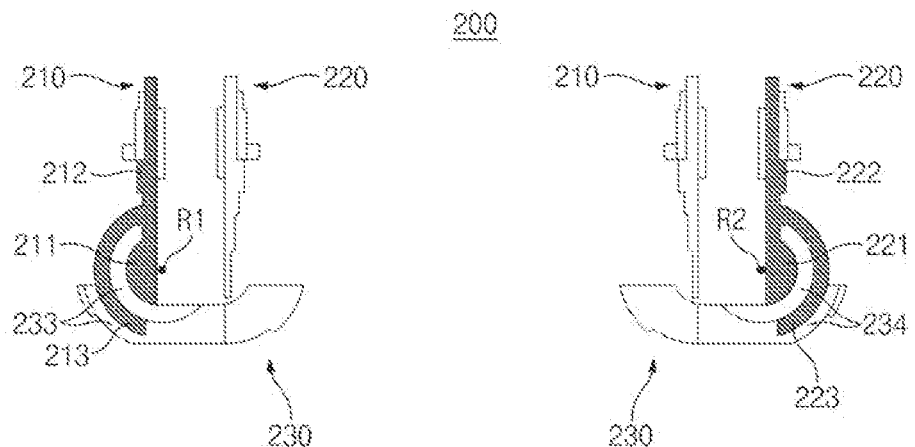

FIGS. 6A, 6B and 6C are views illustrating rotational motions of the rotary structures of a hinge structure according to an embodiment. FIGS. 6A, 6B and 6C illustrate sectional views taken along line A-A' in FIG. 4A.

FIG. 6A is a view illustrating the hinge structure in a flat state. FIG. 6B is a view illustrating the hinge structure in a folded state. FIG. 6C is a view illustrating the hinge structure in a fully folded state.

In an embodiment, the first guide rail 233 and the second guide rail 234 may be formed on the fixed structure 230. In an embodiment, the first guide rail 233 may have a substantially circular arc shape. For example, the center of the circular arc of the first guide rail 233 may coincide with the first axis of rotation R1. For example, the first guide rail 233 may guide rotation of the first rotary structure 210 along a rotational path whose center coincides with the first axis of rotation R1. In an embodiment, the second guide rail 234 may have a substantially circular arc shape. For example, the center of the circular arc of the second guide rail 234 may coincide with the second axis of rotation R2. For example, the second guide rail 234 may guide rotation of the second rotary structure 220 along a rotational path whose center coincides with the second axis of rotation R2.

In an embodiment, the first rotary structure 210 may include the first extending portion 212 and the first coupling portion 211. The first coupling portion 211 may have a substantially cylindrical shape. For example, the cross-section of the first coupling portion 211 may have a substantially circular arc shape. In an embodiment, the first rotary structure 210 may rotate about the first axis of rotation R1 in the state in which the first guide portion 213 of the first coupling portion 211 is accommodated in the first guide rail 233 of the fixed structure 230. For example, when the first extending portion 212 is folded or unfolded together with the first housing 110, the first rotary structure 210 may rotate along a rotational path having a circular arc shape whose center coincides with the first axis of rotation R1.

In an embodiment, the second rotary structure 220 may include the second extending portion 222 and the second coupling portion 221. The second coupling portion 221 may have a substantially cylindrical shape. For example, the cross-section of the second coupling portion 221 may have a substantially circular arc shape. In an embodiment, the second rotary structure 220 may rotate about the second axis of rotation R2 in the state in which the second guide portion 223 is accommodated in the second guide rail 234. For example, when the second extending portion 222 is folded or unfolded together with the second housing 120, the second rotary structure 220 may rotate along a rotational path having a circular arc shape whose center coincides with the second axis of rotation R2.

In an embodiment, the first axis of rotation R1 and the second axis of rotation R2 may be parallel to the axial directions of the hinge structure 200. In an embodiment, the first axis of rotation R1 and the second axis of rotation R2 may be formed in positions spaced apart from the first extending portion 212 of the first rotary structure 210 and the second extending portion 222 of the second rotary structure 220 in the Z-axis direction (e.g., the Z-axis direction of FIGS. 1 to 2C).

Referring to FIG. 6A, in the flat state, the first extending portion 212 may limit a rotational direction of the first rotary structure 210 to one direction. For example, a first end portion of the first guide rail 233 may be open, and a second end portion of the first guide rail 233 may be covered by the first extending portion 212. Accordingly, the first rotary structure 210 is rotatable about the first axis of rotation R1 in the clockwise direction with respect to the drawing in a folding motion and is not rotatable in the counterclockwise direction in an unfolding motion.

Referring to FIG. 6A, in the flat state, the second extending portion 222 may limit a rotational direction of the second rotary structure 220 to one direction. For example, a third end portion of the second guide rail 234 may be open, and a fourth end portion of the second guide rail 234 may be covered by the second extending portion 222. Accordingly, the second rotary structure 220 is rotatable about the second axis of rotation R2 in the counterclockwise direction with respect to the drawing in a folding motion and is not rotatable in the clockwise direction in an unfolding motion.

Figure 7A:
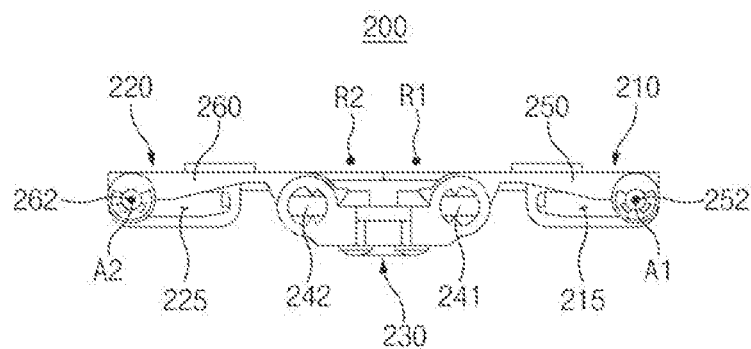
FIGS. 7A, 7B and 7C are views illustrating rotational motions and sliding motions of arms and rotary structures of a hinge structure according to an embodiment.
Figure 7B:
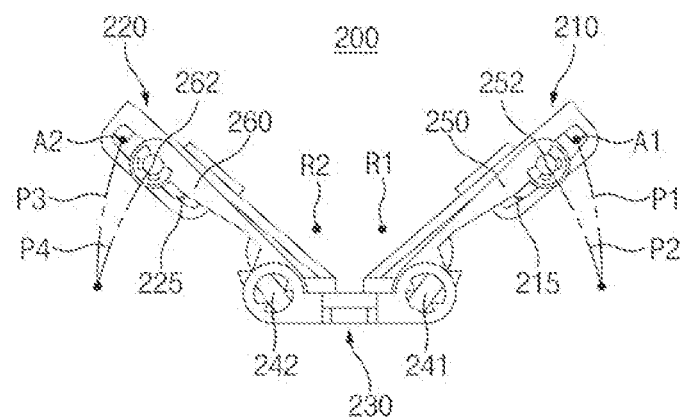
Figure 7C:
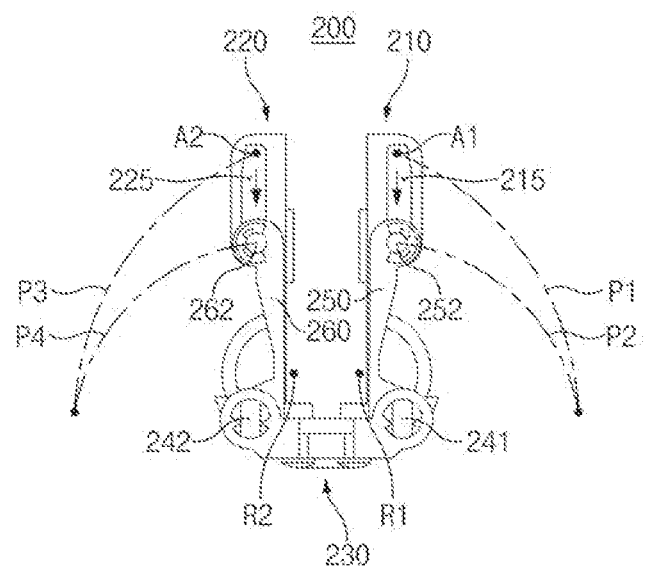

FIGS. 7A, 7B and 7C are views illustrating rotational motions and sliding motions of arms and rotary structures of a hinge structure according to an embodiment. FIGS. 7A, 7B and 7C are views of the hinge structure as viewed in direction B in FIG. 4.

FIG. 7A is a view illustrating the hinge structure in a flat state. FIG. 7B is a view illustrating the hinge structure in a folded state. FIG. 7C is a view illustrating the hinge structure in a fully folded state.

Referring to FIGS. 7A-7C, when the hinge structure 200 is folded or unfolded, the rotary structures 210 and 220 and the arms 250 and 260 may rotate about different axes. For example, the rotary structures 210 and 220 and the arms 250 and 260 may rotate along different rotational paths. Due to the difference in rotational path between the rotary structures 210 and 220 and the arms 250 and 260, the arms 250 and 260 may slide when the hinge structure 200 is folded or unfolded.

In an embodiment, the first rotary structure 210 may rotate about the first axis of rotation R1 in a first rotational direction. For example, in a folding motion, the first rotary structure 210 may rotate in the counterclockwise direction. For example, the point where the first sliding pin 252 is located in the first rotary structure 210 in the flat state may be defined as a first point A1. In folding and unfolding motions, the first point A1 of the first rotary structure 210 may move along a first rotational path P1.

The first arm 250 and the first sliding pin 252 may rotate about the first arm shaft 241. For example, in a folding motion, the first arm 250 and the first sliding pin 252 may rotate in the counterclockwise direction. For example, in the flat state, the first sliding pin 252 may be located at the first point A1, and in the folded state, the first sliding pin 252 may be located at a position spaced apart from the first point A1 in a direction perpendicular to the axial directions. The first sliding pin 252 may move along a second rotational path P2 in folding and unfolding motions.

In various embodiments, the first rotational path P1 and the second rotational path P2 may differ from each other. For example, the first axis of rotation R1 and the first arm shaft 241 may be parallel to each other, but may not coincide with each other, and the rotational paths of the first rotary structure 210 and the first arm 250 may not coincide with each other.

Accordingly, in folding and unfolding motions, the first arm 250 and the first sliding pin 252 may slide relative to the first rotary structure 210. The sliding motion of the first sliding pin 252 and the first arm 250 may be guided as the first sliding pin 252 is accommodated in the first sliding groove 215 of the first rotary structure 210. In an embodiment, when a folding motion is performed in the flat state, the distance between the first sliding pin 252 and the first point A1 may increase. When an unfolding motion is performed in the fully folded state, the distance between the first sliding pin 252 and the first point A1 may decrease.

In an embodiment, the second rotary structure 220 may rotate about the second axis of rotation R2 in a second rotational direction. For example, in a folding motion, the second rotary structure 220 may rotate in the clockwise direction. For example, the point where the second sliding pin 262 is located in the second rotary structure 220 in the flat state may be defined as a second point A2. In folding and unfolding motions, the second point A2 may move along a third rotational path P3.

In an embodiment, the second arm 260 and the second sliding pin 262 may rotate about the second arm shaft 242. For example, in a folding motion, the second arm 260 and the second sliding pin 262 may rotate in the clockwise direction. For example, in the flat state, the second sliding pin 262 may be located at the second point A2, and in the folded state, the second sliding pin 262 may be located at a position spaced apart from the second point A2 in a direction perpendicular to the axial directions. The second sliding pin 262 may move along a fourth rotational path P4 in folding and unfolding motions.

In various embodiments, the third rotational path P3 and the fourth rotational path P4 may differ from each other. For example, the second axis of rotation R2 and the second arm shaft 242 may be parallel to each other, but may not coincide with each other, and the radii of rotation of the second rotary structure 220 and the second arm 260 may not coincide with each other.

Accordingly, in folding and unfolding motions, the second arm 260 and the second sliding pin 262 may slide relative to the second rotary structure 220. The sliding motion of the second sliding pin 262 and the second arm 260 may be guided as the second sliding pin 262 is accommodated in the second sliding groove 225 of the second rotary structure 220. In an embodiment, when a folding motion is performed in the flat state, the distance between the second sliding pin 262 and the second point A2 may increase. When an unfolding motion is performed in the fully folded state, the distance between the second sliding pin 262 and the second point A2 may decrease.

Figure 8:
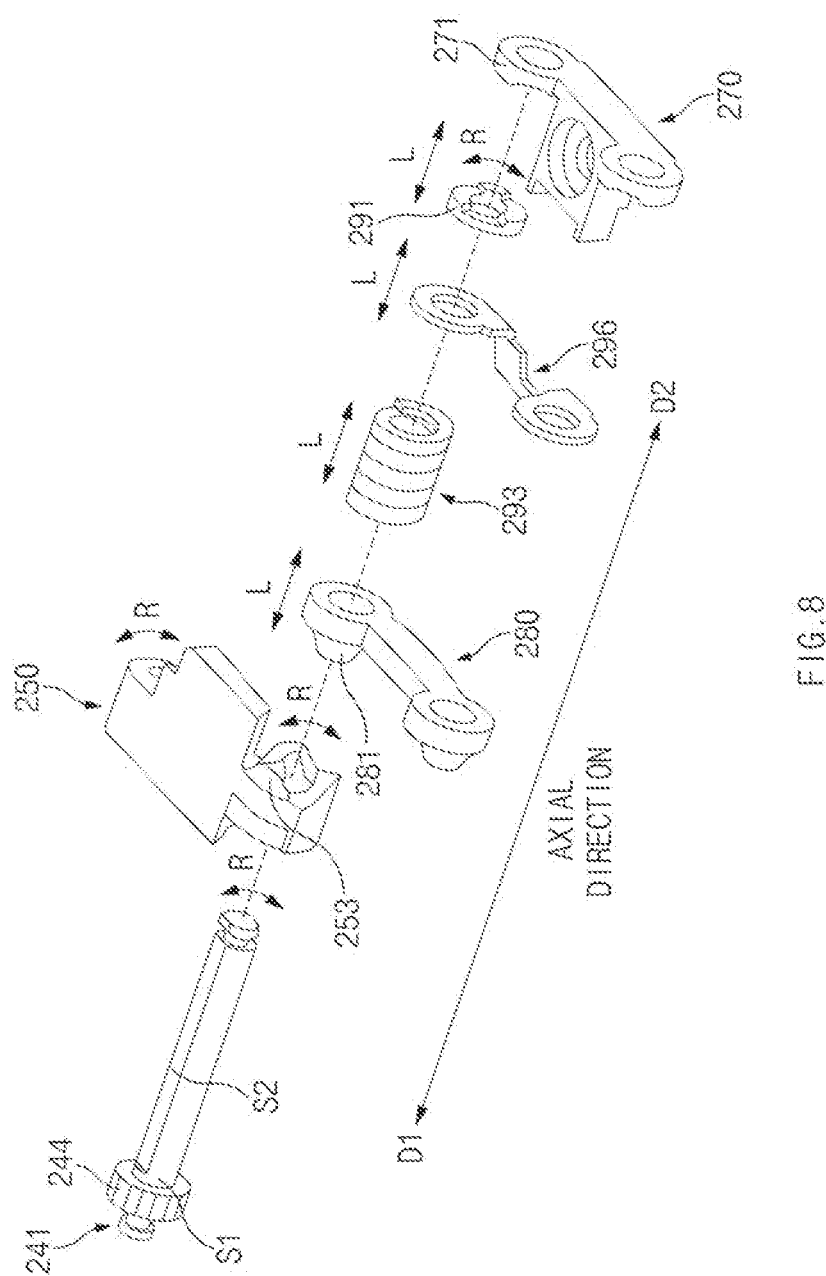
FIG. 8 is a view illustrating a torque structure of a hinge structure according to an embodiment.
Figure 9:
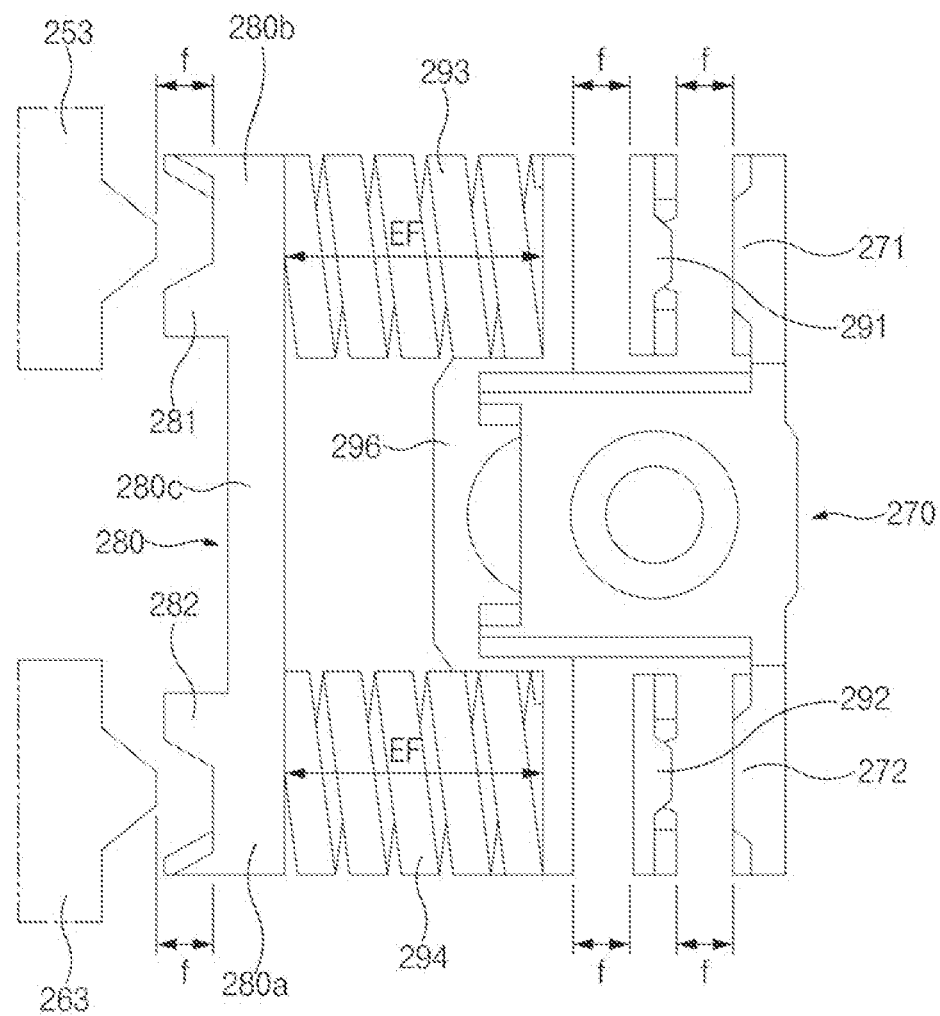
FIG. 9 is a view illustrating a surface frictional force of a torque structure according to an embodiment.

FIG. 8 is a view illustrating a torque structure of a hinge structure according to an embodiment. FIG. 9 is a view illustrating a surface frictional force of a torque structure according to an embodiment.

Although only the first arm shaft 241, the first cam structures 253, 281, 291, and 271 coupled to the first arm shaft 241, and the first elastic member 293 are illustrated in FIG. 8, the following description may be identically applied to the second arm shaft 242, the second cam structures 263, 282, 292, and 272 coupled to the second arm shaft 242, and the second elastic member 294.

Referring to FIG. 8, the first arm 250, the first cam 281 of the cam member 280, the first elastic member 293, the support plate 296, the first moving cam 291, and the fixed member 270 may be sequentially coupled to the first arm shaft 241 when viewed in the second axial direction D2.

In an embodiment, the structures coupled to the first arm shaft 241 may be fixed or moved when the first arm shaft 241 rotates. The moving structures may rotate together with the first arm shaft 241 and/or may linearly move in the axial directions along the first arm shaft 241. For example, the first arm cam 253, the first moving cam 291, the cam member 280, the first elastic member 293, and the support plate 296 may rotate and/or linearly move in response to rotation of the first arm shaft 241.

For example, when the first arm shaft 241 rotates, the first moving cam 291 may rotate together with the first arm shaft 241 and may linearly move in the axial directions along the first arm shaft 241.

For example, when the first arm shaft 241 rotates, the first arm 250 and the first arm cam 253 may rotate together with the first arm shaft 241 and may not linearly move. For example, the first arm 250 and the first arm cam 253 may rotate at a specified position on the first arm shaft 241 when viewed in the axial directions.

For example, the cam member 280 may linearly move in the direction of the first arm shaft 241 depending on the state in which the first cam 281 and the first arm cam 253 are engaged with each other. When the first arm shaft 241 rotates, the cam member 280 and the first cam 281 may not rotate about the first arm shaft 241 and may linearly move in the axial directions along the first arm shaft 241.

For example, the first elastic member 293 may be compressed or uncompressed when the first arm shaft 241 rotates. For example, the first elastic member 293 may be compressed or uncompressed in response to a change in the gap between the cam member 280 and the first moving cam 291 in the axial directions.

For example, when the first arm shaft 241 rotates, the support plate 296 may linearly move in the axial directions along the first arm shaft 241 without rotating.

For example, the fixed member 270 and the first fixed cam 271 may be fixed at a specified position irrespective of rotation of the first arm shaft 241.

Referring to FIG. 9, in an embodiment, the structures coupled to the first arm shaft 241 may at least partially make contact with the adjacent structures. A frictional force may be generated between the structures in contact with each other. The frictional force may be generated when the structures in contact with each other move differently from each other.

For example, the first arm cam 253 of the first arm 250 and the first cam 281 of the cam member 280 may be engaged with each other so as to at least partially make contact with each other. A frictional force f may be generated between the rotating first arm cam 253 and the first cam 281 of the cam member 280 that does not rotate. For example, the first moving cam 291 and the first fixed cam 271 of the fixed member 270 may be engaged with each other so as to at least partially make contact with each other. A frictional force f may be generated between the rotating first moving cam 291 and the first fixed cam 271. For example, the first moving cam 291 and the support plate 296 (or the first elastic member 293) may at least partially make contact with each other. A frictional force f may be generated between the rotating first moving cam 291 and the support plate 296 (or the first elastic member 293) that does not rotate.

In an embodiment, the frictional forces f acting on the first cam structures 253, 281, 291, and 271 may be increased as the elastic force EF of the first elastic member 293 is increased. For example, the frictional forces f may be increased as the first elastic member 293 is compressed. In an embodiment, the frictional forces f may form friction torque on the first arm shaft 241. For example, the magnitude of the friction torque may be proportional to the magnitudes of the frictional forces f and the distances from the center of the first arm shaft 241 to the positions where the frictional forces f are generated (e.g., the radius of the first arm shaft 241). For example, likewise to the frictional forces f, the friction torque may act in the opposite direction to the direction of rotational torque.

In an embodiment, frictional forces f acting on the second cam structures 263, 282, 292, and 272 may be increased as the elastic force EF of the second elastic member 294 is increased. For example, the frictional forces f may be increased as the second elastic member 294 is compressed. In an embodiment, the frictional forces f may form friction torque on the second arm shaft 242. For example, the magnitude of the friction torque may be proportional to the magnitudes of the frictional forces f and the distances from the center of the second arm shaft 242 to the positions where the frictional forces f are generated (e.g., the radius of the second arm shaft 242). For example, likewise to the frictional forces f, the friction torque may act in the opposite direction to the direction of rotational torque.

As described above, the torque structure 202 of the hinge structure 200 may be configured such that at least some of the structures coupled to the arm shafts 241 and 242 move differently from the adjacent structures. Accordingly, when the arm shafts 241 and 242 rotate, frictional forces may be generated in the directions opposite to the rotational directions. The frictional forces may form friction torques acting on the arm shafts 241 and 242 in opposite directions when the arm shafts 241 and 242 rotate. Furthermore, the frictional forces may be proportional to normal forces (e.g., axial forces) acting on the contact surfaces of the adjacent structures, and the normal forces may include the elastic forces EF provided by the elastic members 293 and 294. Accordingly, the magnitudes of the friction torques acting on the arm shafts 241 and 242 may be increased as the elastic members 293 and 294 are compressed. For example, the torques acting on the arm shafts 241 and 242 may be increased as the gap between the cam member 280 and the moving cams 291 and 292 is decreased.

For example, the first elastic member 293 may be further compressed as the cam member 280 moves in the second axial direction D2 and the first moving cam 291 moves in the first axial direction D1. For example, when protrusions of the first arm cam 253 move to protruding surfaces of the first cam 281 along inclined surfaces of protrusions of the first cam 281, the cam member 280 may relatively move in the second axial direction D2. Furthermore, when protrusions of the first moving cam 291 move to protruding surfaces of the first fixed cam 271 along inclined surfaces of protrusions of the first fixed cam 271, the first moving cam 291 may move in the first axial direction D1. At this time, the first elastic member 293 may be compressed, and the compressed first elastic member 293 may press the first moving cam 291 in the second axial direction D2 and may press the cam member 280 in the first axial direction D1. Due to the pressing, surface pressure between the first arm cam 253 and the first cam 281 may be increased, and surface pressure between the first moving cam 291 and the first fixed cam 271 may be increased. Frictional forces may be increased by the increased surface pressures. As the frictional forces act in the directions opposite to the moving directions of the cam member 280 and the first moving cam 291, friction torque may act on the first arm shaft 241 in the opposite direction to the rotational direction of the first arm shaft 241.

For example, the second elastic member 294 may be further compressed as the cam member 280 moves in the second axial direction D2 and the second moving cam 292 moves in the first axial direction D1. For example, when protrusions of the second arm cam 263 move to protruding surfaces of the second cam 282 along inclined surfaces of protrusions of the second cam 282, the cam member 280 may relatively move in the second axial direction D2. Furthermore, when protrusions of the second moving cam 292 move to protruding surfaces of the second fixed cam 272 along inclined surfaces of protrusions of the second fixed cam 272, the second moving cam 292 may move in the first axial direction D1. At this time, the second elastic member 294 may be compressed, and the compressed second elastic member 294 may press the second moving cam 292 in the second axial direction D2 and may press the cam member 280 in the first axial direction D1. Due to the pressing, surface pressure between the second arm cam 263 and the second cam 282 may be increased, and surface pressure between the second moving cam 292 and the second fixed cam 272 may be increased. Frictional forces may be increased by the increased surface pressures. As the frictional forces act in the directions opposite to the moving directions of the cam member 280 and the second moving cam 292, friction torque may act on the second arm shaft 242 in the opposite direction to the rotational direction of the second arm shaft 242.

In various embodiments, the friction torques may cancel out the restoring torque of the display 140, and thus the electronic device 100 and/or the hinge structure 200 may stably remain in a predetermined folded state. In addition, the display 140 may stably maintain the state in which the folding area 143 is curved.

In various embodiments, to prevent an unfolding motion by the restoring torque of the display 140, the torque structure 202 may be configured such that the elastic members 293 and 294 are further compressed as the first arm shaft 241 and the second arm shaft 242 rotate in unfolding directions. For example, the protrusions of the cam structures 253, 263, 281, 282, 291, 292, 271, and 272 may include inclined surfaces having predetermined inclination angles.

As described above, the torque structure 202 of the hinge structure 200 according to an embodiment may include the elastic members 293 and 294 and the cam structures 253, 263, 281, 282, 291, 292, 271, and 272 that adjust compressed states of the elastic members 293 and 294 in response to rotation of the arm shafts 241 and 242. The degree to which the elastic members 293 and 294 are compressed and the frictional forces acting between the cam structures in contact with each other may vary depending to rotation angles of the arm shafts 241 and 242. Accordingly, the torque structure 202 may provide friction torques of various magnitudes to the arm shafts 241 and 242 depending on states of the hinge structure 200 and/or the electronic device 100.

Figure 10A:
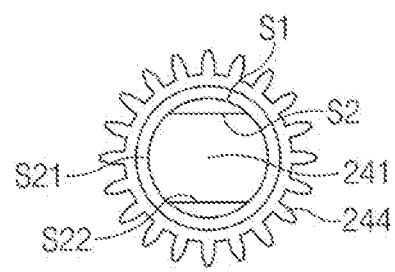
FIGS. 10A, 10B and 10C are views illustrating some structures of a torque structure according to an embodiment.
Figure 10B:
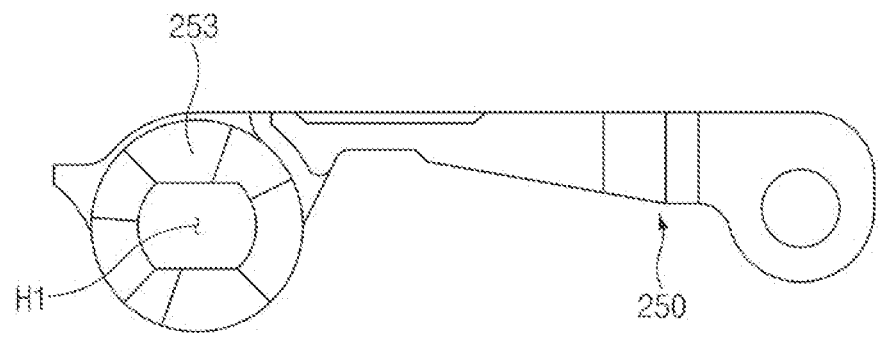
Figure 10C:
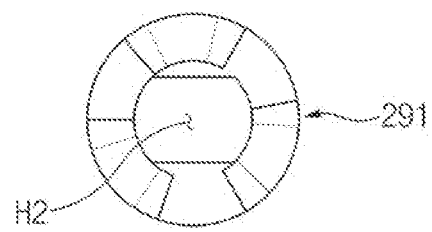

FIGS. 10A, 10B and 10C are views illustrating some structures of a torque structure according to an embodiment.

Although only the first arm shaft 241, the first gear 244, the first arm 250, the first moving cam 291, and the first elastic member 293 are illustrated in FIGS. 10A-10C, the following description may be identically applied to the second arm shaft 242, the second gear 245, the second arm 260, the second moving cam 292, and the second elastic member 294.

Referring to FIGS. 10A-10C, the first gear 244 may be formed on the first arm shaft 241. The first gear 244 may be integrally formed or coupled with the first arm shaft 241. In an embodiment, the first arm shaft 241 may include a first shaft portion S1 having a circular cross-section when viewed in the axial directions and a second shaft portion S2 having a polygonal cross-section when viewed in the axial directions. In various embodiments, the cross-section of the second shaft portion S2 may be formed to be larger or less than the cross-section of the first shaft portion S1.

For example, the outer circumferential surface of the second shaft portion S2 may include circular arc areas S21 and flat areas S22. For example, the flat areas S22 may be spaced apart from each other by a distance less than the radius of the circular arc areas S21 from the center of the first arm shaft 241. For example, when the cross-section of the first arm shaft 241 perpendicular to the axial directions is viewed, the periphery of the first arm shaft 241 may include straight sections. However, the shape of the outer circumferential surface of the second shaft portion S2 of the first arm shaft 241 is not limited to the illustrated embodiment and may include various polygonal shapes such that the first arm 250 and the first moving cam 291 are rotatable together with the first arm shaft 241, The structures illustrated in FIGS. 10A-10C may rotate together with the first arm shaft 241 when the first arm shaft 241 rotates. For example, the first arm 250 may have a first through-hole H1 formed therein through which the second shaft portion S2 of the first arm shaft 241 passes. The first moving cam 291 may have a second through-hole H2 formed therein through which the second shaft portion S2 of the first arm shaft 241 passes. The first through-hole H1 and the second through-hole H2 may be formed to have a polygonal cross-section substantially corresponding to the cross-section of the second shaft portion S2. Accordingly, the first arm 250 and the first moving cam 291 may rotate together with the first arm shaft 241 without spinning with no traction when the first arm shaft 241 rotates.

In an embodiment, the first arm 250 may rotate in the state of being fixed at a specified position on the first arm shaft 241, and the first moving cam 291 may rotate together with the first arm shaft 241 and/or may linearly move along the first arm shaft 241.

In various embodiments, the first arm 250 may be press-fit onto the second shaft portion S2 of the first arm shaft 241. For example, the inside surface of the first through-hole H1, when viewed in the axial directions, may at least partially overlap the outer circumferential surface of the second shaft portion S2 of the first arm shaft 241. Accordingly, the first arm 250 may rotate together with the first arm shaft 241 in the state of being fixed at the specified position on the first arm shaft 241. However, the first arm 250 is not necessarily press-fit onto the second shaft portion S2 of the first arm shaft 241. For example, when the first elastic member 293 is assembled in a compressed state, the first arm 250 may be continually pressed in the first axial direction D1 toward the fixed structure 230 by the first elastic member 293 and may be maintained at a substantially fixed axial position.

Figure 11A:
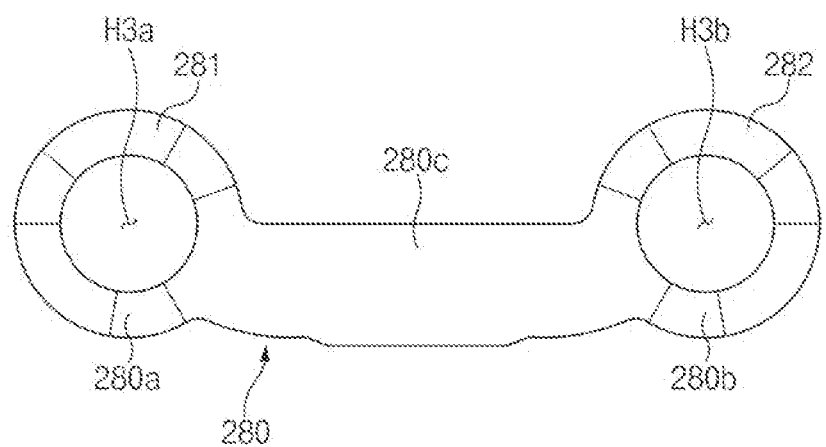
FIGS. 11A and 11B are views illustrating some structures of a torque structure according to an embodiment.
Figure 11B:
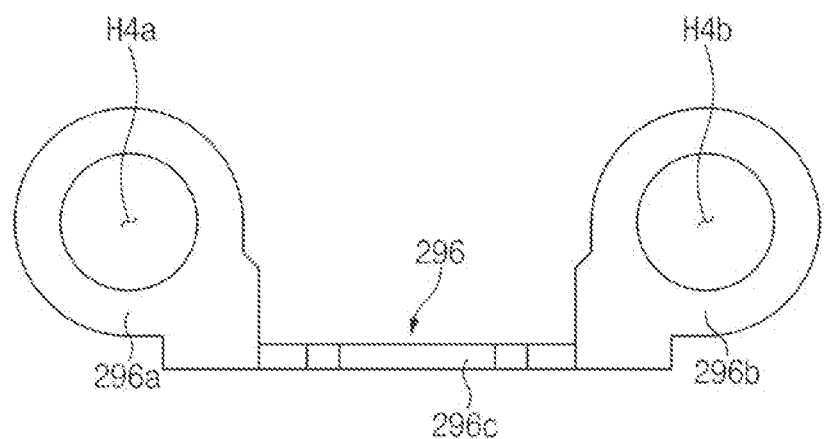

FIGS. 11A and 11B are views illustrating some structures of a torque structure according to an embodiment.

The structures illustrated in FIGS. 11A and 11B may linearly move in the axial directions without rotating together with the arm shafts 241 and 242 when the arm shafts 241 and 242 rotate.

For example, the first portion 280a of the cam member 280 may have a third through-hole H3a formed therein through which the first arm shaft 241 passes. The second portion 280b of the cam member 280 may have a third through-hole H3b formed therein through which the second arm shaft 242 passes. The second shaft portion S2 of the first arm shaft 241 may be located in the third through-hole H3a. The second shaft portion S2 of the second arm shaft 242 may be located in the third through-hole H3b. The first arm shaft 241 may extend through the third through-hole H3a formed in the first portion 280a, and the second arm shaft 242 may extend through the third through-hole H3b formed in the second portion 280b.

For example, a first area 296a of the support plate 296 may have a fourth through-hole H4a formed therein through which the first arm shaft 241 passes. The second area 296b of the support plate 296 may have a fourth through-hole H4b formed therein through which the second arm shaft 242 passes. The second shaft portion S2 of the first arm shaft 241 may be located in the fourth through-hole H4a. The second shaft portion S2 of the second arm shaft 242 may be located in the fourth through-hole H4b. The first arm shaft 241 may extend through the fourth through-hole H4a formed in the first area 296a, and the second arm shaft 242 may extend through the fourth through-hole H4b formed in the second area 296b.

In various embodiments, the cam member 280 may include the connecting portion 280c that connects the first portion 280a and the second portion 280b. The cam member 280 may be integrally moved in the axial directions by the connecting portion 280c. In various embodiments, the support plate 296 may include a connecting area 296c that connects the first area 296a and the second area 296b. The support plate 296 may be integrally moved in the axial directions by the connecting area 296c.

In an embodiment, when viewed in the axial directions, the cross-sections of the third through-holes H3a and H3b and the cross-sections of the fourth through-holes H4a and H4b may be formed to correspond to the cross-sections of the first shaft portions S1 of the arm shafts 241 and 242, or may be formed to be greater than the cross-sections of the first shaft portions S1.

For example, the arm shafts 241 and 242 may rotate in the state of extending through the third through-holes H3a and H3b of the cam member 280, and the cam member 280 may linearly move in the axial directions in the state in which the arm shafts 241 and 242 pass through the third through-holes H3a and H3b. For example, the linear movement of the cam member 280 may be guided by the arm shafts 241 and 242.

For example, the arm shafts 241 and 242 may rotate in the state of extending through the fourth through-holes H4a and H4b of the support plate 296, and the support plate 296 may linearly move in the axial directions in the state in which the arm shafts 241 and 242 pass through the fourth through-holes H4a and H4b. For example, the linear movement of the support plate 296 may be guided by the arm shafts 241 and 242.

Figure 12:
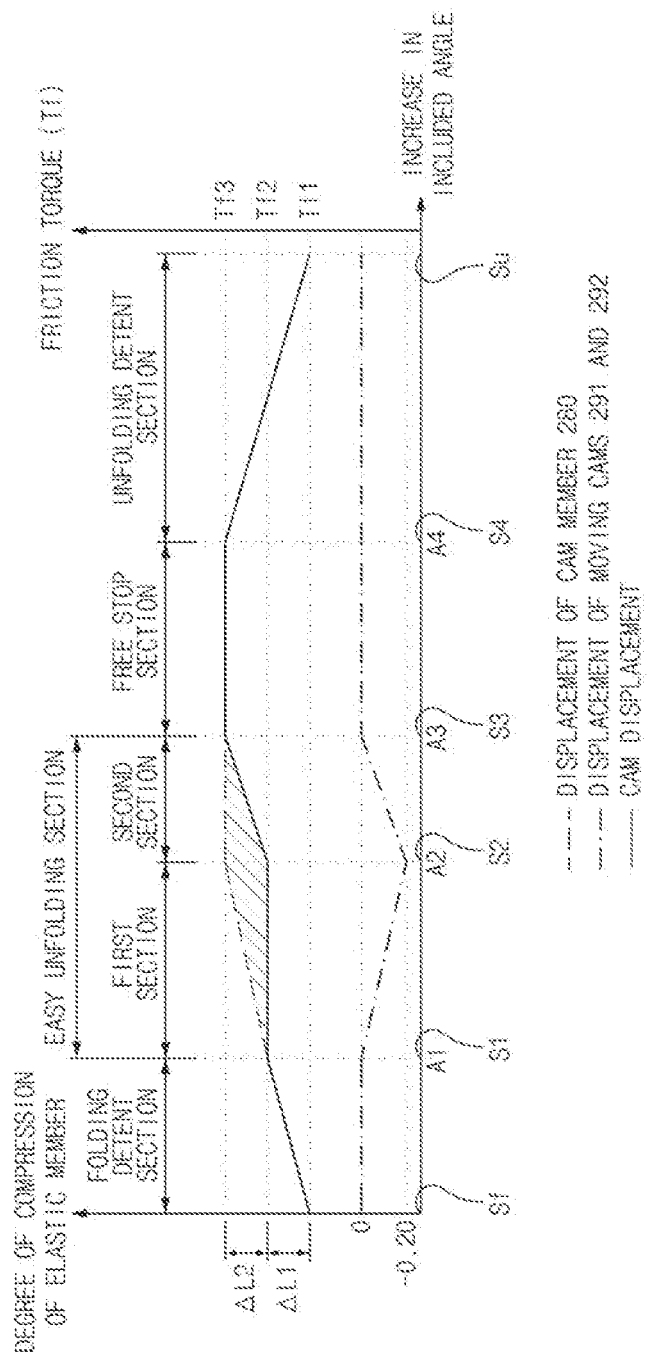
FIG. 12 is a graph depicting compression of elastic members depending on an angle of a torque structure according to an embodiment.

FIG. 12 is a graph depicting compression of elastic members depending on an angle of a torque structure according to an embodiment.

The horizontal axis in the graph of FIG. 12 may represent the angle A. Referring to FIGS. 2A to 2C together, the angle A may include the angle formed by the normal vector n1 of the first area 141 and the normal vector n2 of the second area 142 of the display 140, the angle formed by the third edge P3 and the fourth edge P4, or the angle formed by the first housing 110 and the second housing 120.

The axial displacement of a cam member (e.g., the cam member 280 of FIG. 5) depending on the angle A, the axial displacement of moving cams (e.g., the moving cams 291 an 292 of FIG. 5) depending on the angle A, and the cam displacement that is the sum of the axial displacement of the cam member 280 and the axial displacement of the moving cams 291 and 292 are illustrated in the graph of FIG. 12.

The vertical axis in the graph of FIG. 12 may represent the degree to which the elastic members (e.g., the elastic members 293 and 294 of FIG. 5) are axially compressed. The positive direction of the vertical axis may refer to the direction in which the elastic members 293 and 294 are compressed. For example, the positive direction of the vertical axis may refer to the direction in which the lengths of the elastic members 293 and 294 are decreased. Accordingly, the positive direction of the vertical axis may reflect that the magnitudes of the elastic forces exerted on the moving cams 291 and 292 and the cam member 280 by the elastic members 293 and 294 are increased. Furthermore, the positive direction of the vertical axis may reflect that the friction torque provided by the torque structure (e.g., the torque structure 202 of FIG. 5) is increased.

Figure 13:
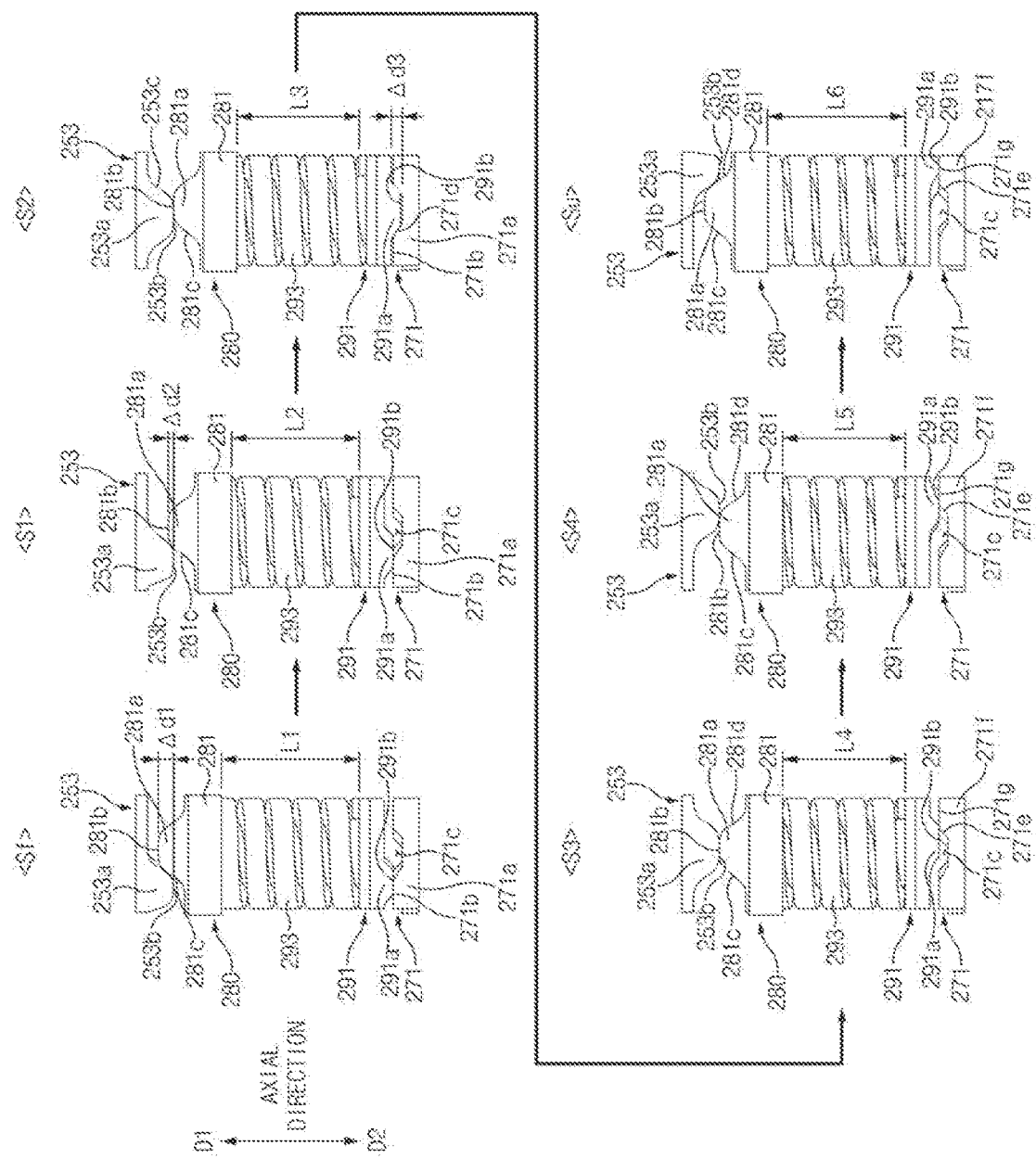
FIG. 13 is a view illustrating motions of a torque structure of a hinge structure according to an embodiment.
Figure 16:
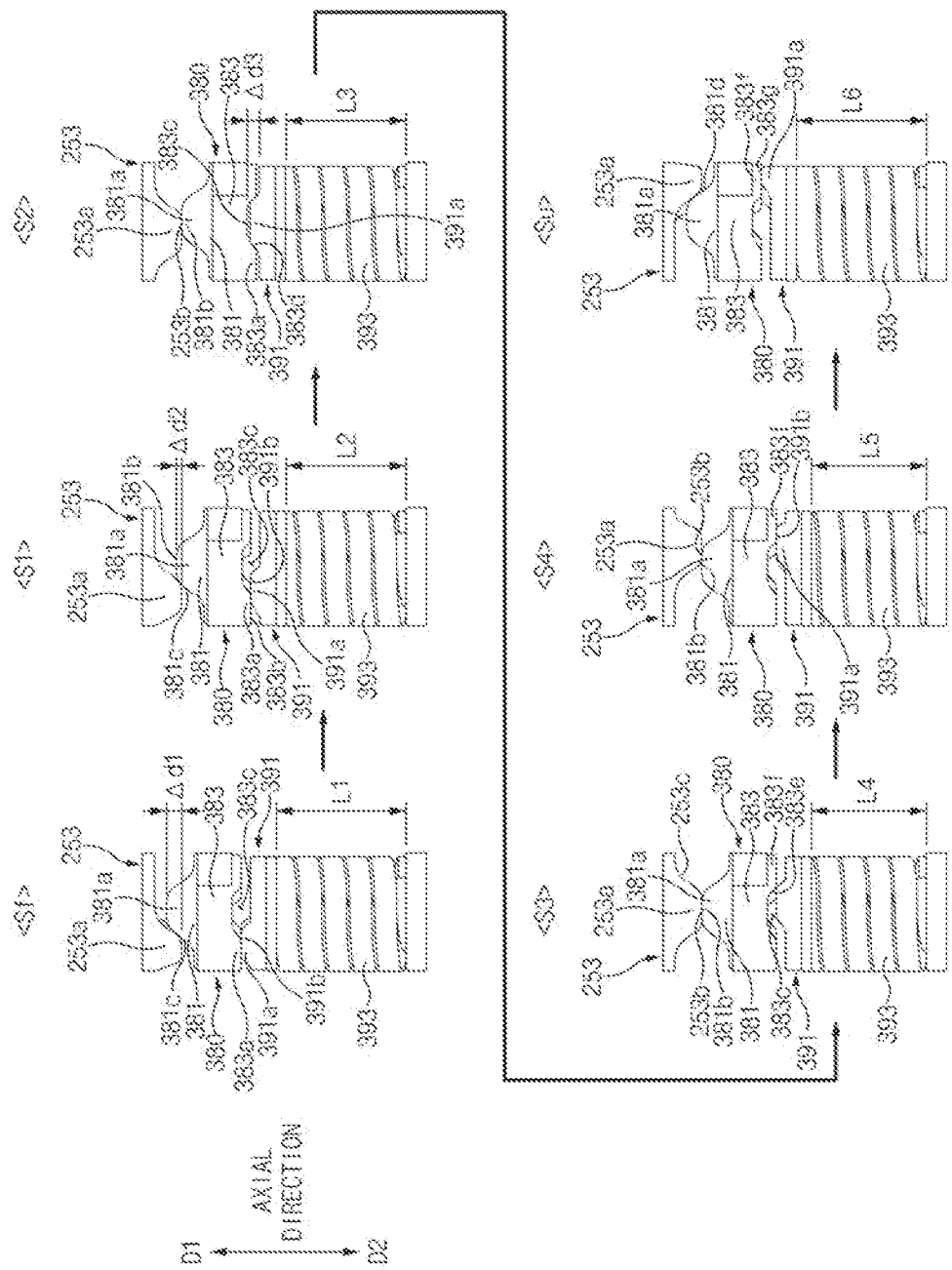
FIG. 16 is a view illustrating motions of a torque structure of a hinge structure according to various embodiments.
Figure 20:
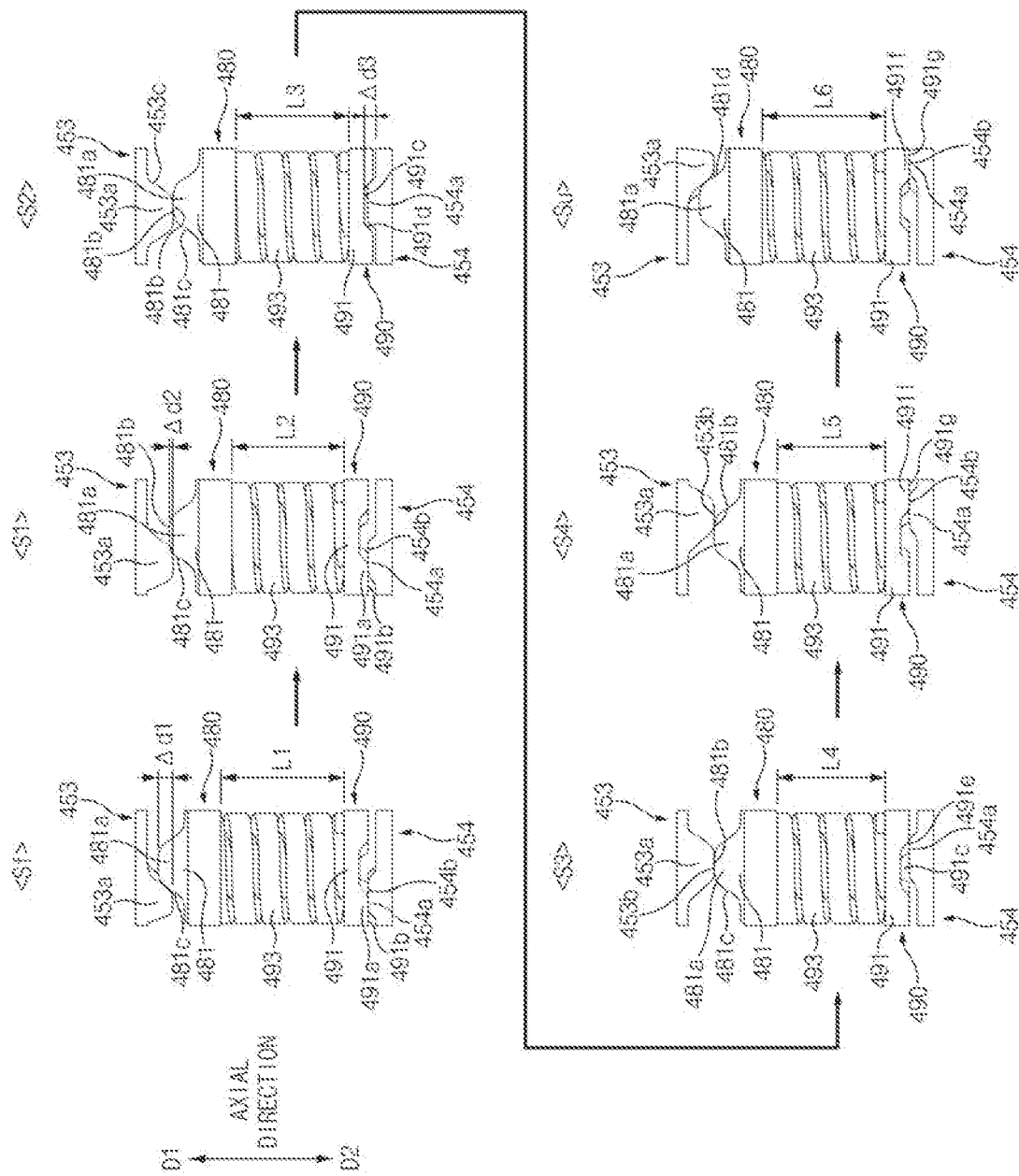
FIG. 20 is a view illustrating motions of a torque structure of a hinge structure according to various embodiments.

The displacement of the cam member 280 illustrated in FIG. 12 may be referred to as the displacement of the cam member 280 in the embodiment illustrated in FIG. 13, the displacement of a cam member 380 in the embodiment illustrated in FIG. 16, and the displacement of a first cam member 480 in the embodiment illustrated in FIG. 20.

The displacement of the moving cams 291 and 292 illustrated in FIG. 12 may be referred to as the displacement of the moving cams 291 and 292 in the embodiment illustrated in FIG. 13, the displacement of moving cams 391 and 392 in the embodiment illustrated in FIG. 16, and the displacement of a second cam member 490 in the embodiment illustrated in FIG. 20.

For example, in the torque structure illustrated in FIG. 13, the positive direction of the vertical axis (e.g., the direction in which the elastic members are compressed) may reflect that the cam member 280 moves in the second axial direction D2 and the moving cams 291 and 292 move in the first axial direction D1. However, the directions of the vertical axis may vary depending on specific torque structures.

For example, in the torque structure illustrated in FIG. 16, the positive direction of the vertical axis (e.g., the direction in which elastic members are compressed) may reflect that the cam member 380 (e.g., the cam member 280 of FIG. 12) moves in the second axial direction D2 and the moving cams 391 and 392 (e.g., the moving cams 291 and 292 of FIG. 12) move in the second axial direction D2.

For example, in the torque structure illustrated in FIG. 20, the positive direction of the vertical axis (e.g., the direction in which elastic members are compressed) may reflect that the first cam member 480 (e.g., the cam member 280 of FIG. 12) moves in the second axial direction D2 and the second cam member 490 (e.g., the moving cams 291 and 292 of FIG. 12) moves in the first axial direction D1.

In an embodiment, the hinge structure 200 and/or the electronic device 100 may include a first state S1 in which the angle A is a first angle A1, a second state S2 in which the angle A is a second angle A2, a third state S3 in which the angle A is a third angle A3, and a fourth state S4 in which the angle A is a fourth angle A4. The first state S1, the second state S2, the third state S3, and the fourth state S4 may be defined between a fully folded state Sf and a flat state Su. The first angle A1, the second angle A2, the third angle A3, and the fourth angle A4 may be sequentially larger angles. In an embodiment, the hinge structure 200 and/or the electronic device 100 may be sequentially unfolded from the fully folded state Sf through the first state S1, the second state S2, the third state S3, and the fourth state S4 to the flat state Su.

In various embodiments, each of the first angle A1, the second angle A2, the third angle A3, and the fourth angle A4 may include various angles. In some embodiments, the first angle A1 may be about 20 degrees, the second angle A2 may be about 65 degrees, the third angle A3 may be about 90 degrees, and the fourth angle A4 may be about 125 degrees.

In an embodiment, the hinge structure 200 and/or the electronic device 100 may include a folding detent section defined from the fully folded state Sf to the first state S1, a first section defined from the first state S1 to the second state S2, a second section defined from the second state S2 to the third state S3, a free stop section defined from the third state S3 to the fourth state S4, and an unfolding detent section defined from the fourth state S4 to the flat state Su.

In an embodiment, the torque structure 202 may provide first friction torque Tf1 to the arm shafts 241 and 242 in the fully folded state Sf. In an embodiment, the torque structure 202 may provide second friction torque Tf2 greater than the first friction torque Tf1 to the arm shafts 241 and 242 in the first state S1.

In an embodiment, the torque structure 202 may be configured such that in the folding detent section, the friction torque increases as the hinge structure 200 and/or the electronic device 100 is unfolded. For example, in the folding detent section, the elastic members 293 and 294 may be further compressed as the angle A increases (e.g., as the first arm shaft 241 and the second arm shaft 242 rotate in the unfolding directions). Accordingly, the folding detent section may have a positive slope when viewed in the unfolding directions (e.g., the directions in which the angle A increases). In the folding detent section, the amount (Tf2−Tf1) of friction torque increased may be proportional to the first displacement ΔL1 of the elastic members 293 and 294. In various embodiments, the folding detent section may include a section in which the friction torque substantially linearly increases as the angle A increases (e.g., as the hinge structure 200 and/or the electronic device 100 is unfolded).

In an embodiment, rotational torque capable of additionally compressing the elastic members 293 and 294 by the first displacement ΔL1 may be required for the electronic device 100 to reach the first state S1 from the fully folded state Sf. The rotational torque may be torque acting in the opposite direction to that of the friction torque. For example, a user may unfold the electronic device 100 in the fully folded state Sf to the first angle A1 by applying, to the first housing 110 and the second housing 120, rotational torque that is greater than the friction torque and that continually increases as the hinge structure 200 and/or the electronic device 100 is unfolded.

For example, referring to FIG. 13 together, as the hinge structure 200 and/or the electronic device 100 is unfolded in the folding detent section, the gap between the cam member 280 and the moving cams 291 and 292 may be decreased, and the elastic members 293 and 294 may be compressed. The compressed elastic members 293 and 294 may press the cam member 280 and the moving cams 291 and 292, and the frictional forces between the cam member 280 and the arm cams 253 and 263 and the frictional forces between the moving cams 291 and 292 and the fixed cams 271 and 272 may be increased by the pressing of the cam member 280 and the moving cams 291 and 292. Friction torques increased in response to the increased frictional forces may be applied to the arm shafts 241 and 242. For example, in the folding detent section, when the arm cams 253 and 263 and the moving cams 291 and 292 rotate, the cam member 280 may move in the second axial direction D2 such that the elastic members 293 and 294 are compressed, and the moving cams 291 and 292 may rotate without axially moving.

In various embodiments, the directions of movement of the cam member 280 and the moving cams 291 and 292 in the folding detent section may vary depending on specific torque structures. For example, as a hinge structure 300 is unfolded (e.g., an angle A is increased) in a folding detent section of a torque structure 302 illustrated in FIG. 16, the cam member 380 may move in the second axial direction D2, and the moving cams 391 and 392 may not move. For example, as a hinge structure 400 is unfolded (e.g., an angle A is increased) in a folding detent section of a torque structure 402 illustrated in FIG. 20, the first cam member 480 may move in the second axial direction D2, and the second cam member 490 may not move in the axial directions.

In various embodiments, when torque less than the friction torque is applied to the electronic device 100 in the folding detent section, the electronic device 100 may be folded to the fully folded state Sf again by the elastic forces of the compressed elastic members 293 and 294. For example, when an unfolding motion is not the user's intended unfolding motion, the electronic device 100 may return to the fully folded state Sf and may remain in the fully folded state Sf.

In various embodiments, the folding detent section may be provided by a linear movement of the cam member 280 of the torque structure 202. Referring to FIG. 12, in the folding detent section, the moving cams 291 and 292 may be fixed at predetermined positions, and when viewed in the unfolding directions, the cam member 280 may move in the direction (e.g., the second axial direction D2 of FIG. 13) to compress the elastic members 293 and 294. However, the folding detent section of the hinge structure 200 according to embodiments is not necessarily limited to being provided only by the cam member 280. For example, the folding detent section may be provided by the cam member 280, the moving cams 291 and 292, or a combination thereof such that the elastic members 293 and 294 are compressed.

In an embodiment, the torque structure 202 may provide the second friction torque Tf2 to the arm shafts 241 and 242 in the first state S1 and the second state S2. In an embodiment, the torque structure 202 may provide the constant second friction torque Tf2 in the first section.

In an embodiment, rotational torque greater than or equal to the second friction torque Tf2 may be required for the electronic device 100 to reach the second state S2 from the first state S1. For example, in the first section, the user may unfold or fold the electronic device 100 by applying rotational torque greater than or equal to the second friction torque Tf2 to the first housing 110 and the second housing 120.

For example, referring to FIG. 13 together, when the arm shafts 241 and 242, the arm cams 253 and 263, and the moving cams 291 and 292 rotate in the unfolding directions in the first section, the cam member 280 may move in the direction in which the elastic members 293 and 294 are compressed, and the moving cams 291 and 292 may move in the direction in which the elastic members 293 and 294 are uncompressed. For example, when viewed in the unfolding directions, in the first section, the cam member 280 may move in the second axial direction D2, and the moving cams 291 and 292 may also move in the second axial direction D2. The elastic members 293 and 294 may remain in a constant compressed state. In various embodiments, the directions of movement of the cam member 280 and the moving cams 291 and 292 in the first section may vary depending on specific torque structures.

For example, referring to the torque structure 302 illustrated in FIG. 16, as the hinge structure 300 is unfolded (e.g., the angle A is increased) in the first section, the cam member 380 may move in the second axial direction D2, the moving cams 391 and 392 may move in the first axial direction D1, and elastic members 393 and 394 may remain in a constant compressed state.

For example, referring to the torque structure 402 illustrated in FIG. 20, as the hinge structure 400 is unfolded (e.g., the angle A is increased) in the first section, the first cam member 480 may move in the second axial direction D2, the second cam member 490 may move in the second axial direction D2, and elastic members 493 and 494 may remain in a constant compressed state.

Accordingly, the degree of compression of the elastic members 293 and 294 may be substantially uniformly formed in the first section. The elastic members 293 and 294 may remain in a substantially constant compressed state in the first section, and the torque structure 202 may provide substantially uniform friction torque in the first section.

The hinge structure 200 according to an embodiment may include the first section in which one of two linearly moving cams (e.g., the cam member 280 and the moving cams 291 and 292) moves to compress the elastic members 293 and 294 and the other moves to uncompress the elastic members 293 and 294. Accordingly, the user may easily unfold the electronic device 100 in the fully folded state Sf.

For example, considering a torque structure in which the moving cams 291 and 292 and the fixed cams 271 and 272 are omitted and the cam member 280 and the arm cams 253 and 263 are included, friction torque may continually increase from the fully folded state Sf to the second state S2 in which the angle A is the second angle A2, and continually increasing rotational torque may be required for the electronic device 100 to be unfolded to the second angle A2. This may make it difficult for the user to perform an unfolding motion. The torque structure 202 of the hinge structure 200 according to an embodiment may include the first section between the free stop section and the folding detent section, and thus the user may relatively easily unfold the electronic device 100 in the fully folded state Sf to the free stop section. For example, the user may unfold the electronic device 100 with one hand (e.g., unfolding with one hand).

However, according to various embodiments, the cam displacement in the first section is not necessarily limited to constant displacement. For example, as the first section is intended to enable the user to easily unfold the electronic device 100, the cam displacement in the first section may have a gentler slope than the cam displacement in the folding detent section, or may have a negative slope.

In an embodiment, the torque structure 202 may provide the second friction torque Tf2 to the arm shafts 241 and 242 in the second state S2. In an embodiment, the torque structure 202 may provide third friction torque Tf3 greater than the second friction torque Tf2 to the arm shafts 241 and 242 in the third state S3.

In an embodiment, the torque structure 202 may be configured such that in the second section, the friction torque increases as the hinge structure 200 and/or the electronic device 100 is unfolded. For example, in the second section, the cam displacement may increase as the angle A increases. For example, in the second section, the elastic members 293 and 294 may be further compressed as the arm shafts 241 and 242 rotate. Accordingly, the second section may have a positive slope. In the second section, the amount of friction torque increased may be proportional to the second displacement ΔL2 of the elastic members 293 and 294. In various embodiments, in the second section, the friction torque may substantially linearly increase as the angle A increases (e.g., as the hinge structure 200 and/or the electronic device 100 is unfolded).

In an embodiment, rotational torque capable of additionally compressing the elastic members 293 and 294 by the second displacement ΔL2 may be required for the electronic device 100 to reach the third state S3 from the second state S2. The rotational torque may be torque acting in the opposite direction to that of the friction torque. For example, the user may unfold the electronic device 100 in the second state S2, in which the angle A is the second angle A2, to the third angle A3 by applying, to the first housing 110 and the second housing 120, rotational torque that is greater than the friction torque and that continually increases as the hinge structure 200 and/or the electronic device 100 is unfolded.

For example, referring to FIG. 13 together, as the hinge structure 200 and/or the electronic device 100 is unfolded in the second section, the gap between the cam member 280 and the moving cams 291 and 292 may be decreased, and the elastic members 293 and 294 may be compressed. The compressed elastic members 293 and 294 may press the cam member 280 and the moving cams 291 and 292, and the frictional forces between the cam member 280 and the arm cams 253 and 263 and the frictional forces between the moving cams 291 and 292 and the fixed cams 271 and 272 may be increased by the pressing of the cam member 280 and the moving cams 291 and 292. Friction torques increased in response to the increased frictional forces may be applied to the arm shafts 241 and 242. For example, when the arm cams 253 and 263 and the moving cams 291 and 292 rotate in the unfolding directions in the second section, the rotating moving cams 291 and 292 may move in the first axial direction D1 such that the elastic members 293 and 294 are compressed, and the cam member 280 may not move in the axial directions. For example, in the second section, the flat protruding surfaces of the cam member 280 and the flat protruding surfaces of the arm cams 253 and 263 may make surface-to-surface contact with each other. For example, in the torque structure 202 illustrated in FIG. 13, the moving cams 291 and 292 may move in the first axial direction D1.

In various embodiments, the directions of movement of the cam member 280 and the moving cams 291 and 292 in the second section may vary depending on specific torque structures.

For example, referring to the torque structure 302 illustrated in FIG. 16, as the hinge structure 300 is unfolded (e.g., the angle A is increased) in the second section, the cam member 380 may not move in the axial directions, the moving cams 391 and 392 may move in the second axial direction D2, and elastic members 393 and 394 may be compressed.

For example, referring to the torque structure 402 illustrated in FIG. 20, as the hinge structure 400 is unfolded (e.g., the angle A is increased) in the second section, the cam member 480 may not move in the axial directions, the second cam member 490 may move in the first axial direction D1, and the elastic members 493 and 494 may be compressed.

In various embodiments, when torque less than the friction torque is applied to the electronic device 100 in the second section, the electronic device 100 may be folded to the second state S2 again by the elastic forces of the compressed elastic members 293 and 294.

According to various embodiments, the second section is not necessarily provided only by the movement of the moving cams 291 and 292 and may be provided by the cam member 280, the moving cams 291 and 292, or a combination thereof such that the cam displacement has a positive slope.

In various embodiments, the first section and the second section may be referred to as the easy unfolding section. For example, when compared with the torque structure in which the fixed cams 271 and 272 and the moving cams 291 and 292 are omitted, the torque structure 202 according to an embodiment may provide relatively low friction torque in an unfolding motion from the first angle A1 to the third angle A3. This may provide, to the user, the convenience of unfolding the electronic device 100 with low rotational torque (e.g., unfolding with one hand). For example, reduction in work W required for the hinge structure 200 and/or the electronic device 100 to be unfolded from the first state S1 to the third state S3 may be proportional to $\int_{A1}^{A3} Tf \, dA$ and may correspond to, for example, the area of the shaded region between the solid line and the dotted line.

In an embodiment, the torque structure 202 may provide the third friction torque Tf3 to the arm shafts 241 and 242 in the third state S3 and the fourth state S4. In an embodiment, the torque structure 202 may provide constant friction torque in the free stop section.

In an embodiment, rotational torque greater than the third friction torque Tf3 applied to the arm shafts 241 and 242 may be required for the electronic device 100 to reach the fourth state S4 from the third state S3. For example, in the free stop section, the user may unfold or fold the electronic device 100 by applying rotational torque greater than or equal to the third friction torque Tf3 to the first housing 110 and the second housing 120.

For example, referring to FIG. 13, when the arm shafts 241 and 242, the arm cams 253 and 263, and the moving cams 291 and 292 rotate in the free stop section, the cam member 280 and the moving cams 291 and 292 may not move in the axial directions. In the free stop section, the flat protruding surfaces of the cam member 280 may make surface-to-surface contact with the flat protruding surfaces of the arm cams 253 and 263, and the flat protruding surfaces of the moving cams 291 and 292 may make surface-to-surface contact with the flat protruding surfaces of the fixed cams 271 and 272. Accordingly, the cam displacement may be substantially uniformly formed in the free stop section. The elastic members 293 and 294 may remain in a substantially constant compressed state in the free stop section, and the torque structure 202 may provide substantially uniform friction torque in the free stop section.

For example, referring to the torque structure 302 illustrated in FIG. 16, in the free stop section, the cam member 380 and the moving cams 391 and 392 may not move in the axial directions, and the elastic members 393 and 394 may remain in a constant compressed state.

For example, referring to the torque structure 402 illustrated in FIG. 20, in the free stop section, the first cam member 480 and the second cam member 490 may not move in the axial directions, and the elastic members 493 and 494 may remain in a constant compressed state.

As described above, in the free stop section, the torque structure 202 may compress the elastic members 293 and 294 and may provide the third friction torque Tf3 greater than those in the other states and sections. Furthermore, the third friction torque Tf3 may be greater than the restoring torque of the display 140. Accordingly, in the free stop section, the electronic device 100 may stably remain in folded states having various angles A.

In an embodiment, the free stop section may be configured such that two linear moving cams (e.g., the cam member 280 and the moving cams 291 and 292) have fixed axial positions, respectively. In an embodiment, although the free stop section and the first section are similar to each other in that the torque structure 202 provides constant friction torque, the third friction torque Tf3 in the free stop section may be greater than the second friction torque Tf2 in the first section. Furthermore, although the cam member 280 and the moving cams 291 and 292 have the fixed axial positions in the free stop section, respectively, the cam member 280 and the moving cams 291 and 292 in the first section may move in the directions in which the elastic members 293 and 294 are compressed and in the directions in which the elastic members 293 and 294 are uncompressed.

However, the torque structure 202 according to various embodiments is not limited to the fact that the cam displacement in the free stop section is constant. For example, as the free stop section is configured to maintain a predetermined folded state of the display 140, the torque structure 202 may be configured in various ways to provide friction torque greater than the restoring torque of the display 140 in the free stop section. For example, as the restoring torque of the display 140 acts in the unfolding directions, the torque structure 202 according to some embodiments may be configured such that the cam displacement in the free stop section increases along the unfolding directions. For example, the cam displacement may have a positive slope. For example, the protruding surfaces of at least some of the cam structures (e.g., the arm cams 253 and 263, the first cam 281, the second cam 282, the moving cams 291 and 292, and the fixed cams 271 and 272) may include inclined surfaces having predetermined slopes.

In an embodiment, the torque structure 202 may provide the third friction torque Tf3 in the fourth state S4 and may provide the first friction torque Tf1 less than the third friction torque Tf3 in the flat state Su.

In an embodiment, the torque structure 202 may be configured such that in the unfolding detent section, the friction torque decreases as the hinge structure 200 and/or the electronic device 100 is unfolded. For example, in the unfolding detent section, the cam displacement may decrease as the angle A increases. For example, in the unfolding detent section, the elastic members 293 and 294 may be uncompressed as the arm shafts 241 and 242 rotate. Accordingly, the unfolding detent section may have a negative slope when viewed in the unfolding directions (e.g., the directions in which the angle A increases). In the unfolding detent section, the amount of friction torque decreased may be proportional to the third displacement (ΔL1+ΔL2) of the elastic members 293 and 294. In various embodiments, in the unfolding detent section, the friction torque may substantially linearly decrease as the angle A increases (e.g., as the hinge structure 200 and/or the electronic device 100 is unfolded).

In an embodiment, when the electronic device 100 is folded from the flat state Su to the free stop section (e.g., the fourth state S4), rotational torque capable of additionally compressing the elastic members 293 and 294 by the third displacement (ΔL1+ΔL2) may be required. The rotational torque may be torque acting in the opposite direction to that of the friction torque. For example, the user may fold the electronic device 100 in the flat state Su to the fourth state S4, in which the angle A is the fourth angle A4, by applying rotational torque greater than or equal to the friction torque to the first housing 110 and the second housing 120.

For example, referring to FIG. 13, as the electronic device 100 is unfolded in the unfolding detent section, the gap between the cam member 280 and the moving cams 291 and 292 may be increased, and the elastic members 293 and 294 may be uncompressed. The uncompressed elastic members 293 and 294 may press the cam member 280 and the moving cams 291 and 292 with relatively small forces when viewed in the unfolding directions. The frictional forces between the cam member 280 and the arm cams 253 and 263 and the frictional forces between the moving cams 291 and 292 and the fixed cams 271 and 272 may be decreased by the pressing of the cam member 280 and the moving cams 291 and 292. Friction torques decreased in response to the decreased frictional forces may be applied to the arm shafts 241 and 242. For example, when the arm cams 253 and 263 and the moving cams 291 and 292 rotate in the unfolding directions in the unfolding detent section, the rotating moving cams 291 and 292 may not move in the axial directions, and the cam member 280 may move in the first axial direction D1 such that the elastic members 293 and 294 are uncompressed.

For example, referring to the torque structure 302 illustrated in FIG. 16, as the hinge structure 300 is unfolded (e.g., the angle A is increased) in the unfolding detent section, the cam member 380 may move in the first axial direction D1, the moving cams 391 and 392 may not move in the axial directions, and the elastic members 393 and 394 may be uncompressed.

For example, referring to the torque structure 402 illustrated in FIG. 20, as the hinge structure 400 is unfolded (e.g., the angle A is increased) in the unfolding detent section, the first cam member 480 may move in the first axial direction D1, the second cam member 490 may not move in the axial directions, and the elastic members 493 and 494 may be uncompressed.

In various embodiments, the unfolding detent section may be configured to prevent the performance of a folding motion not intended by the user. For example, when the electronic device 100 in the flat state Su is folded, the electronic device 100 may be unfolded to the flat state Su again if rotational torque sufficient to enable the electronic device 100 to reach the fourth state S4 included in the free stop section (e.g., rotational torque greater than or equal to the gradually increasing friction torque) is not applied. For example, the unfolding detent section may be configured such that the friction torque increases when viewed in the folding directions (e.g., the directions in which the angle A decreases), and thus the electronic device 100 may stably remain in the flat state Su.

In various embodiments, the unfolding detent section may be provided by a linear movement of the cam member 280 of the torque structure 202. Referring to FIG. 12, in the unfolding detent section, the moving cams 291 and 292 may be fixed at predetermined positions, and when viewed in the unfolding directions, the cam member 280 may move in the direction (e.g., the first axial direction D1 of FIG. 13) to uncompress the elastic members 293 and 294. However, the unfolding detent section of the hinge structure 200 according to embodiments is not necessarily limited to being provided only by the cam member 280. For example, the unfolding detent section may be provided by the cam member 280, the moving cams 291 and 292, or a combination thereof such that the cam displacement has a negative slope.

In various embodiments, the torque structure 202 may be configured such that even when rotational torque is not applied in the unfolding directions in the unfolding detent section, an unfolding motion is performed by pressing the elastic members 293 and 294 and the electronic device 100 is unfolded to the flat state Su.

Referring to FIG. 12, the torque structure 202 is illustrated as providing the first friction torque Tf1 in the flat state Su and the fully folded state Sf. However, the torque structure 202 is not necessarily limited thereto. For example, in the flat state Su, the torque structure 202 may provide various friction torques less than the third friction torque Tf3 in the free step section (e.g., the fourth state S4).

FIG. 13 is a view illustrating motions of a torque structure of a hinge structure according to an embodiment. For example, FIG. 13 illustrates one example for implementing the cam displacement illustrated in FIG. 12, and the motions may vary depending on specific torque structures.

Although only the first arm shaft 241 and the first cam structures 253, 281, 271, and 291 coupled to the first arm shaft 241 are illustrated in FIG. 13, the following description may be identically applied to the second arm shaft 242 and the second cam structures 263, 282, 292, and 292 coupled to the second arm shaft 242. For example, descriptions of the first arm cam 253, the first cam 281, the first moving cam 291, and the first fixed cam 271 may be substantially identically applied to the second arm cam 263, the second cam 282, the second moving cam 292, and the second fixed cam 272.

Referring to FIG. 13, when an unfolding motion and a folding motion are performed, the first arm cam 253 and the first moving cam 291 may rotate together with the first arm shaft 241, and the gap between the first cam member 280 and the first moving cam 291 in the axial directions may vary. Accordingly, the first elastic member 293 may be compressed, and the compressed first elastic member 293 may press the cam member 280 in the first axial direction D1 and may press the first moving cam 291 in the second axial direction D2. The pressing forces exerted by the first elastic member 293 may increase as the first elastic member 293 is further compressed. The pressing of the cam member 280 and the first moving cam 291 may increase the frictional force between the first arm cam 253 and the first cam 281 of the cam member 280 and the frictional force between the first moving cam 291 and the first fixed cam 271. Friction torque may be provided to the first arm shaft 241 through the increased frictional forces. The torque structure 202 may include the cam structures 253, 281, 291, and 271 having predetermined profiles to compress or uncompress the first elastic member 293 depending on sections or states.

In the fully folded state Sf, first protrusions 253a of the first arm cam 253 may be located on first inclined surfaces 281c of second protrusions 281a of the first cam 281 of the cam member 280, and third protrusions 291a of the first moving cam 291 may be located on fourth protruding surfaces 271b of fourth protrusions 271a of the first fixed cam 271. For example, inclined surfaces 253c of the first protrusions 253a of the first arm cam 253 may make contact with the first inclined surfaces 281c of the second protrusions 281a of the first cam 281. Third protruding surfaces 291b of the third protrusions 291a of the first moving cam 291 may make contact with the fourth protruding surfaces 271b of the fourth protrusions 271a of the first fixed cam 271. The first elastic member 293 may have a first length L1 longer than a second length L2. In the fully folded state Sf, the first elastic member 293 may be less compressed than in the first state S1, the second state S2, the third state S3, and the fourth state S4.

As the first elastic member 293 presses the cam member 280 in the first axial direction D1 and the first moving cam 291 in the second axial direction D2 in the fully folded state Sf, rotational torque may be applied to the first arm cam 253 and the first moving cam 291 in the folding direction. Referring to FIG. 2C, as the third edge P3 of the first housing 110 and the fourth edge P4 of the second housing 120 of the electronic device 100 are in contact with each other in the fully folded state Sf, the first arm cam 253 and the first moving cam 291 may no longer rotate in the folding direction despite the rotational torque in the folding direction. However, when the electronic device 100 is in a state between the fully folded state Sf and the first state S1, the rotational torque in the folding direction may rotate the first arm shaft 241, the first arm cam 253, and the first moving cam 291 in the folding direction such that the electronic device 100 is folded to the fully folded state Sf. For example, the folding detent section illustrated in FIG. 12 may be provided by the rotational torque in the folding direction.

When an unfolding motion is performed from the fully folded state Sf to the first state S1 (e.g., the folding detent section of FIG. 12), the first protrusions 253a of the first arm cam 253 may move along the first inclined surfaces 281c of the second protrusions 281a of the first cam 281, and the third protrusions 291a of the first moving cam 291 may move along the fourth protruding surfaces 271b of the fourth protrusions 271a of the first fixed cam 271. The first protrusions 253a may move closer to second protruding surfaces 281b along the first inclined surfaces 281c of the second protrusions 281a of the first cam 281. By the movement of the first protrusions 253a, the cam member 280 may move in the second axial direction D2, and the first elastic member 293 may be compressed. For example, referring to FIG. 12, the torque structure 202, when viewed in the unfolding directions, may provide friction torque linearly increasing from the first friction torque Tf1 to the second friction torque Tf2 in the folding detent section, and this may be related to the movement of the cam member 280.

In the first state S1, the first protrusions 253a of the first arm cam 253 may be located on the first inclined surfaces 281c of the second protrusions 281a of the first cam 281 of the cam member 280, and the third protrusions 291a of the first moving cam 291 may be located on the fourth protruding surfaces 271b of the fourth protrusions 271a of the first fixed cam 271. For example, the inclined surfaces 253c of the first protrusions 253a of the first arm cam 253 may make contact with the first inclined surfaces 281c of the second protrusions 281a of the first cam 281. The third protruding surfaces 291b of the third protrusions 291a of the first moving cam 291 may make contact with the fourth protruding surfaces 271b of the fourth protrusions 271a of the first fixed cam 271. In the first state S1, the first elastic member 293 may have the second length L2 less than the first length L1. For example, in the first state S1, the first elastic member 293 may be more compressed by the movement of the cam member 280 than in the fully folded state Sf. The change (L1−L2) in the length of the first elastic member 293 may be substantially the same as the distance (Δd1−Δd2) that the cam member 280 moves in the second axial direction D2.

When an unfolding motion is performed from the first state S1 to the second state S2 (e.g., the first section of FIG. 12), the first protrusions 253a of the first arm cam 253 may move to the second protruding surfaces 281b of the second protrusions 281a along the first inclined surfaces 281c of the second protrusions 281a of the first cam 281. The third protrusions 291a of the first moving cam 291 may move into fourth depressions 271c along third inclined surfaces 271d of the first fixed cam 271. The cam member 280 and the first moving cam 291 may move in the second axial direction D2. In various embodiments, the movement of the cam member 280 in the second axial direction D2 and the movement of the first moving cam 291 in the second axial direction D2 may be substantially simultaneously performed. In various embodiments, in the unfolding motion from the first state S1 to the second state S2, the axial travel distances of the cam member 280 and the first moving cam 291 may be substantially the same as each other. For example, in the unfolding motion from the first state S1 to the second state S2, the cam member 280 may move the second distance Δd2, and the first moving cam 291 may move the third distance Δd3. The second distance Δd2 may be equal to the third distance Δd3. For example, referring to FIG. 12, the torque structure 202 may provide the constant second friction torque Tf2 in the first section, and this may be related to the movements of the first cam member 280 and the first moving cam 291.

In the second state S2, the first protrusions 253a of the first arm cam 253 may be located on the second protruding surfaces 281b of the second protrusions 281a of the first cam 281 of the cam member 280. The third protrusions 291a of the first moving cam 291 may be located in the fourth depressions 271c of the first fixed cam 271. For example, first protruding surfaces 253b of the first protrusions 253a may make surface-to-surface contact with the second protruding surfaces 281b of the first cam 281. The third protrusions 291a of the first moving cam 291 may be at least partially accommodated in the fourth depressions 271c. In the second state S2, the first elastic member 293 may have a third length L3. In various embodiments, the third length L3 may be substantially the same as the second length L2.

The free stop section may be defined from the third state S3 to the fourth state S4.

When an unfolding motion is performed from the second state S2 to the third state S3 (e.g., the second section of FIG. 12), the first protrusions 253a of the first arm cam 253 may move along the second protruding surfaces 281b of the second protrusions 281a of the first cam 281. The first arm cam 253 may rotate relative to the first cam 281 of the cam member 280 in the state in which the first protruding surfaces 253b and the second protruding surfaces 281b make surface-to-surface contact with each other. The third protrusions 291a of the first moving cam 291 may move out of the fourth depressions 271c along fourth inclined surfaces 271e of the first fixed cam 271 and may move to fifth protrusions 271f. The first moving cam 291 may move the third distance Δd3 in the first axial direction D1, and the cam member 280 may not move in the axial directions. Accordingly, the first elastic member 293 may be compressed to a fourth length L4 less than the third length L3. For example, referring to FIG. 12, the torque structure 202, when viewed in the unfolding directions, may provide friction torque linearly increasing from the second friction torque Tf2 to the third friction torque Tf3 in the second section, and this may be related to the movement of the first moving cam 291.

In the free stop section, the cam member 280 and the first moving cam 291 may have fixed axial positions when an unfolding motion or a folding motion is performed. When the first arm cam 253 and the first moving cam 291 rotate in the free stop section, the first protruding surfaces 253b of the first protrusions 253 may remain making surface-to-surface contact with the second protruding surfaces 281b of the second protrusions 281a, and the third protruding surfaces 291b of the third protrusions 291a may remain making surface-to-surface contact with fifth protruding surfaces 271g of the fifth protrusions 271f. Accordingly, the length of the first elastic member 293 may remain constant in the third state S3 and the fourth state S4 included in the free stop section. For example, a fifth length L5 of the first elastic member 293 may be equal to the fourth length L4. For example, referring to FIG. 12, the torque structure 202 may provide the constant third friction torque Tf3 in the free stop section, and this may be related to the fixed axial positions of the first moving cam 291 and the cam member 280.

When an unfolding motion is performed from the fourth state S4 in the free stop section to the flat state Su (e.g., the unfolding detent section of FIG. 12), the first protrusions 253a of the first arm cam 253 may deviate from the second protruding surfaces 281b of the second protrusions 281a of the first cam 281 and may move along second inclined surfaces 281d. The third protruding surfaces 291b of the third protrusions 291a of the first moving cam 291 may rotate while maintaining surface-to-surface contact with the fifth protruding surfaces 271g of the fifth protrusions 271f of the first fixed cam 271. The cam member 280 may move in the first axial direction D1, and the first moving cam 291 may not move in the axial directions. Accordingly, as the unfolding motion is performed from the fourth state S4 to the flat state Su, the first elastic member 293 may be less compressed than in the fourth state S4. For example, referring to FIG. 12, the torque structure 202, when viewed in the unfolding directions, may provide friction torque linearly decreasing from the third friction torque Tf3 to the first friction torque Tf1 in the unfolding detent section, and this may be related to the movement of the cam member 280.

In the flat state Su, the first protrusions 253a of the first arm cam 253 may be located on the second inclined surfaces 281d of the second protrusions 281a of the first cam 281 of the cam member 280, and the third protrusions 291a of the first moving cam 291 may be located on the fifth protruding surfaces 271g of the fifth protrusions 271f of the first fixed cam 271. For example, the inclined surfaces 253c of the first protrusions 253a of the first arm cam 253 may make contact with the second inclined surfaces 281d of the second protrusions 281a of the first cam 281. The third protruding surfaces 291b of the third protrusions 291a of the first moving cam 291 may make contact with the fifth protruding surfaces 271g of the fifth protrusions 271f of the first fixed cam 271. The first elastic member 293 may have a sixth length L6 longer than the fifth length L5. In the flat state Su, the first elastic member 293 may be less compressed than in the first state S1, the second state S2, the third state S3, and the fourth state S4.

As the first elastic member 293 presses the cam member 280 in the first axial direction D1 and the first moving cam 291 in the second axial direction D2 in the flat state Su, rotational torque may be applied to the first arm cam 253 and the first moving cam 291 in the unfolding direction (e.g., the direction in which the angle A increases). Referring to FIGS. 6A-6C, as the first extending portion 212 of the first rotary structure 210 is supported by the fixed structure 230 in the flat state Su, the first arm cam 253 and the first moving cam 291 may no longer rotate in the unfolding direction despite the rotational torque in the unfolding direction (e.g., the counterclockwise direction of FIGS. 6A-6C). However, when the electronic device 100 deviates from the free stop section and is in a state between the fourth state S4 and the flat state Su, the rotational torque in the unfolding direction may rotate the first arm shaft 241, the first arm cam 253, and the first moving cam 291 in the unfolding direction such that the electronic device 100 is unfolded to the flat state Su. For example, the unfolding detent section illustrated in FIG. 12 may be provided by the rotational torque in the unfolding direction.

In various embodiments, the lengths of the first elastic member 293 may have the relation L1=L6>L2=L3>L4=L5 depending on the states.

However, without being necessarily limited thereto, L1 and L6 may differ from each other. Furthermore, L5 may be less than L4. For example, considering that the restoring torque of the display 140 acts in the unfolding directions, the torque structure 202 may be configured such that in the free stop section, friction torque increases along the unfolding directions (e.g., the directions in which the angle A increases). In this case, at least one of the first protrusions 253a or the second protrusions 281a and at least one of the third protrusions 291a or the fifth protrusions 271f may be formed such that the protruding surfaces include inclined surfaces having predetermined inclination angles.

Figure 14:
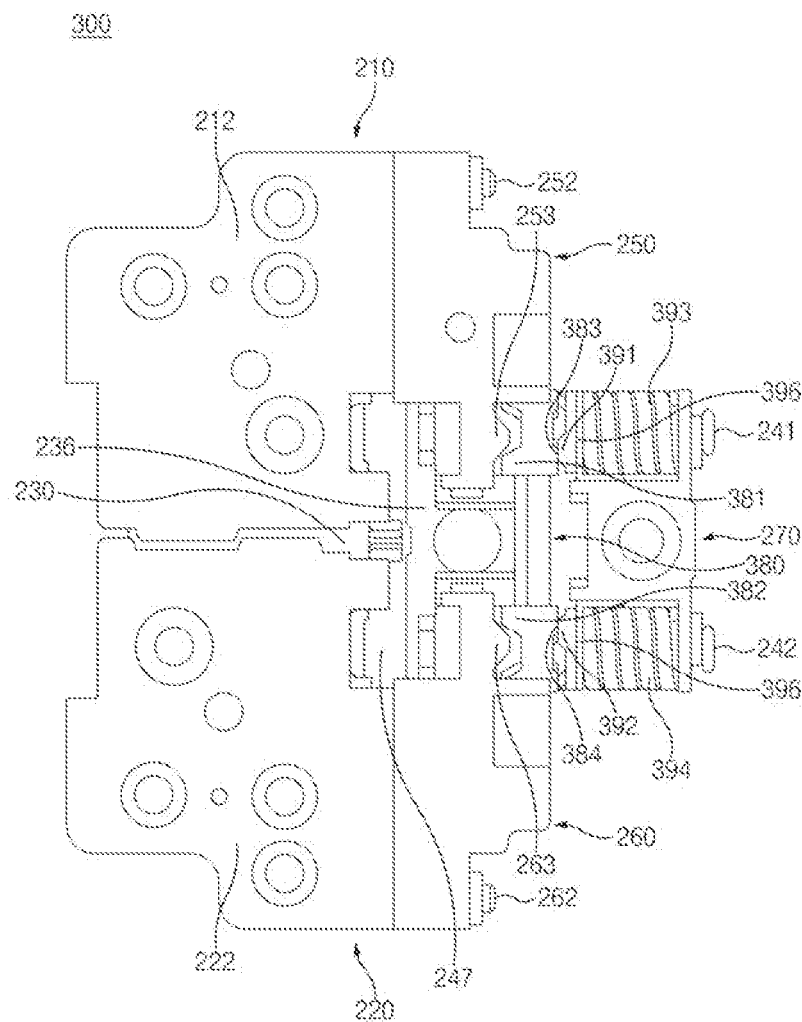
FIG. 14 is a view illustrating a hinge structure according to various embodiments.
Figure 15:
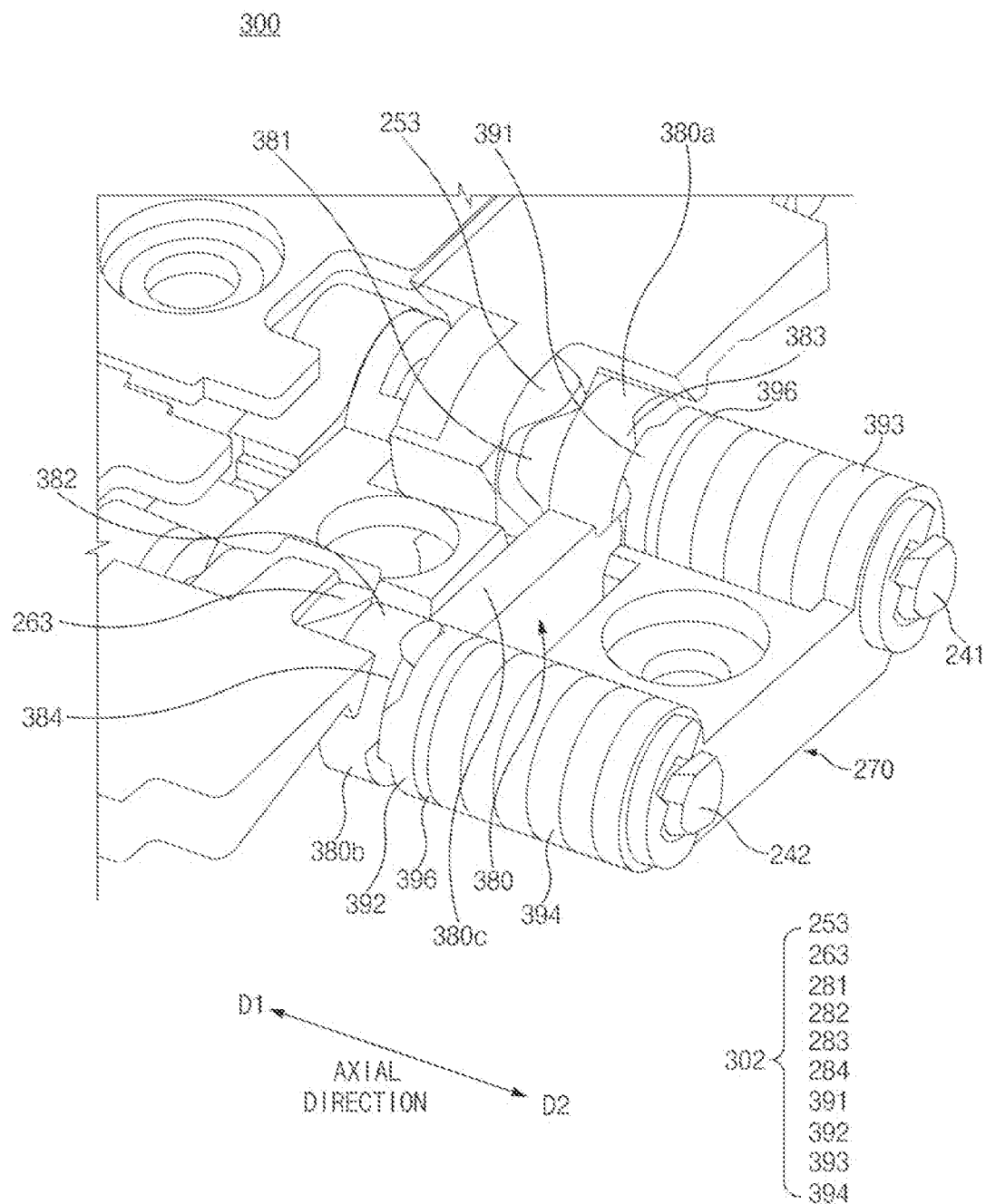
FIG. 15 is a view illustrating a hinge structure according to various embodiments.

FIG. 14 is a view illustrating a hinge structure according to various embodiments. FIG. 15 is a view illustrating a hinge structure according to various embodiments. In describing FIGS. 14 and 15, repetitive descriptions identical to ones given with reference to FIGS. 4A to 12 will be omitted, and the following description will be focused on a difference therebetween.

In an embodiment, the hinge structure 300 may include a fixed structure 230, a first rotary structure 210, a second rotary structure 220, a first arm shaft 241, a second arm shaft 242, a first arm 250, a second arm 260, a fixed member 270, a stopper 236, and the torque structure 302.

In an embodiment, referring to FIGS. 6A-7C, the first rotary structure 210 may be coupled to the fixed structure 230 so as to be rotatable about a first axis of rotation R1. The first arm 250 may operate in conjunction with the first rotary structure 210 through a first sliding pin 252 and may rotate about the first arm shaft 241 together with the first arm shaft 241. In an embodiment, the second rotary structure 220 may be coupled to the fixed structure 230 so as to be rotatable about a second axis of rotation R2. The second arm 260 may operate in conjunction with the second rotary structure 220 through a second sliding pin 262 and may rotate about the second arm shaft 242 together with the second arm shaft 242. In an embodiment, a first gear (e.g., the first gear 244 of FIG. 4B) of the first arm shaft 241 and a second gear (e.g., the second gear 245 of FIG. 4B) of the second arm shaft 242 may be connected through an even number of connecting gears (e.g., the connecting gears 246 of FIG. 4B), and accordingly the first arm shaft 241, the first rotary structure 210, and the first arm 250 may operate in conjunction with the second arm shaft 242, the second rotary structure 220, and the second arm 260 so as to rotate in the opposite direction by the same angle. In an embodiment, the fixed member 270 may be located in the second axial direction D2 from the fixed structure 230 to support rotation of the first arm shaft 241 and the second arm shaft 242. In an embodiment, the stopper 236 may be disposed between the first arm 250 and the second arm 260 and may make contact with a portion of the first arm 250 and a portion of the second arm 260. The stopper 236 may limit the range of rotation of the first arm 250 and the second arm 260 and accordingly, may limit the range of rotation of the first rotary structure 210, the second rotary structure 220, the first arm shaft 241, and the second arm shaft 242.

Referring to FIG. 15, in an embodiment, the torque structure 302 may include a first arm cam 253 formed on the first arm 250, a second arm cam 263 formed on the second arm 260, the cam member 380, the first moving cam 391, the second moving cam 392, the first elastic member 393, and the second elastic member 394. In an embodiment, the torque structure 302 (a structure for providing torque) may provide, to the first arm shaft 241 and the second arm shaft 242, friction torques acting about the first arm shaft 241 and the second arm shaft 242. For example, the torque structure 302 may provide torque corresponding to the restoring torque of the display 140.

In an embodiment, the first arm cam 253, a first cam 381 and a third cam 383 of the cam member 380, the first moving cam 391, and the first elastic member 393 may be coupled to, or located on, the first arm shaft 241. In an embodiment, the first arm cam 253 may rotate together with the first arm shaft 241. The first moving cam 391 may rotate together with the first arm shaft 241 and may linearly move in the axial directions.

In an embodiment, when the electronic device 100 and/or the hinge structure 300 is folded or unfolded, the first arm shaft 241, the first arm cam 253, and the first moving cam 391 may rotate. The cam member 380 may move in the first axial direction D1 or the second axial direction D2 depending on a coupling relationship between the first cam 381 and the first arm cam 253. The first moving cam 391 may move in the first axial direction D1 or the second axial direction D2 depending on a coupling relationship between the first moving cam 391 and the third cam 383 of the cam member 380. The first elastic member 393 may be compressed or uncompressed by the axial movement of the first moving cam 391.

In an embodiment, the second arm cam 263, a second cam 382 and a fourth cam 384 of the cam member 380, the second moving cam 392, and the second elastic member 394 may be coupled to, or located on, the second arm shaft 242. In an embodiment, the second arm cam 263 may rotate together with the second arm shaft 242. The second moving cam 392 may rotate together with the second arm shaft 242 and may linearly move in the axial directions.

In an embodiment, when the electronic device 100 and/or the hinge structure 300 is folded or unfolded, the second arm shaft 242, the second arm cam 263, and the second moving cam 392 may rotate. The cam member 380 may move in the first axial direction D1 or the second axial direction D2 depending on a coupling relationship between the second cam 382 and the second arm cam 263. The second moving cam 392 may move in the first axial direction D1 or the second axial direction D2 depending on a coupling relationship between the second moving cam 392 and the fourth cam 384 of the cam member 380. The second elastic member 394 may be compressed or uncompressed by the axial movement of the second moving cam 392.

In an embodiment, the cam member 380 may include a first portion 380a through which the first arm shaft 241 passes, a second portion 380b through which the second arm shaft 242 passes, and a connecting portion 380c connecting the first portion 380a and the second portion 380b. In an embodiment, the cam member 380 may be disposed between the arm cams 253 and 263 and the moving cams 391 and 392 and may move in the axial directions in response to rotation of the arm cams 253 and 263 and the moving cams 391 and 392.

In an embodiment, the cam member 380 may include the first cam 381 formed on the first portion 380a and engaged with the first arm cam 253, the third cam 383 formed on the first portion 380a and engaged with the first moving cam 391, the second cam 382 formed on the second portion 380b and engaged with the second arm cam 263, and the fourth cam 384 formed on the second portion 380b and engaged with the second moving cam 392. In various embodiments, the torque structure 302 may include the double-sided cam member 380 having the cams formed thereon in the first axial direction D1 and the second axial direction D2. For example, the first portion 380a may be disposed between the first arm cam 253 and the first moving cam 391, and the second portion 380b may be disposed between the second arm cam 263 and the second moving cam 392.

As the torque structure 302 of the hinge structure 300 according to an embodiment includes the cam member 380 having the cams formed thereon in the first axial direction D1 and the second axial direction D2, friction areas of the cam structures may be increased, and the increased friction areas may reduce wear of the cam structures. In addition, the number of components included in the torque structure 302 may be decreased, and thus the reliability of the hinge structure 300 and the assembly process thereof may be improved.

In an embodiment, the first elastic member 393 may be coupled to the first arm shaft 241. The first elastic member 393 may be disposed between the first moving cam 391 and the fixed member 270. For example, an end portion of the first elastic member 393 that faces the second axial direction D2 may be supported on the fixed member 270, and an end portion of the first elastic member 393 that faces the first axial direction D1 may be supported on the first moving cam 391. In an embodiment, the first elastic member 393 may be compressed or uncompressed in response to axial movements of the cam member 380 and the first moving cam 391. For example, the first elastic member 393 may be compressed when the cam member 380 and the first moving cam 391 move in the second axial direction D2 and may be uncompressed when the cam member 380 and the first moving cam 391 move in the first axial direction D1.

In an embodiment, the first elastic member 393 may press the first moving cam 391 in the first axial direction D1. The pressing force exerted by the first elastic member 393 may increase as the first elastic member 393 is further compressed. The pressing of the first moving cam 391 may increase the frictional force between the first arm cam 253 and the first cam 381 of the cam member 380 and the frictional force between the first moving cam 391 and the third cam 383 of the cam member 380. Increased friction torque may be applied to the first arm shaft 241 by the increased frictional forces. The torque structure 302 may include the cam structures having predetermined profiles to compress or uncompress the first elastic member 393 depending on sections or states.

In an embodiment, the second elastic member 394 may be coupled to the second arm shaft 242. The second elastic member 394 may be disposed between the second moving cam 392 and the fixed member 270. For example, an end portion of the second elastic member 394 that faces the second axial direction D2 may be supported on the fixed member 270, and an end portion of the second elastic member 394 that faces the first axial direction D1 may be supported on the second moving cam 392. In an embodiment, the second elastic member 394 may be compressed or uncompressed in response to axial movements of the cam member 380 and the second moving cam 392. For example, the second elastic member 394 may be compressed when the cam member 380 and the second moving cam 392 move in the second axial direction D2 and may be uncompressed when the cam member 380 and the second moving cam 392 move in the first axial direction D1.

In an embodiment, the second elastic member 394 may press the second moving cam 392 in the first axial direction D1. The pressing force exerted by the second elastic member 394 may increase as the second elastic member 394 is further compressed. The pressing of the second moving cam 392 may increase the frictional force between the second arm cam 263 and the second cam 382 of the cam member 380 and the frictional force between the second moving cam 392 and the fourth cam 384 of the cam member 380. Increased friction torque may be applied to the second arm shaft 242 by the increased frictional forces. The torque structure 302 may include the cam structures having predetermined profiles to compress or uncompress the second elastic member 394 depending on sections or states.

In an embodiment, a support plate 396 may be disposed between the elastic members 393 and 394 and the moving cams 391 and 392. The support plate 396, together with the moving cams 391 and 392, may linearly move in the axial directions. The support plate 396 may be coupled to the first arm shaft 241 and the second arm shaft 242. One area (e.g., the first area 296a of FIGS. 11A and 11B) of the support plate 396 may be located between the first elastic member 393 and the first moving cam 391, and another area (e.g., the second area 296b of FIGS. 11A and 11B) of the support plate 396 may be located between the second elastic member 394 and the second moving cam 392. The support plate 396 may transmit pressing forces by the first moving cam 391 and the second moving cam 392 to the first elastic member 393 and the second elastic member 394 such that the first elastic member 393 and the second elastic member 394 are compressed or uncompressed by the same length.

FIG. 16 is a view illustrating motions of a torque structure of a hinge structure according to various embodiments. FIG. 16 is a view illustrating motions of the torque structure depending on the angle A of the electronic device. For example, the torque structure illustrated in FIG. 16 may be another example for implementing the cam displacement illustrated in FIG. 12.

Although only the first arm shaft 241 and the structures 253, 381, 383, and 391 coupled to the first arm shaft 241 are illustrated in FIG. 16, the following description may be identically applied to the second arm shaft 242 and the structures 263, 382, 384, and 392 coupled to the second arm shaft 242. For example, descriptions of the first arm cam 253, the first cam 381, the third cam 383, the first moving cam 391, and the first elastic member 393 may be substantially identically applied to the second arm cam 263, the second cam 382, the fourth cam 384, the second moving cam 392, and the second elastic member 394.

Referring to FIG. 16, when an unfolding motion (e.g., a motion in which the angle A increases) and a folding motion (e.g., a motion in which the angle A decreases) are performed, the first arm cam 253 may rotate together with the first arm shaft 241. The cam member 380 may linearly move in the axial directions along the first arm shaft 241 in response to the rotation of the first arm cam 253. The first moving cam 391 may rotate together with the first arm shaft 241 and may linearly move in the axial directions along the first arm shaft 241 in response to the linear movement of the cam member 380. The first elastic member 393 may be compressed or uncompressed in response to the linear movement of the first moving cam 391 in the axial directions.

In the fully folded state Sf, first protrusions 253a of the first arm cam 253 may be located on first inclined surfaces 381c of second protrusions 381a of the first cam 381, and fourth protrusions 391a of the first moving cam 391 may be located on third protruding surfaces 383b of third protrusions 383a of the third cam 383 of the cam member 380. For example, inclined surfaces 253c of the first protrusions 253a of the first arm cam 253 may make contact with the first inclined surfaces 381c of the second protrusions 381a of the first cam 381. Fourth protruding surfaces 391b of the first moving cam 391 may make surface-to-surface contact with the third protruding surfaces 383b of the third cam 383. The first elastic member 393 may have a first length L1 longer than a second length L2. In the fully folded state Sf, the first elastic member 393 may be less compressed than in the first state S1, the second state S2, the third state S3, and the fourth state S4.

In the fully folded state Sf, the first elastic member 393 may press the first moving cam 391 and the cam member 380 in the first axial direction D1, and rotational torque may be applied to the first arm cam 253 and the first moving cam 391 in the folding direction. Referring to FIG. 2C, as the third edge P3 of the first housing 110 and the fourth edge P4 of the second housing 120 of the electronic device 100 are in contact with each other in the fully folded state Sf, the first arm cam 253 and the first moving cam 391 can no longer rotate in the folding direction despite the rotational torque in the folding direction. However, when the electronic device 100 is in a state between the fully folded state Sf and the first state S1, the rotational torque in the folding direction may rotate the first arm shaft 241, the first arm cam 253, and the first moving cam 391 in the folding direction such that the electronic device 100 is folded to the fully folded state Sf. For example, the folding detent section illustrated in FIG. 12 may be provided by the rotational torque in the folding direction.

When an unfolding motion is performed from the fully folded state Sf to the first state S1 (e.g., the folding detent section of FIG. 12), the first protrusions 253a of the first arm cam 253 may move along the first inclined surfaces 381c of the second protrusions 381a of the first cam 381, and the fourth protrusions 391a of the first moving cam 391 may move along the third protruding surfaces 383b of the third protrusions 383a of the third cam 383. The first protrusions 253a may move closer to second protruding surfaces 381b along the first inclined surfaces 381c of the second protrusions 381a of the first cam 381. By the movement of the first protrusions 253a, the cam member 380 may move in the second axial direction D2, and the first elastic member 393 may be compressed. For example, referring to FIG. 12, the torque structure 302, when viewed in the unfolding directions (e.g., the directions in which the angle A increases), may provide friction torque linearly increasing from the first friction torque Tf1 to the second friction torque Tf2 in the folding detent section, and this may be related to the movement of the cam member 380.

In the first state S1, the first protrusions 253a of the first arm cam 253 may be located on the first inclined surfaces 381c of the second protrusions 381a of the first cam 381 of the cam member 380, and the fourth protrusions 391a of the first moving cam 391 may be located on the third protruding surfaces 383b of the third protrusions 383a of the third cam 383 of the cam member 380. For example, the inclined surfaces 253c of the first protrusions 253a of the first arm cam 253 may make contact with the first inclined surfaces 381c of the second protrusions 381a of the first cam 381. The fourth protruding surfaces 391b of the fourth protrusions 391a of the first moving cam 391 may make surface-to-surface contact with the third protruding surfaces 383b of the third protrusions 383a of the third cam 383. In the first state S1, the first elastic member 393 may have the second length L2 less than the first length L1. For example, in the first state S1, the first elastic member 393 may be more compressed by the movement of the cam member 380 than in the fully folded state Sf. The change (L1−L2) in the length of the first elastic member 393 may be substantially the same as the distance (Δd1−Δd2) that the cam member 380 moves in the second axial direction D2.

When an unfolding motion is performed from the first state S1 to the second state S2 (e.g., the first section of FIG. 12), the first protrusions 253a of the first arm cam 253 may move to the second protruding surfaces 381b of the second protrusions 381a along the first inclined surfaces 381c of the second protrusions 381a of the first cam 381. The fourth protrusions 391a of the first moving cam 391 may move into third depressions 383c along third inclined surfaces 383d of the third cam 383. The cam member 380 may move in the second axial direction D2, and the first moving cam 391 may move in the first axial direction D1. In various embodiments, the movement of the cam member 380 in the second axial direction D2 and the movement of the first moving cam 391 in the first axial direction D1 may be substantially simultaneously performed. In various embodiments, in the unfolding motion from the first state S1 to the second state S2, the axial travel distances of the cam member 380 and the first moving cam 391 may be substantially the same as each other. For example, in the unfolding motion from the first state S1 to the second state S2, the cam member 380 may move the second distance Δd2, and the first moving cam 391 may move the third distance Δd3. The second distance Δd2 may be equal to the third distance Δd3. For example, referring to FIG. 12, the torque structure 302 may provide the constant second friction torque Tf2 in the first section, and this may be related to the movements of the cam member 380 and the first moving cam 391.

In the second state S2, the first protrusions 253a of the first arm cam 253 may be located on the second protruding surfaces 381b of the second protrusions 381a of the first cam 381 of the cam member 380. The fourth protrusions 391a of the first moving cam 391 may be located in the third depressions 383c of the third cam 383 of the cam member 380. For example, first protruding surfaces 253b of the first protrusions 253a may make surface-to-surface contact with the second protruding surfaces 381b of the first cam 381. The fourth protrusions 391a of the first moving cam 391 may be at least partially accommodated in the third depressions 383c. In the second state S2, the first elastic member 393 may have a third length L3. In various embodiments, the third length L3 may be substantially the same as the second length L2.

The free stop section may include the third state S3, the fourth state S4, and a state between the third state S3 and the fourth state S4.

When an unfolding motion is performed from the second state S2 to the third state S3 (e.g., the second section of FIG. 12), the first protrusions 253a of the first arm cam 253 may move along the second protruding surfaces 381b of the second protrusions 381a of the first cam 381. The first arm cam 253 may rotate relative to the cam member 380 in the state in which the first protruding surfaces 253b and the second protruding surfaces 381b make surface-to-surface contact with each other. The fourth protrusions 391a of the first moving cam 391 may move out of the third depressions 383c along fourth inclined surfaces 383e of the third cam 383 of the cam member 380 and may move to fifth protrusions 383f. The first moving cam 391 may move the third distance Δd3 in the second axial direction D2, and the cam member 380 may not move in the axial directions. Accordingly, the first elastic member 393 may be compressed to a fourth length L4 less than the third length L3. For example, referring to FIG. 12, the torque structure 302, when viewed in the unfolding directions (e.g., the directions in which the angle A increases), may provide friction torque linearly increasing from the second friction torque Tf2 to the third friction torque Tf3 in the second section, and this may be related to the movement of the first moving cam 391.

In the free stop section, the cam member 380 and the first moving cam 391 may have fixed axial positions when an unfolding motion or a folding motion is performed. When the first arm cam 253 and the first moving cam 391 rotate in the free stop section, the first protruding surfaces 253b of the first protrusions 253a of the first arm cam 253 may remain making surface-to-surface contact with the second protruding surfaces 381b of the second protrusions 381a, and the fourth protruding surfaces 391b of the fourth protrusions 391a of the first moving cam 391 may remain making surface-to-surface contact with fifth protruding surfaces 383g of the fifth protrusions 383f. Accordingly, the length of the first elastic member 393 may remain constant in the third state S3 and the fourth state S4 included in the free stop section. For example, a fifth length L5 of the first elastic member 393 may be equal to the fourth length L4. For example, referring to FIG. 12, the torque structure 302 may provide the constant third friction torque Tf3 in the free stop section, and this may be related to the fixed axial positions of the first moving cam 391 and the cam member 380.

When an unfolding motion (e.g., a motion in which the angle A increases) is performed from the fourth state S4 in the free stop section to the flat state Su (e.g., the unfolding detent section of FIG. 12), the first protrusions 253a of the first arm cam 253 may deviate from the second protruding surfaces 381b of the second protrusions 381a of the first cam 381 and may move along second inclined surfaces 381d. The first moving cam 391 may rotate while the fourth protruding surfaces 391b of the fourth protrusions 391a maintain surface-to-surface contact with the fifth protruding surfaces 383g of the fifth protrusions 383f of the third cam 383. The cam member 380 may move in the first axial direction, and the first moving cam 391 may not move in the axial directions. Accordingly, as the unfolding motion is performed from the fourth state S4 to the flat state Su, the first elastic member 393 may be less compressed than in the fourth state S4. For example, referring to FIG. 12, the torque structure 302, when viewed in the unfolding directions, may provide friction torque linearly decreasing from the third friction torque Tf3 to the first friction torque Tf1 in the unfolding detent section, and this may be related to the movement of the cam member 380.

In the flat state Su, the first protrusions 253a of the first arm cam 253 may be located on the second inclined surfaces 381d of the second protrusions 381a of the first cam 381 of the cam member 380, and the fourth protrusions 391a of the first moving cam 391 may be located on the fifth protruding surfaces 383g of the fifth protrusions 383f of the third cam 383. For example, the inclined surfaces 253c of the first protrusions 253a of the first arm cam 253 may make contact with the second inclined surfaces 381d of the second protrusions 381a of the first cam 381. The fourth protruding surfaces 391b of the first moving cam 391 may make contact with the fifth protruding surfaces 383g of the third cam 383 of the cam member 380. The first elastic member 393 may have a sixth length L6 longer than the fifth length L5. In the flat state Su, the first elastic member 393 may be less compressed than in the first state S1, the second state S2, the third state S3, and the fourth state S4.

In the flat state Su, the first elastic member 393 may press the first moving cam 391 and the cam member 380 in the first axial direction D1, and rotational torque may be applied to the first arm cam 253 and the first moving cam 391 in the unfolding direction. Referring to FIGS. 6A-6C, as the first extending portion 212 of the first rotary structure 210 is supported by the fixed structure 230 in the flat state, the first arm cam 253 and the first moving cam 391 can no longer rotate in the unfolding direction despite the rotational torque in the unfolding direction. However, when the electronic device 100 deviates from the free stop section and is in a state between the fourth state S4 and the flat state Su, the rotational torque in the unfolding direction may rotate the first arm shaft 241, the first arm cam 253, and the first moving cam 391 in the unfolding direction such that the electronic device 100 is unfolded to the flat state Su. For example, the unfolding detent section illustrated in FIG. 12 may be provided by the rotational torque in the unfolding direction.

In various embodiments, the lengths of the first elastic member 393 may have the relation L1=L6>L2=L3>L4=L5 depending on the states.

However, without being necessarily limited thereto, L1 and L6 may differ from each other. Furthermore, L5 may be less than L4. For example, considering that the restoring torque of the display 140 acts in the unfolding directions (e.g., the directions in which the angle A increases), the torque structure 302 may be configured such that in the free stop section, friction torque increases along the unfolding directions. In this case, at least one of the first protrusions 253a or the second protrusions 381a in contact with each other in the free stop section and at least one of the fourth protrusions 391a or the fifth protrusions 383f may be formed such that the protruding surfaces include inclined surfaces having predetermined inclination angles.

Figure 17:
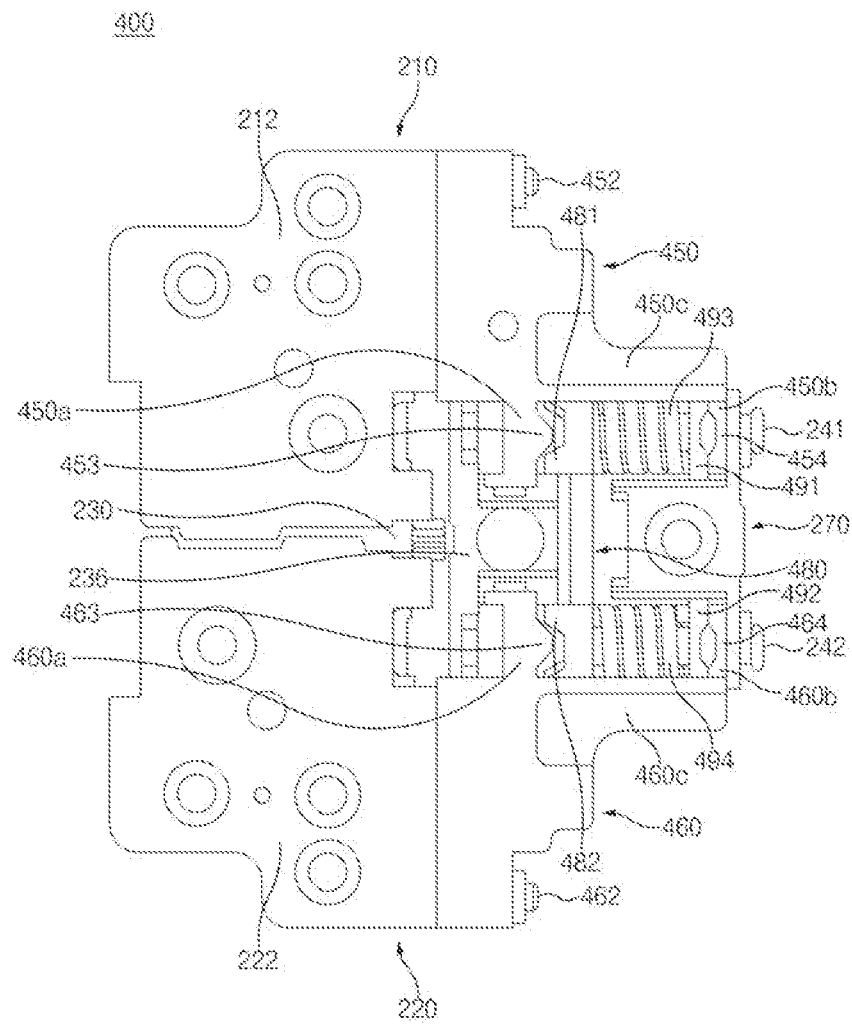
FIG. 17 is a view illustrating a hinge structure according to various embodiments.
Figure 18:
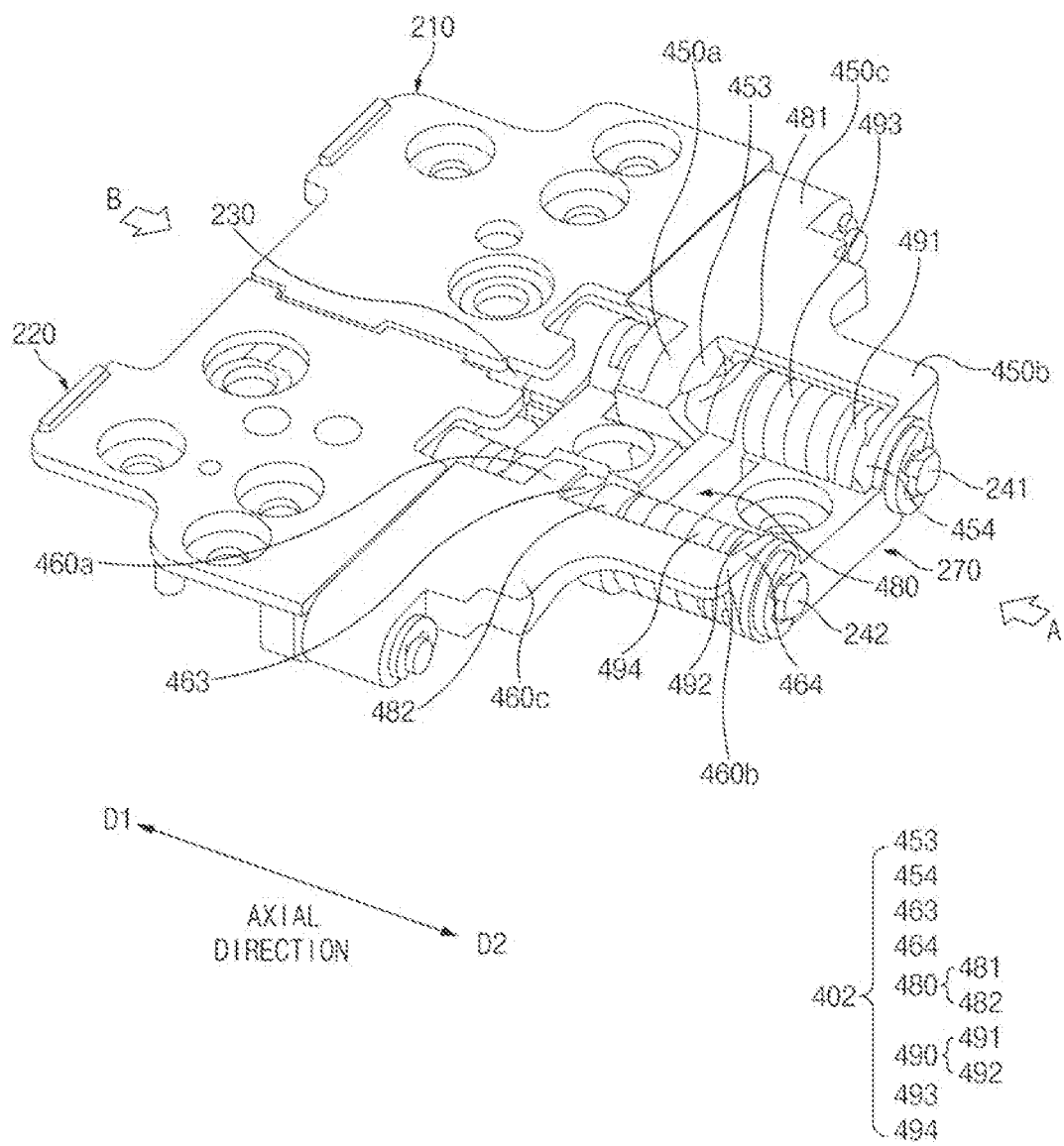
FIG. 18 is a view illustrating a hinge structure according to various embodiments.
Figure 19A:
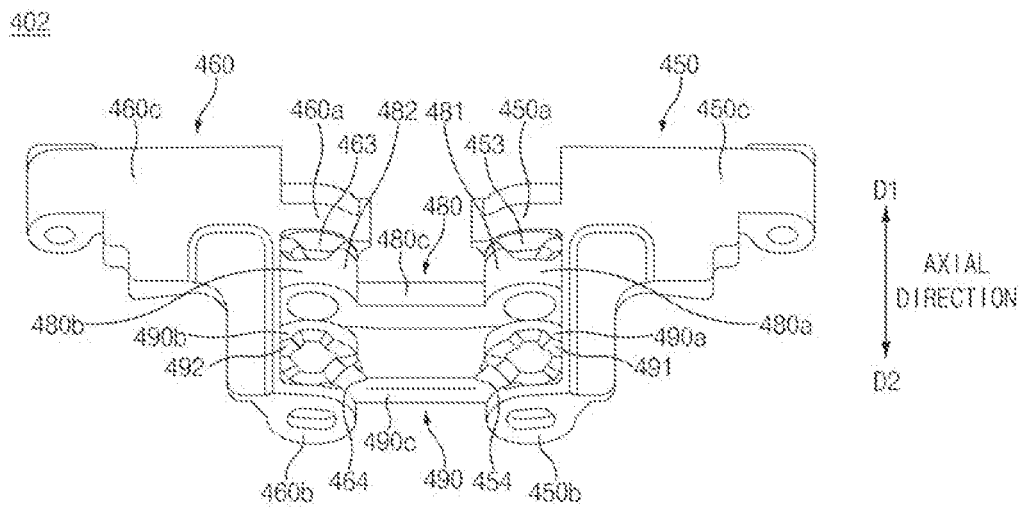
FIGS. 19A and 19B are views illustrating a torque structure of a hinge structure according to various embodiments.
Figure 19B:
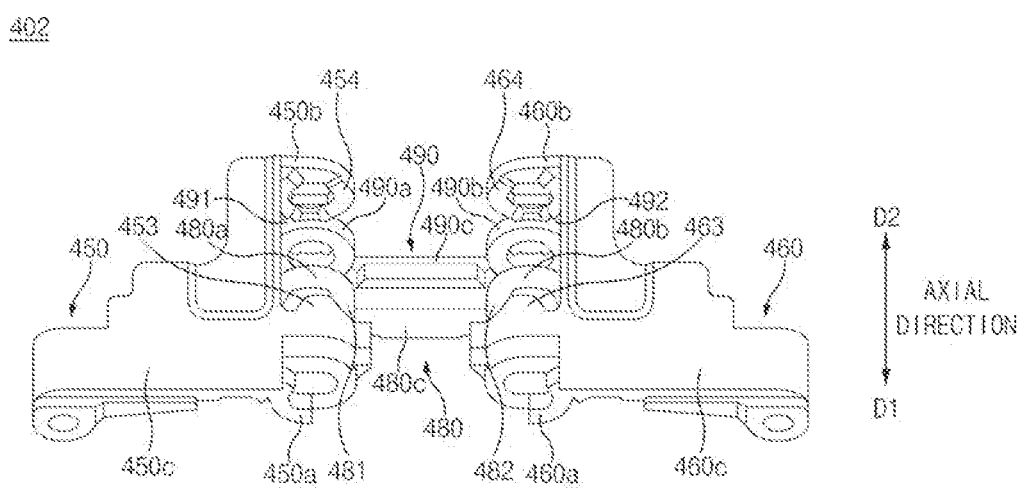

FIG. 17 is a view illustrating a hinge structure according to various embodiments. FIG. 18 is a view illustrating a hinge structure according to various embodiments. FIGS. 19A and 19B are views illustrating a torque structure of a hinge structure according to various embodiments. FIG. 19A is a view of the hinge structure 400 illustrated in FIG. 18 as viewed in direction A (e.g., the second axial direction D2). FIG. 19B is a view of the hinge structure 400 illustrated in FIG. 18 as viewed in direction B (e.g., the first axial direction D1).

In describing FIGS. 17, 18, and 19, repetitive descriptions identical to ones given with reference to FIGS. 4A to 12 will be omitted, and the following description will be focused on a difference therebetween.

In an embodiment, the hinge structure 400 may include a fixed structure 230, a first rotary structure 210, a second rotary structure 220, a first arm shaft 241, a second arm shaft 242, a first arm 450, a second arm 460, a fixed member 270, a stopper 236, and the torque structure 402.

In an embodiment, referring to FIGS. 6 and 7 together, the first rotary structure 210 may be coupled to the fixed structure 230 so as to be rotatable about a first axis of rotation R1. The first arm 450 may operate in conjunction with the first rotary structure 210 through a first sliding pin 452 and may rotate about the first arm shaft 241 together with the first arm shaft 241. In an embodiment, the second rotary structure 220 may be coupled to the fixed structure 230 so as to be rotatable about a second axis of rotation R2. The second arm 460 may operate in conjunction with the second rotary structure 220 through a second sliding pin 462 and may rotate about the second arm shaft 242 together with the second arm shaft 242. In an embodiment, a first gear (e.g., the first gear 244 of FIG. 4B) of the first arm shaft 241 and a second gear (e.g., the second gear 245 of FIG. 4B) of the second arm shaft 242 may be connected through an even number of connecting gears (e.g., the connecting gears 246 of FIG. 4B), and accordingly the first arm shaft 241, the first rotary structure 210, and the first arm 450 may operate in conjunction with the second arm shaft 242, the second rotary structure 220, and the second arm 460 so as to rotate in the opposite direction by the same angle. In an embodiment, the fixed member 270 may be located in the second axial direction D2 from the fixed structure 230 to support rotation of the first arm shaft 241 and the second arm shaft 242. In an embodiment, the stopper 236 may be disposed between the first arm 450 and the second arm 460 and may make contact with a portion of the first arm 450 and a portion of the second arm 460. The stopper 236 may limit the range of rotation of the first arm 450 and the second arm 460 and accordingly, may limit the range of rotation of the first rotary structure 210, the second rotary structure 220, the first arm shaft 241, and the second arm shaft 242.

Referring to FIGS. 17-19B, the first arm 450 may include a first coupling portion 450a and a second coupling portion 450b that are coupled to the first arm shaft 241 and a first extending portion 450c that extends from the first coupling portion 450a and the second coupling portion 450b. For example, a first arm cam 453 may be formed on the first coupling portion 450a, and a second arm cam 454 may be formed on the second coupling portion 450b. The first sliding pin 452 may be inserted into the first extending portion 450c. The first extending portion 450c may operate in conjunction with rotation of the first rotary structure 210 through the first sliding pin 452, and when the first extending portion 450c rotates, the first coupling portion 450a and the second coupling portion 450b may rotate together with the first arm shaft 241. The first arm cam 453 and the second arm cam 454 may rotate together with the first arm shaft 241 and the first arm 450.

Referring to FIGS. 17 to 19B, the second arm 460 may include a third coupling portion 460a and a fourth coupling portion 460b that are coupled to the second arm shaft 242 and a second extending portion 460c that extends from the third coupling portion 460a and the fourth coupling portion 460b. For example, a third arm cam 463 may be formed on the third coupling portion 460a, and a fourth arm cam 464 may be formed on the fourth coupling portion 460b. The second sliding pin 462 may be inserted into the second extending portion 460c. The second extending portion 460c may operate in conjunction with rotation of the second rotary structure 220 through the second sliding pin 462, and when the second extending portion 460c rotates, the third coupling portion 460a and the fourth coupling portion 460b may rotate together with the second arm shaft 242. The third arm cam 463 and the fourth arm cam 464 may rotate together with the second arm shaft 242 and the second arm 460.

In an embodiment, the torque structure 402 may include the first arm cam 453, the second arm cam 454, the third arm cam 463, the fourth arm cam 464, the first cam member 480, the second cam member 490, the first elastic member 493, and the second elastic member 494. In an embodiment, the torque structure 402 (a structure for providing torque) may provide, to the first arm shaft 241 and the second arm shaft 242, friction torques acting about the first arm shaft 241 and the second arm shaft 242. For example, the torque structure 402 may provide torque corresponding to the restoring torque of the display 140.

In an embodiment, the first cam member 480 may include a first portion 480a through which the first arm shaft 241 passes, a second portion 480b through which the second arm shaft 242 passes, and a first connecting portion 480c connecting the first portion 480a and the second portion 480b. In an embodiment, a first cam 481 engaged with the first arm cam 453 may be formed on the first portion 480a of the first cam member 480, and a second cam 482 engaged with the third arm cam 463 may be formed on the second portion 480b of the first cam member 480. In an embodiment, the first cam member 480 may linearly move in the axial directions in response to rotation of the first arm cam 453 and the third arm cam 463.

In an embodiment, the second cam member 490 may include a third portion 490a through which the first arm shaft 241 passes, a fourth portion 490b through which the second arm shaft 242 passes, and a second connecting portion 490c connecting the third portion 490a and the fourth portion 490b. In an embodiment, a third cam 491 engaged with the second arm cam 454 may be formed on the third portion 490a of the second cam member 490, and a fourth cam 492 engaged with the fourth arm cam 464 may be formed on the fourth portion 490b of the second cam member 490. In an embodiment, the second cam member 490 may linearly move in the axial directions in response to rotation of the second arm cam 454 and the fourth arm cam 464.

In an embodiment, when viewed in the second axial direction D2, the first arm cam 453, the first cam 481 of the first cam member 480, the first elastic member 493, the third cam 491 of the second cam member 490, and the second arm cam 454 may be disposed on the first arm shaft 241. The first arm cam 453 and the second arm cam 454 may rotate together with the first arm shaft 241, and the first cam 481 and the third cam 491 may linearly move in the axial directions in response to rotation of the first arm cam 453 and the second arm cam 454.

In an embodiment, the first elastic member 493 may be coupled to the first arm shaft 241. The first elastic member 493 may be disposed between the first portion 480a of the first cam member 480 and the third portion 490a of the second cam member 490. For example, an end portion of the first elastic member 493 that faces the first axial direction D1 may be supported on the first portion 480a of the first cam member 480, and an end portion of the first elastic member 493 that faces the second axial direction D2 may be supported on the third portion 490a of the second cam member 490. In an embodiment, the first elastic member 493 may be compressed or uncompressed as the gap between the first cam member 480 and the second cam member 490 varies. For example, the first elastic member 493 may be uncompressed when the first cam member 480 moves in the first axial direction D1 and the second cam member 490 moves in the second axial direction D2 and may be compressed when the first cam member 480 moves in the second axial direction D2 and the second cam member 490 moves in the first axial direction D1.

In an embodiment, the first elastic member 493 may press the first cam member 480 in the first axial direction D1 and may press the second cam member 490 in the second axial direction D2. The pressing force exerted by the first elastic member 493 may increase as the first elastic member 493 is further compressed. The pressing of the first cam member 480 and the second cam member 490 may increase the frictional force between the first arm cam 453 and the first cam 481 of the first cam member 480 and the frictional force between the second arm cam 454 and the third cam 491 of the second cam member 490. Increased friction torque may be applied to the first arm shaft 241 by the increased frictional forces. The torque structure 402 may include the cam structures having predetermined profiles to compress or uncompress the first elastic member 493 depending on sections or states.

In an embodiment, when viewed in the second axial direction D2, the third arm cam 463, the second cam 482 of the first cam member 480, the second elastic member 494, the fourth cam 492 of the second cam member 490, and the fourth arm cam 464 may be disposed on the second arm shaft 242. The third arm cam 463 and the fourth arm cam 464 may rotate together with the second arm shaft 242, and the second cam 482 and the fourth cam 492 may linearly move in the axial directions in response to the rotation of the third arm cam 463 and the fourth arm cam 464.

In an embodiment, the second elastic member 494 may be coupled to the second arm shaft 242. The second elastic member 494 may be disposed between the second portion 480b of the first cam member 480 and the fourth portion 490b of the second cam member 490. For example, an end portion of the second elastic member 494 that faces the first axial direction D1 may be supported on the second portion 480b of the first cam member 480, and an end portion of the second elastic member 494 that faces the second axial direction D2 may be supported on the fourth portion 490b of the second cam member 490. In an embodiment, the second elastic member 494 may be compressed or uncompressed as the gap between the first cam member 480 and the second cam member 490 varies. For example, the second elastic member 494 may be uncompressed when the first cam member 480 moves in the first axial direction D1 and the second cam member 490 moves in the second axial direction D2 and may be compressed when the first cam member 480 moves in the second axial direction D2 and the second cam member 490 moves in the first axial direction D1.

In an embodiment, the second elastic member 494 may press the first cam member 480 in the first axial direction D1 and may press the second cam member 490 in the second axial direction D2. The pressing force exerted by the second elastic member 494 may increase as the second elastic member 494 is further compressed. The pressing of the first cam member 480 and the second cam member 490 may increase the frictional force between the third arm cam 463 and the second cam 482 of the first cam member 480 and the frictional force between the fourth arm cam 464 and the fourth cam 492 of the second cam member 490. Increased friction torque may be applied to the second arm shaft 242 by the increased frictional forces. The torque structure 402 may include the cam structures having predetermined profiles to compress or uncompress the second elastic member 494 depending on sections or states.

The torque structure 402 illustrated in FIGS. 17-19B may include the rotary cam structures (e.g., the first arm cam 453, the second arm cam 454, the third arm cam 463, and the fourth arm cam 464) that perform only rotary motion and the linear cam structures (e.g., the first cam member 480 and the second cam member 490) that perform only linear motion. For example, the torque structures 202 and 302 illustrated in FIGS. 3 to 16 may include the moving cams 291, 292, 391, and 392 capable of performing both rotary motion and linear motion.

FIG. 20 is a view illustrating motions of the torque structure of a hinge structure according to various embodiments.

Although only the first arm shaft 241 and the structures 453, 481, 491, and 454 coupled to the first arm shaft 241 are illustrated in FIG. 20, the following description may be identically applied to the second arm shaft 242 and the structures 463, 482, 492, and 464 coupled to the second arm shaft 242. For example, descriptions of the first arm cam 453, the second arm cam 454, the first cam 481 of the first cam member 480, the third cam 491 of the second cam member 490, and the first elastic member 493 may be substantially identically applied to the third arm cam 463, the fourth arm cam 464, the second cam 482 of the first cam member 480, the fourth cam 492 of the second cam member 490, and the second elastic member 494.

Referring to FIG. 20, when an unfolding motion and a folding motion are performed, the first arm cam 453 and the second arm cam 454 may rotate together with the first arm shaft 241. The first cam member 480 may linearly move in the axial directions along the first arm shaft 241 in response to the rotation of the first arm cam 453, and the second cam member 490 may linearly move in the axial directions along the first arm shaft 241 in response to the rotation of the second arm cam 454. The first elastic member 493 may be compressed or uncompressed in response to the linear movements of the first cam member 480 and the second cam member 490.

In the fully folded state Sf, first protrusions 453a of the first arm cam 453 may be located on first inclined surfaces 481c of second protrusions 481a of the first cam 481 of the first cam member 480, and fourth protrusions 454a of the second arm cam 454 may be located on third protruding surfaces 491b of third protrusions 491a of the third cam 491 of the second cam member 490. For example, inclined surfaces 453c of the first protrusions 453a of the first arm cam 453 may make contact with the first inclined surfaces 481c of the second protrusions 481a of the first cam 481. Fourth protruding surfaces 454b of the second arm cam 454 may make surface-to-surface contact with the third protruding surfaces 491b of the third cam 491. The first elastic member 493 may have a first length L1 longer than a second length L2. In the fully folded state Sf, the first elastic member 493 may be less compressed than in the first state S1, the second state S2, the third state S3, and the fourth state S4.

In the fully folded state Sf, the first elastic member 493 may press the first cam member 480 and the second cam member 490, and rotational torque may be applied to the first arm cam 453 and the second arm cam 454 in the folding direction. Referring to FIG. 2C, as the third edge P3 of the first housing 110 and the fourth edge P4 of the second housing 120 of the electronic device 100 are in contact with each other in the fully folded state Sf, the first arm cam 453 and the second arm cam 454 can no longer rotate in the folding direction despite the rotational torque in the folding direction. However, when the electronic device 100 is in a state between the fully folded state Sf and the first state S1, the rotational torque in the folding direction may rotate the first arm shaft 241, the first arm cam 453, and the second arm cam 454 in the folding direction such that the electronic device 100 is folded to the fully folded state Sf. For example, the folding detent section illustrated in FIG. 12 may be provided by the rotational torque in the folding direction.

When an unfolding motion is performed from the fully folded state Sf to the first state S1 (e.g., the folding detent section of FIG. 12), the first protrusions 453a of the first arm cam 453 may move along the first inclined surfaces 481c of the second protrusions 481a of the first cam 481, and the fourth protrusions 454a of the second arm cam 454 may move along the third protruding surfaces 491b of the third protrusions 491a of the third cam 491. The first protrusions 453a may move closer to second protruding surfaces 481b along the first inclined surfaces 481c of the second protrusions 481a of the first cam 481. By the movement of the first protrusions 453a, the first cam member 480 may move in the second axial direction D2, and the first elastic member 493 may be compressed. For example, referring to FIG. 12, the torque structure 402, when viewed in the unfolding directions, may provide friction torque linearly increasing from the first friction torque Tf1 to the second friction torque Tf2 in the folding detent section, and this may be related to the movement of the first cam member 480.

In the first state S1, the first protrusions 453a of the first arm cam 453 may be located on the first inclined surfaces 481c of the second protrusions 481a of the first cam 481 of the first cam member 480, and the fourth protrusions 454a of the second arm cam 454 may be located on the third protruding surfaces 491b of the third protrusions 491a of the third cam 491 of the second cam member 490. For example, the inclined surfaces of the first protrusions 453a of the first arm cam 453 may make contact with the first inclined surfaces 481c of the second protrusions 481a of the first cam 481. The fourth protruding surfaces 454b of the fourth protrusions 454a of the second arm cam 454 may make surface-to-surface contact with the third protruding surfaces 491b of the third cam 491 of the second cam member 490. In the first state S1, the first elastic member 493 may have the second length L2 less than the first length L1. For example, in the first state S1, the first elastic member 493 may be more compressed by the movement of the first cam member 480 than in the fully folded state Sf. The change (L1−L2) in the length of the first elastic member 493 may be substantially the same as the distance (Δd1−Δd2) that the first cam member 480 moves in the second axial direction D2.

When an unfolding motion is performed from the first state S1 to the second state S2 (e.g., the first section of FIG. 12), the first protrusions 453a of the first arm cam 453 may move to the second protruding surfaces 481b of the second protrusions 481a along the first inclined surfaces 481c of the second protrusions 481a of the first cam 481. The fourth protrusions 454a of the second arm cam 454 may move into third depressions 491c along third inclined surfaces 491d of the third cam 491. The first cam member 480 may move in the second axial direction D2, and the second cam member 490 may move in the second axial direction D2. In various embodiments, the movements of the first cam member 480 and the second cam member 490 in the second axial direction D2 may be substantially simultaneously performed. In various embodiments, in the unfolding motion from the first state S1 to the second state S2, the axial travel distances of the first cam member 480 and the second cam member 490 may be substantially the same as each other. For example, in the unfolding motion from the first state S1 to the second state S2, the first cam member 480 may move the second distance Δd2, and the second cam member 490 may move the third distance Δd3. The second distance Δd2 may be equal to the third distance Δd3. For example, referring to FIG. 12, the torque structure 402 may provide the constant second friction torque Tf2 in the first section, and this may be implemented by a combination of the first cam member 480 and the second cam member 490.

In the second state S2, the first protrusions 453a of the first arm cam 453 may be located on the second protruding surfaces 481b of the second protrusions 481a of the first cam 481 of the first cam member 480. The fourth protrusions 454a of the second arm cam 454 may be at least partially located in the third depressions 491c of the third cam 491 of the second cam member 490. For example, first protruding surfaces 453b of the first protrusions 453a may make surface-to-surface contact with the second protruding surfaces 481b of the first cam 481. In the second state S2, the first elastic member 493 may have a third length L3. In various embodiments, the third length L3 may be substantially the same as the second length L2.

The free stop section may include the third state S3, the fourth state S4, and a state between the third state S3 and the fourth state S4.

When an unfolding motion is performed from the second state S2 to the third state S3 (e.g., the second section of FIG. 12), the first protrusions 453a of the first arm cam 453 may move along the second protruding surfaces 481b of the second protrusions 481a of the first cam 481. The first arm cam 453 may rotate relative to the first cam member 480 in the state in which the first protruding surfaces 453b and the second protruding surfaces 481b make surface-to-surface contact with each other. The fourth protrusions 454a of the second arm cam 454 may move out of the third depressions 491c along fourth inclined surfaces 491e of the third cam 491 of the second cam member 490 and may move to fifth protrusions 491f of the second cam member 490. The second cam member 490 may move the third distance $\Delta d3$ in the first axial direction D1, and the first cam member 480 may not move in the axial directions. Accordingly, the first elastic member 493 may be compressed to a fourth length L4 less than the third length L3. For example, referring to FIG. 12, the torque structure 402, when viewed in the unfolding directions, may provide friction torque linearly increasing from the second friction torque Tf2 to the third friction torque Tf3 in the second section, and this may be related to the movement of the second cam member 490.

In the free stop section, the first cam member 480 and the second cam member 490 may have fixed axial positions when an unfolding motion or a folding motion is performed. When the first arm cam 453 and the second arm cam 454 rotate in the free stop section, the first protruding surfaces 453b of the first protrusions 453a of the first arm cam 453 may remain making surface-to-surface contact with the second protruding surfaces 481b of the second protrusions 481a, and the fourth protruding surfaces 454b of the fourth protrusions 454a of the second arm cam 454 may remain making surface-to-surface contact with fifth protruding surfaces 491g of the fifth protrusions 491f. Accordingly, the length of the first elastic member 493 may remain constant in the third state S3 and the fourth state S4 included in the free stop section. For example, a fifth length L5 of the first elastic member 493 may be equal to the fourth length L4. For example, referring to FIG. 12, the torque structure 402 may provide the constant third friction torque Tf3 in the free stop section, and this may be related to the fixed axial positions of the first cam member 480 and the second cam member 490.

When an unfolding motion is performed from the fourth state S4 in the free stop section to the flat state Su (e.g., the unfolding detent section of FIG. 12), the first arm cam 453 may rotate such that the first protrusions 453a of the first arm cam 453 deviate from the second protruding surfaces 481b of the first cam 481 of the first cam member 480 and move along second inclined surfaces 481d. The second arm cam 454 may rotate such that the fourth protruding surfaces 454b of the fourth protrusions 454a maintain surface-to-surface contact with the fifth protruding surfaces 491g of the fifth protrusions 491f of the third cam 491. The first cam member 480 may move in the first axial direction D1, and the second cam member 490 may not move in the axial directions. Accordingly, as the unfolding motion is performed from the fourth state S4 to the flat state Su, the first elastic member 493 may be less compressed than in the fourth state S4. For example, referring to FIG. 12, the torque structure 402, when viewed in the unfolding directions, may provide friction torque linearly decreasing from the third friction torque Tf3 to the first friction torque Tf1 in the unfolding detent section, and this may be related to the movement of the first cam member 480.

In the flat state Su, the first protrusions 453a of the first arm cam 453 may be located on the second inclined surfaces 481d of the first cam 481 of the first cam member 480, and the fourth protrusions 454a of the second arm cam 454 may be located on the fifth protruding surfaces 491g of the third cam 491 of the second cam member 490. For example, the inclined surfaces 453c of the first protrusions 453a of the first arm cam 453 may make contact with the second inclined surfaces 481d of the first cam 481 of the first cam member 480. The fourth protruding surfaces 454b of the second arm cam 454 may make contact with the fifth protruding surfaces 491g of the third cam 491 of the second cam member 490. The first elastic member 493 may have a sixth length L6 longer than the fifth length L5. In the flat state Su, the first elastic member 493 may be less compressed than in the first state S1, the second state S2, the third state S3, and the fourth state S4.

As the first elastic member 493 presses the first cam member 480 in the first axial direction D1 and the second cam member 490 in the second axial direction D2 in the flat state Su, rotational torque may be applied to the first arm cam 453 and the second arm cam 454 in the unfolding direction. Referring to FIGS. 6A-6C, as the first extending portion 212 of the first rotary structure 210 is supported by the fixed structure 230 in the flat state, the first arm cam 453 and the second arm cam 454 can no longer rotate in the unfolding direction despite the rotational torque in the unfolding direction. However, when the electronic device 100 deviates from the free stop section and is in a state between the fourth state S4 and the flat state Su, the rotational torque in the unfolding direction may rotate the first arm shaft 241, the first arm cam 453, and the second arm cam 454 in the unfolding direction such that the electronic device 100 is unfolded to the flat state Su. For example, the unfolding detent section illustrated in FIG. 12 may be provided by the rotational torque in the unfolding direction.

In various embodiments, the lengths of the first elastic member 493 may have the relation L1=L6>L2=L3>L4=L5 depending on the states.

However, without being necessarily limited thereto, L1 and L6 may differ from each other. Furthermore, L5 may be less than L4. For example, considering that the restoring torque of the display 140 acts in the unfolding directions, the torque structure 402 may be configured such that in the free stop section, friction torque increases along the unfolding directions. In this case, at least one of the first protrusions 453a or the second protrusions 481a in contact with each other in the free stop section and at least one of the fourth protrusions 454a or the fifth protrusions 491f may be formed such that the protruding surfaces include inclined surfaces having predetermined inclination angles.

FIGS. 21A and 21B are views illustrating another example of cams of a hinge structure according to an embodiment.

Referring to FIG. 21A, a cam structure 2100 according to an embodiment may include a first cam structure 2100a coupled to the first arm shaft 241 and a second cam structure 2100b coupled to the second arm shaft 242.

Each of the first cam structure 2100a and the second cam structure 2100b may include a plurality of protrusions M1, M2, and M3 and a plurality of depressions V1, V2, and V3.

In FIG. 21A, each of the first cam structure 2100a and the second cam structure 2100b is illustrated as including three protrusions M1, M2, and M3 and three depressions V1, V2, and V3. However, the disclosure is not limited thereto. For example, each of the first cam structure 2100a and the second cam structure 2100b may have a structure including two or more protrusions and two or more depressions.

Referring to the hinge structure 200 illustrated in FIG. 5, the first cam structures 2100a may include at least one of the first arm cam 253, the first cam 281 of the cam member 280, the first moving cam 291, or the first fixed cam 271. The second cam structures 2100b may include at least one of the second arm cam 263, the second cam 282 of the cam member 280, the second moving cam 292, or the second fixed cam 272.

Referring to the hinge structure 300 illustrated in FIG. 14, the first cam structures 2100a may include at least one of the first arm cam 253, the first cam 381 of the cam member 380, the third cam 383 of the cam member 380, or the first moving cam 391. The second cam structures 2100b may include at least one of the second arm cam 263, the second cam 382 of the cam member 380, the fourth cam 384 of the cam member 380, or the second moving cam 392.

Referring to the hinge structure 400 illustrated in FIG. 18, the first cam structures 2100a may include at least one of the first arm cam 453, the first cam 481 of the first cam member 480, the third cam 491 of the second cam member 490, or the second arm cam 454. The second cam structures 2100b may include at least one of the third arm cam 463, the second cam 482 of the first cam member 480, the fourth cam 492 of the second cam member 490, or the fourth arm cam 464.

In an embodiment, the plurality of protrusions M1, M2, and M3 may all have the same structure. Alternatively, at least one of the plurality of protrusions M1, M2, and M3 may have a different form from the other protrusions. In some embodiments, the plurality of protrusions M1, M2, and M3 may include a protrusion having a third inclination angle as3 illustrated in FIG. 21B and/or a protrusion having a flat protruding surface.

In describing the illustrated embodiment, circumferential directions C1 and C2 whose centers coincide with the arm shafts 241 and 242, to which the illustrated cam structures 2100a and 2100b are coupled, are defined. The circumferential directions C1 and C2 may be perpendicular to the axial directions. For example, in the first cam structure 2100a, the first circumferential direction C1 may be the counterclockwise direction and may be the right direction in FIG. 21B. In the first cam structure 2100a, the second circumferential direction C2 may be the clockwise direction and may be the left direction in FIG. 21B. For example, in the second cam structure 2100b, the first circumferential direction C1 may be the clockwise direction and may be the right direction in FIG. 21B. In the second cam structure 2100b, the second circumferential direction C2 may be the counterclockwise direction and may be the left direction in FIG. 21B.

The following description will be focused on the first protrusion M1 among the plurality of protrusions M1, M2, and M3.

In an embodiment, the cam structure 2100 may include the first protrusion M1, the first depression V1, and the second depression V2. The first depression V1 may be formed on one side of the first protrusion M1 in a circumferential direction (e.g., the first circumferential direction C1 or the second circumferential direction C2), and the second depression V2 may be formed on an opposite side of the first protrusion M1. In an embodiment, the first protrusion M1 may include a first portion P1 including a first inclined surface 2110, a second portion P2 including a second inclined surface 2120, and a third portion P3 including a third inclined surface 2130.

In an embodiment, the first inclined surface 2110, when viewed in the first circumferential direction C1, may extend from a first recessed surface 2140 of the first depression V1 to a protruding surface of the first protrusion M1. For example, the first inclined surface 2110 may extend obliquely upward from the first recessed surface 2140 when viewed in the first circumferential direction C1 and may extend obliquely downward from the protruding surface of the first protrusion M1 when viewed in the second circumferential direction C2. In an embodiment, the first inclined surface 2110 may have a first inclination angle as1 with respect to the circumferential directions C1 and C2. In various embodiments, the first inclination angle as' may differ from a second inclination angle as2.

In an embodiment, the second inclined surface 2120, when viewed in the first circumferential direction C1, may extend from the protruding surface of the first protrusion M1 to a second recessed surface 2150 of the second depression V2. For example, the second inclined surface 2120 may extend obliquely downward from the protruding surface of the first protrusion M1 when viewed in the first circumferential direction C1 and may extend obliquely upward from the second recessed surface 2150 when viewed in the second circumferential direction C2. In an embodiment, the second inclined surface 2120 may have the second inclination angle as2 with respect to the circumferential directions C1 and C2. In various embodiments, the second inclination angle as2 may differ from the first inclination angle as1.

In an embodiment, the protruding surface of the first protrusion M1 may include the third inclined surface 2130. The third inclined surface 2130 may extend from the first inclined surface 2110 to the second inclined surface 2120 when viewed in the first circumferential direction C1. For example, the third inclined surface 2130 may extend obliquely upward from the first inclined surface 2110 when viewed in the first circumferential direction C1 and may extend obliquely downward from the second inclined surface 2120 when viewed in the second circumferential direction C2. In an embodiment, the third inclined surface 2130 may have the third inclination angle as3 with respect to the circumferential directions C1 and C2. For example, the absolute value of the third inclination angle as3 may be less than the absolute values of the first inclination angle as1 and the second inclination angle as2.

In various embodiments, the first inclination angle as1, the second inclination angle as2, and the third inclination angle as3 may include an acute angle less than 90 degrees with respect to the circumferential direction C1 and C2.

In various embodiments, the first inclined surface 2110 and the third inclined surface 2130 may be connected by a round surface having a first curvature. The second inclined surface 2120 and the third inclined surface 2130 may be connected by a round surface having a second curvature. For example, the protruding surface of the first protrusion M1 may further include rounded curved areas formed on opposite sides of the third inclined surface 2130.

Figure 22:
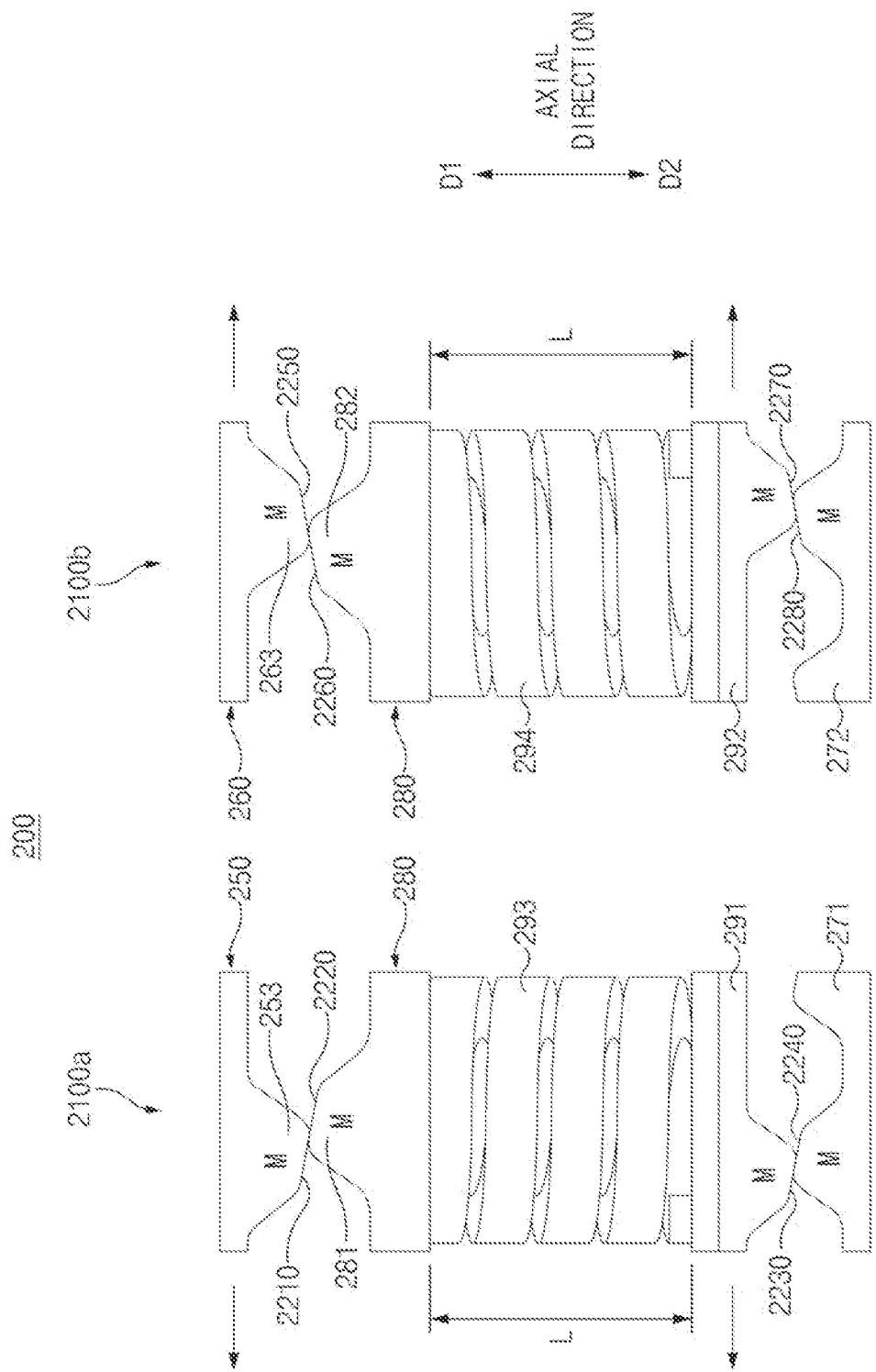
FIG. 22 is a view illustrating an example of a hinge structure in a free stop state.

FIG. 22 is a view illustrating an example of a hinge structure in a free stop state. For example, FIG. 22 is a view illustrating a hinge structure corresponding to the hinge structure 200 illustrated in FIGS. 4A to 13 and including the third inclined surface 2130 illustrated in FIGS. 21A and 21B.

The directions in which arm shafts 241 and 242 rotate when the electronic device 100 and/or the hinge structure 200 is unfolded may be defined as the unfolding directions (e.g., the directions in which the angle A in FIG. 12 increases).

For example, in an unfolding motion, a part (e.g., a first arm cam 253 and a first moving cam 291) of first cam structures 2100a may rotate together with the first arm shaft 241 (e.g., in the circumferential directions C1 and C2 of FIGS. 21A and 21B). For example, the first arm cam 253 and the first moving cam 291 may rotate leftward with respect to FIG. 22.

For example, a part (e.g., a second arm cam 263 and a second moving cam 292) of second cam structures 2100b may rotate together with the second arm shaft 242 (e.g., in the circumferential directions C1 and C2 of FIGS. 21A and 21B). For example, the second arm cam 263 and the second moving cam 292 may rotate rightward with respect to FIG. 22.

In an embodiment, the first cam structures 2100a may include the first arm cam 253, a first cam 281 of a cam member 280, the first moving cam 291, and a first fixed cam 271. For example, the first arm cam 253 may rotate together with the first arm shaft 241. For example, the first moving cam 291 may rotate together with the first arm shaft 241 and may linearly move in the axial directions along the first arm shaft 241. For example, in response to the rotation of the first arm cam 253, the first cam 281 of the cam member 280 may linearly move in the axial directions along the first arm shaft 241 and may not rotate. For example, the first fixed cam 271 may be fixed at a specified position without rotating and linearly moving. In an embodiment, a first elastic member 293 may be compressed or uncompressed in response to the linear movements of the cam member 280 and the first moving cam 291. For example, the first elastic member 293 may be compressed such that the axial length L thereof is decreased, or may be uncompressed such that the axial length L is increased.

In an embodiment, protrusions M of the first cam structures 2100a may make surface-to-surface contact with each other in the free stop section. The protrusions M of the first cam structures 2100a may include third inclined surfaces (e.g., the third inclined surface 2130 of FIGS. 21A and 21B) that are formed to make surface-to-surface contact with each other in the free stop section.

In an embodiment, the third inclined surfaces 2210, 2220, 2230, and 2240 included in the first cam structures 2100a may be obliquely formed in the direction in which the first elastic member 293 is further compressed when an unfolding motion is performed in the free stop section. For example, the first arm cam 253, the first cam 281 of the cam member 280, the first moving cam 291, and the first fixed cam 271 may include inclined surface 2210, inclined surface 2220, inclined surface 2230, and inclined surface 2240, respectively.

For example, as the first arm cam 253 and the first moving cam 291 rotate in the unfolding direction, the first cam 281 of the cam member 280 may move in the second axial direction D2, the first moving cam 291 may move in the first axial direction D1, and the first elastic member 293 may be compressed. For example, the third inclined surfaces 2210, 2220, 2230, and 2240 may be inclined in the direction in which the gap between the cam member 280 and the first moving cam 291 in the axial directions is decreased when an unfolding motion is performed in the free stop section.

For example, inclined surface 2210 of the first arm cam 253 may be inclined in the first axial direction D1 along the unfolding direction. For example, inclined surface 2220 of the first cam 281 of the cam member 280 may be inclined in the first axial direction D1 along the unfolding direction. For example, inclined surface 2230 of the first moving cam 291 may be inclined in the first axial direction D1 along the unfolding direction. For example, inclined surface 2240 of the first fixed cam 271 may be inclined in the first axial direction D1 along the unfolding direction.

In an embodiment, the second cam structures 2100b may include the second arm cam 263, a second cam 282 of the cam member 280, the second moving cam 292, and a second fixed cam 272. For example, the second arm cam 263 may rotate together with the second arm shaft 242. For example, the second moving cam 292 may rotate together with the second arm shaft 242 and may linearly move in the axial directions along the second arm shaft 242. For example, in response to the rotation of the second arm cam 263, the second cam 282 of the cam member 280 may linearly move in the axial directions along the second arm shaft 242 and may not rotate. For example, the second fixed cam 272 may be fixed at a specified position without rotating and linearly moving. In an embodiment, a second elastic member 294 may be compressed or uncompressed in response to the linear movements of the cam member 280 and the second moving cam 292. For example, the second elastic member 294 may be compressed such that the axial length L thereof is decreased, or may be uncompressed such that the axial length L is increased.

In an embodiment, protrusions M of the second cam structures 2100b may make surface-to-surface contact with each other in the free stop section. The protrusions M of the second cam structures 2100b may include third inclined surfaces (e.g., the third inclined surface 2130 of FIGS. 21A and 21B) that are formed to make surface-to-surface contact with each other in the free stop section.

In an embodiment, the third inclined surfaces 2250, 2260, 2270, and 2280 included in the second cam structures 2100b may be obliquely formed in the direction in which the second elastic member 294 is further compressed when an unfolding motion is performed in the free stop section. For example, the second arm cam 263, the second cam 282 of the cam member 280, the second moving cam 292, and the second fixed cam 272 may include inclined surface 2250, inclined surface 2260, inclined surface 2270, and inclined surface 2280, respectively.

For example, as the second arm cam 263 and the second moving cam 292 rotate in the unfolding direction, the second cam 282 of the cam member 280 may move in the second axial direction D2, the second moving cam 292 may move in the first axial direction D1, and the second elastic member 294 may be compressed. For example, the third inclined surfaces 2250, 2260, 2270, and 2280 may be inclined in the direction in which the gap between the cam member 280 and the second moving cam 292 in the axial directions is decreased when an unfolding motion is performed in the free stop section.

For example, inclined surface 2250 of the second arm cam 263 may be inclined in the first axial direction D1 along the unfolding direction. For example, inclined surface 2260 of the second cam 282 of the cam member 282 may be inclined in the first axial direction D1 along the unfolding direction. For example, inclined surface 2270 of the second moving cam 292 may be inclined in the first axial direction D1 along the unfolding direction. For example, inclined surface 2280 of the second fixed cam 272 may be inclined in the first axial direction D1 along the unfolding direction.

Figure 23:
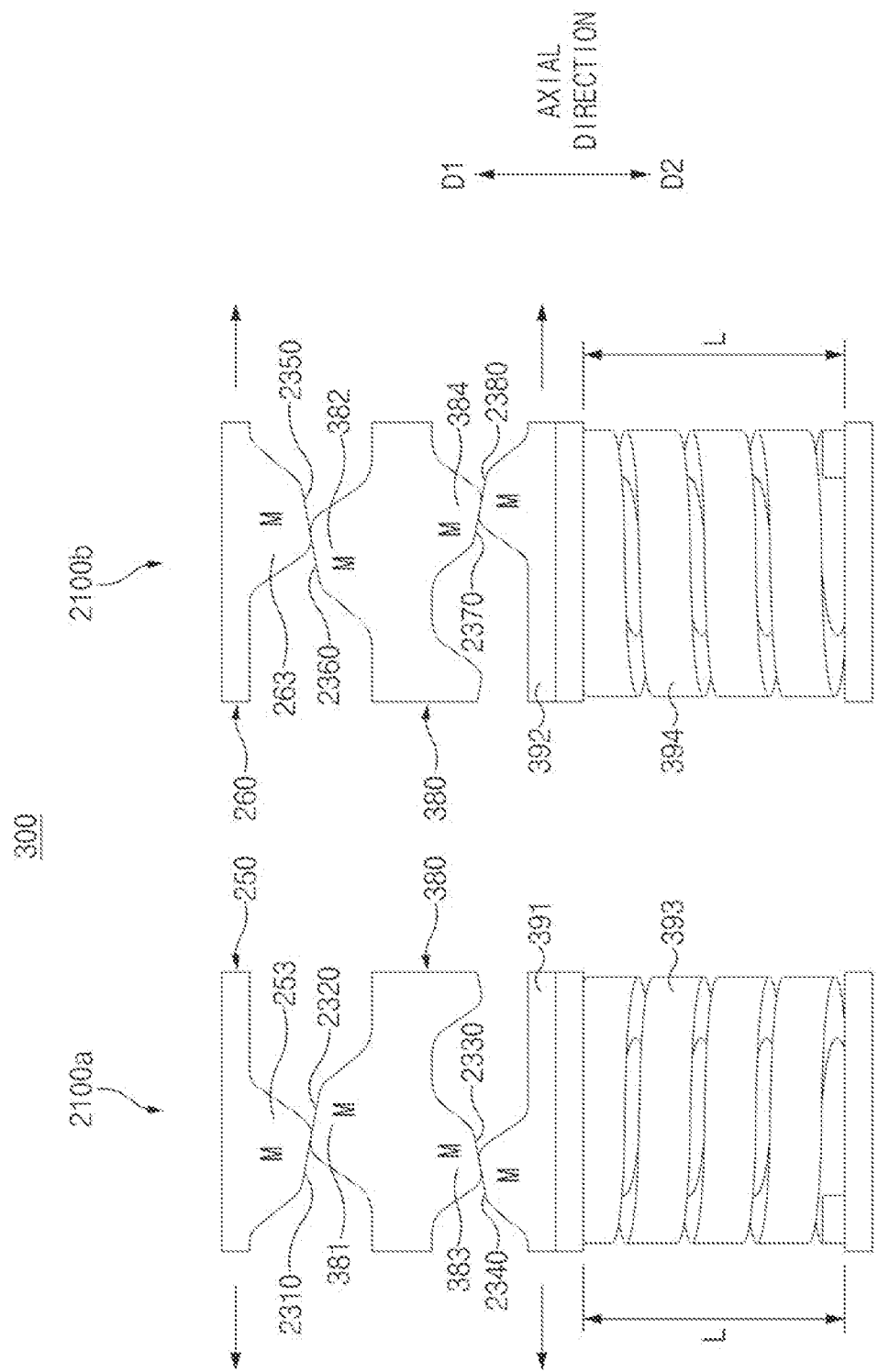
FIG. 23 is a view illustrating an example of a hinge structure in a free stop state.

FIG. 23 is a view illustrating an example of a hinge structure in a free stop state. For example, FIG. 23 is a view illustrating a hinge structure corresponding to the hinge structure 300 illustrated in FIGS. 14 to 16 and including the third inclined surface 2130 illustrated in FIGS. 21A and 21B.

The directions in which arm shafts 241 and 242 rotate when the electronic device 100 and/or the hinge structure 300 is unfolded may be defined as the unfolding directions (e.g., the directions in which the angle A in FIG. 12 increases).

For example, in an unfolding motion, a part (e.g., a first arm cam 253 and a first moving cam 391) of first cam structures 2100a may rotate together with the first arm shaft 241 (e.g., in the circumferential directions C1 and C2 of FIGS. 21A and 21B). For example, the first arm cam 253 and the first moving cam 391 may rotate leftward with respect to FIG. 23.

For example, in an unfolding motion, a part (e.g., a second arm cam 263 and a second moving cam 392) of second cam structures 2100b may rotate together with the second arm shaft 242 (e.g., in the circumferential directions C1 and C2 of FIGS. 21A and 21B). For example, the second arm cam 263 and the second moving cam 392 may rotate rightward with respect to FIG. 23.

In an embodiment, the first cam structures 2100a may include the first arm cam 253, a first cam 381 of a cam member 380, a third cam 383 of the cam member 380, and the first moving cam 391. For example, the first arm cam 253 may rotate together with the first arm shaft 241. For example, the first moving cam 391 may rotate together with the first arm shaft 241 and may linearly move in the axial directions along the first arm shaft 241. For example, the cam member 380 may linearly move in the axial directions and may not rotate. In an embodiment, a first elastic member 393 may be compressed or uncompressed in response to the linear movements of the cam member 380 and the first moving cam 391. For example, the first elastic member 393 may be compressed such that the axial length L thereof is decreased, or may be uncompressed such that the axial length L is increased.

In an embodiment, protrusions M of the first cam structures 2100a may make surface-to-surface contact with each other in the free stop section. The protrusions M of the first cam structures 2100a may include third inclined surfaces (e.g., the third inclined surface 2130 of FIGS. 21A and 21B) that are formed to make surface-to-surface contact with each other in the free stop section.

In an embodiment, the third inclined surfaces 2310, 2320, 2330, and 2340 included in the first cam structures 2100a may be obliquely formed in the directions in which the first elastic member 393 is further compressed when an unfolding motion is performed in the free stop section. For example, the first arm cam 253, the first cam 381 of the cam member 380, the third cam 383 of the cam member 380, and the first moving cam 391 may include inclined surface 2310, inclined surface 2320, inclined surface 2330, and inclined surface 2340, respectively.

For example, as the first arm cam 253 and the first moving cam 391 rotate in the unfolding direction, the cam member 380 may move in the second axial direction D2, the first moving cam 391 may move in the second axial direction D2, and the first elastic member 393 may be compressed. For example, the third inclined surfaces 2310, 2320, 2330, and 2340 may be inclined in the directions in which the gap between the first arm cam 253 and the first moving cam 391 in the axial directions is increased when an unfolding motion is performed in the free stop section.

For example, inclined surface 2310 of the first arm cam 253 may be inclined in the first axial direction D1 along the unfolding direction. For example, inclined surface 2320 of the first cam 381 of the cam member 380 may be inclined in the first axial direction D1 along the unfolding direction. For example, inclined surface 2330 of the third cam 383 of the cam member 380 may be inclined in the second axial direction D2 along the unfolding direction. For example, inclined surface 2340 of the first moving cam 391 may be inclined in the second axial direction D2 along the unfolding direction.

In an embodiment, the second cam structures 2100b may include the second arm cam 263, a second cam 382 of the cam member 380, a fourth cam 384 of the cam member 380, and the second moving cam 392. For example, the second arm cam 263 may rotate together with the second arm shaft 242. For example, the second moving cam 392 may rotate together with the second arm shaft 242 and may linearly move in the axial directions along the second arm shaft 242. For example, the cam member 380 may linearly move in the axial directions and may not rotate. In an embodiment, a second elastic member 394 may be compressed or uncompressed in response to the linear movements of the cam member 380 and the second moving cam 392. For example, the second elastic member 394 may be compressed such that the axial length L thereof is decreased, or may be uncompressed such that the axial length L is increased.

In an embodiment, protrusions M of the second cam structures 2100b may make surface-to-surface contact with each other in the free stop section. The protrusions M of the second cam structures 2100b may include third inclined surfaces (e.g., the third inclined surface 2130 of FIGS. 21A and 21B) that are formed to make surface-to-surface contact with each other in the free stop section.

In an embodiment, the third inclined surfaces 2350, 2360, 2370, and 2380 included in the second cam structures 2100b may be obliquely formed in the directions in which the second elastic member 394 is further compressed when an unfolding motion is performed in the free stop section. For example, the second arm cam 263, the second cam 382 of the cam member 380, the fourth cam 384 of the cam member 380, and the second moving cam 392 may include inclined surface 2350, inclined surface 2360, inclined surface 2370, and inclined surface 2380, respectively.

For example, as the second arm cam 263 and the second moving cam 392 rotate in the unfolding direction, the cam member 380 may move in the second axial direction D2, the second moving cam 392 may move in the second axial direction D2, and the second elastic member 394 may be compressed. For example, the third inclined surfaces 2350, 2360, 2370, and 2380 may be inclined in the directions in which the gap between the cam member 380 and the second moving cam 392 in the axial directions is increased when an unfolding motion is performed in the free stop section.

For example, inclined surface 2350 of the second arm cam 263 may be inclined in the first axial direction D1 along the unfolding direction. For example, inclined surface 2360 of the second cam 382 of the cam member 380 may be inclined in the first axial direction D1 along the unfolding direction. For example, inclined surface 2370 of the fourth cam 384 of the cam member 380 may be inclined in the second axial direction D2 along the unfolding direction. For example, inclined surface 2380 of the second moving cam 392 may be inclined in the second axial direction D2 along the unfolding direction.

Figure 24:
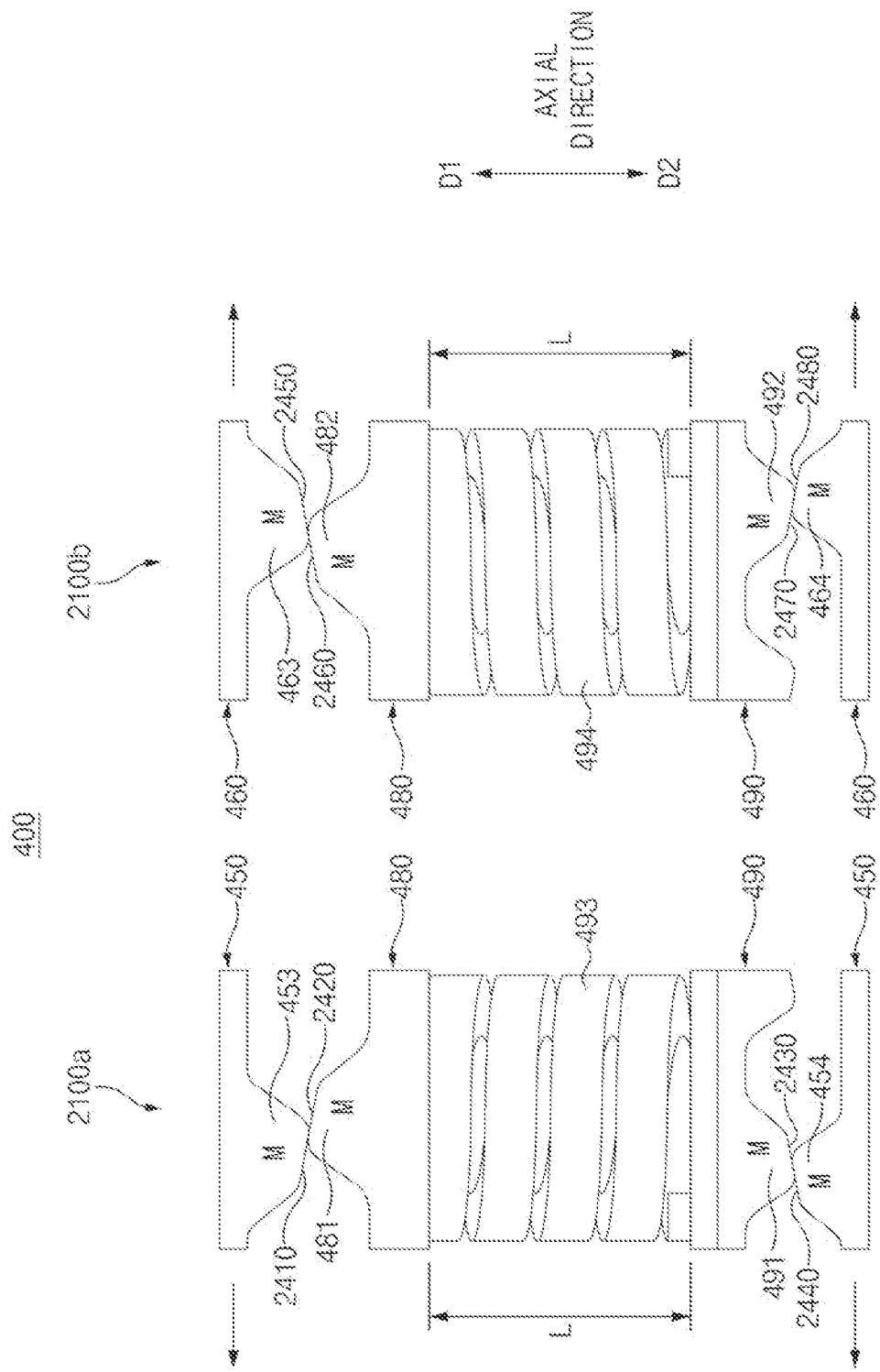
FIG. 24 is a view illustrating an example of a hinge structure in a free stop state.

FIG. 24 is a view illustrating an example of a hinge structure in a free stop state. FIG. 24 is a view illustrating a hinge structure corresponding to the hinge structure 400 illustrated in FIGS. 17 to 20 and including the third inclined surface 2130 illustrated in FIGS. 21A and 21B.

The directions in which arm shafts 241 and 242 rotate when the electronic device 100 and/or the hinge structure 400 is unfolded may be defined as the unfolding directions (e.g., the directions in which the angle A in FIG. 12 increases).

For example, in an unfolding motion, a part (e.g., a first arm cam 453 and a second arm cam 454) of first cam structures 2100*a* may rotate together with the first arm shaft 241 (e.g., in the circumferential directions C1 and C2 of FIGS. 21A and 21B). For example, the first arm cam 453 and the second cam 454 may rotate leftward with respect to FIG. 24.

For example, in an unfolding motion, a part (e.g., a third arm cam 463 and a fourth arm cam 464) of second cam structures 2100*b* may rotate together with the second arm shaft 242 (e.g., in the circumferential directions C1 and C2 of FIGS. 21A and 21B). For example, the third arm cam 463 and the fourth arm cam 464 may rotate rightward with respect to FIG. 24.

In an embodiment, the first cam structures 2100*a* may include the first arm cam 453, a first cam 481 of a first cam member 480, a third cam 491 of a second cam member 490, and the second arm cam 454. For example, the first arm cam 453 and the second arm cam 454 may rotate together with the first arm shaft 241. For example, the first cam member 480 and the second cam member 490 may linearly move in the axial directions along the first arm shaft 241. In an embodiment, a first elastic member 493 may be compressed or uncompressed as the first cam member 480 and the second cam member 490 linearly move. For example, the first elastic member 493 may be compressed such that the axial length L thereof is decreased, or may be uncompressed such that the axial length L is increased.

In an embodiment, protrusions M of the first cam structures 2100*a* may make surface-to-surface contact with each other in the free stop section. The protrusions M of the first cam structures 2100*a* may include third inclined surfaces (e.g., the third inclined surface 2130 of FIGS. 21A and 21B) that are formed to make surface-to-surface contact with each other in the free stop section.

In an embodiment, the third inclined surfaces 2410, 2420, 2430, and 2440 included in the first cam structures 2100*a* may be obliquely formed in the directions in which the first elastic member 493 is further compressed when an unfolding motion is performed in the free stop section. For example, the first arm cam 453, the first cam 481 of the first cam member 480, the third cam 491 of the second cam member 490, and the second arm cam 454 may include inclined surface 2410, inclined surface 2420, inclined surface 2430, and inclined surface 2440, respectively. For example, as the first arm cam 453 and the second arm cam 454 rotate in the unfolding direction, the first cam member 480 and the second cam member 490 may move toward each other, and the first elastic member 493 may be compressed.

For example, inclined surface 2410 of the first arm cam 453 may be inclined in the first axial direction D1 along the unfolding direction. For example, inclined surface 2420 of the first cam 481 of the first cam member 480 may be inclined in the first axial direction D1 along the unfolding direction. For example, inclined surface 2430 of the third cam 491 of the second cam member 490 may be inclined in the second axial direction D2 along the unfolding direction. For example, inclined surface 2440 of the second arm cam 454 may be inclined in the second axial direction D2 along the unfolding direction.

In an embodiment, the second cam structures 2100*b* may include the third arm cam 463, a second cam 482 of the first cam member 480, a fourth cam 492 of the second cam member 490, and the fourth arm cam 464. For example, the third arm cam 463 and the fourth arm cam 464 may rotate together with the second arm shaft 242. For example, the first cam member 480 and the second cam member 490 may linearly move in the axial directions along the second arm shaft 242. In an embodiment, a second elastic member 494 may be compressed or uncompressed as the first cam member 480 and the second cam member 490 linearly move. For example, the second elastic member 494 may be compressed such that the axial length L thereof is decreased, or may be uncompressed such that the axial length L is increased.

In an embodiment, protrusions M of the second cam structures 2100*b* may make surface-to-surface contact with each other in the free stop section. The protrusions M of the second cam structures 2100*b* may include third inclined surfaces (e.g., the third inclined surface 2130 of FIGS. 21A and 21B) that are formed to make surface-to-surface contact with each other in the free stop section.

In an embodiment, the third inclined surfaces 2450, 2460, 2470, and 2480 included in the second cam structures 2100*b* may be obliquely formed in the directions in which the second elastic member 494 is further compressed when an unfolding motion is performed in the free stop section. For example, the third arm cam 463, the second cam 482 of the first cam member 480, the fourth cam 492 of the second cam member 490, and the second arm cam 464 may include inclined surface 2450, inclined surface 2460, inclined surface 2470, and inclined surface 2480, respectively. For example, as the third arm cam 463 and the fourth arm cam 464 rotate in the unfolding direction, the first cam member 480 and the second cam member 494 may move toward each other, and the second elastic member 494 may be compressed.

For example, inclined surface 2450 of the third arm cam 463 may be inclined in the first axial direction D1 along the unfolding direction. For example, inclined surface 2460 of the second cam 482 of the first cam member 480 may be inclined in the first axial direction D1 along the unfolding direction. For example, inclined surface 2470 of the fourth cam 492 of the second cam member 490 may be inclined in the second axial direction D2 along the unfolding direction. For example, inclined surface 2480 of the fourth arm cam 464 may be inclined in the second axial direction D2 along the unfolding direction.

The inclined surfaces of the protrusions of the hinge structures 200, 300, and 400 illustrated in FIGS. 22 to 24 may be related to the restoring torque by the restoring force of the display 140.

For example, in the electronic device 100 in a folded state (e.g., FIGS. 2B and 2C), the restoring torque by the restoring force of the display 140 may be applied to the first arm shaft 241 and the second arm shaft 242. The restoring torque of the display 140 may be a force by which a curved area (e.g., the folding area 143 of FIGS. 2B and 2C) returns to a flat area. For example, the restoring torque of the display 140 may act in the unfolding directions. The restoring torque of the display 140 may be increased as the electronic device 100 approaches to a fully folded state. The restoring torque of the display 140 may be increased as the thickness or area of the display 140 is increased. For example, the electronic device 100 and/or the hinge structures 200, 300, and 400 may be unfolded without maintaining a free stop state.

In view of the aforementioned problem, the hinge structures 200, 300, and 400 according to the embodiments may include the inclined surfaces (e.g., the third inclined surface 2130 of FIGS. 21A and 21B) that are inclined in the directions in which the elastic members are compressed when an unfolding motion is performed in the free stop section. Accordingly, in the free stop section, the hinge structures 200, 300, and 400 may provide friction torque that acts in the folding directions and that is greater than the restoring torque of the display 140. For example, part of the friction torque may cancel out the restoring torque of the display 140 and may prevent an unfolding motion not intended by a user.

An electronic device 100 according to embodiments of the disclosure may include a first housing 110, a second housing 120, and a hinge structure connected to the first housing 110 and the second housing 120 such that the first housing 110 rotates about a first axis of rotation R1 parallel to an axial direction and the second housing 120 rotates about a second axis of rotation R2 parallel to the axial direction. The first housing 110 and the second housing 120 may form a predetermined angle A. The hinge structure 200 may include a first arm shaft 241 that operates in conjunction with rotation of the first housing 110 and is parallel to the axial direction, a second arm shaft 242 that operates in conjunction with rotation of the second housing 120 and is parallel to the axial direction, and a torque structure 202 that provides friction torque to each of the first arm shaft 241 and the second arm shaft 242. The torque structure 202 may include first cam structures 253, 281, 291, and 271 disposed on the first arm shaft 241, in which at least some of the first cam structures linearly move in the axial direction along the first arm shaft 241, a first elastic member 293 compressed or uncompressed by the first cam structures 253, 281, 291, and 271, second cam structures 263, 282, 292, and 272 disposed on the second arm shaft 242, in which at least some of the second cam structures linearly move in the axial direction along the second arm shaft 242, and a second elastic member 294 compressed or uncompressed by the second cam structures 263, 282, 292, and 272. The torque structure 202 may provide first friction torque Tf1 in a fully folded state Sf, may provide third friction torque Tf3 greater than the first friction torque Tf1 in a free stop section defined between the fully folded state Sf and a flat state Su, and may provide substantially constant second friction torque Tf2 independently of the angle A in a first section defined between the fully folded state Sf and the free stop section. The second friction torque Tf2 may be greater than the first friction torque Tf1 and less than the third friction torque Tf3.

In various embodiments, in a folding detent section defined between the fully folded state Sf and the first section, the torque structure 202 may provide friction torque increasing from the first friction torque Tf1 to the second friction torque Tf2 as the angle A increases.

In various embodiments, in the folding detent section, the first elastic member 293 may be compressed as the angle A increases, and in the folding detent section, the second elastic member 294 may be compressed as the angle A increases.

In various embodiments, in a second section defined between the first section and the free stop section, the torque structure 202 may provide friction torque increasing from the second friction torque Tf2 to the third friction torque Tf3 as the angle A increases.

In various embodiments, in the second section, the first elastic member 293 may be compressed as the angle increases, and in the second section, the second elastic member 294 may be compressed as the angle increases.

In various embodiments, in an unfolding detent section defined between the free stop section and the flat state Su, the torque structure 202 may provide friction torque decreasing from the third friction torque Tf3 as the angle A increases.

In various embodiments, in the unfolding detent section, the first elastic member 293 may be uncompressed as the angle A increases, and in the unfolding detent section, the second elastic member 294 may be uncompressed as the angle A increases.

In various embodiments, in the free stop section, the third friction torque Tf3 may have a constant magnitude independent of the angle A, or may increase as the angle A increases.

In various embodiments, the first cam structures 253, 281, 291, and 271 may include a first arm cam 253 that rotates together with the first arm shaft 241, a first engaged cam 281 that is engaged with the first arm cam 253 and that linearly moves along the first arm shaft 241, a first fixed cam 271 formed on a fixed member through which the first arm shaft 241 passes, and a first moving cam 291 that is engaged with the first fixed cam 271 and that rotates together with the first arm shaft 241 and linearly moves along the first arm shaft 241. The second cam structures 263, 282, 292, and 272 may include a second arm cam 263 that rotates together with the second arm shaft 242, a second engaged cam 282 that is engaged with the second arm cam 263 and that linearly moves along the second arm shaft 242, a second fixed cam 272 formed on the fixed member 270 through which the second arm shaft 242 passes, and a second moving cam 292 that is engaged with the second fixed cam 272 and that rotates together with the second arm shaft 242 and linearly moves along the second arm shaft 242. The first engaged cam 281 and the second engaged cam 282 may be formed on a cam member 280 through which the first arm shaft 241 and the second arm shaft 242 pass. The first elastic member 293 may be disposed between the first moving cam 291 and the first cam 281. The first elastic member 293 may be compressed as the first moving cam 291 moves in a first axial direction D1 and/or the first engaged cam 281 moves in a second axial D2 direction opposite to the first axial direction D1. The second elastic member 294 may be disposed between the second moving cam 292 and the second engaged cam 282. The second elastic member 293 may be compressed as the second moving cam 292 moves in the first axial direction D1 and/or the second cam 282 moves in the second axial direction D2.

In various embodiments, the torque structure 202 may be configured such that as the angle A increases in the first section, the first engaged cam 281 and the second engaged cam 282 move a first distance in the second axial direction D2 and the first moving cam 291 and the second moving cam 292 move a second distance equal to the first distance in the second axial direction D2.

In various embodiments, in the first section, lengths of the first elastic member 293 and the second elastic member 294 may remain substantially constant.

In various embodiments, the torque structure 202 may be configured such that as the angle A increases in the first section, a first protrusion 253*a* of the first arm cam 253 moves toward a second protruding surface 281*b* along an inclined surface of a second protrusion 281*a* of the first engaged cam 281, a third protrusion 291*a* of the first moving cam 291 moves into a fourth depression 271*c* along an inclined surface of a fourth protrusion 271a of the first fixed cam 271, a first protrusion 253a of the second arm cam 263 moves toward a second protruding surface 281b along an inclined surface of a second protrusion 281a of the second engaged cam 282, and a third protrusion 291a of the second moving cam 292 moves into a fourth depression 271c along an inclined surface of a fourth protrusion 271a of the second fixed cam 272.

In various embodiments, the torque structure 202 may be configured such that as the angle A increases in a folding detent section defined between the fully folded state Sf and the first section, the first engaged cam 281 and the second engaged cam 282 move in the second axial direction D2, the first moving cam 291 and the second moving cam 292 have fixed axial positions, and the first elastic member 293 and the second elastic member 294 are compressed.

In various embodiments, the torque structure 202 may be configured such that as the angle A increases in a folding detent section defined between the fully folded state Sf and the first section, a first protrusion 253a of the first arm cam 253 moves toward a second protruding surface 281b along an inclined surface of a second protrusion 281a of the first engaged cam 281, a third protrusion 291a of the first moving cam 291 moves along a flat fourth protruding surface 271b of a fourth protrusion 271a of the first fixed cam 271, a first protrusion 253a of the second arm cam 263 moves toward a second protruding surface 281b along an inclined surface of a second protrusion 281a of the second engaged cam 282, and a third protrusion 291a of the second moving cam 292 moves along a flat fourth protruding surface 271b of a fourth protrusion 271a of the second fixed cam 272.

In various embodiments, the torque structure 202 may be configured such that as the angle A increases in a second section defined between the first section and the free stop section, the first engaged cam 281 and the second engaged cam 282 have fixed axial positions, the first moving cam 291 and the second moving cam 292 move in the first axial direction D1, and the first elastic member 293 and the second elastic member 294 are compressed.

In various embodiments, the torque structure 202 may be configured such that as the angle A increases in a second section defined between the first section and the free stop section, a first protrusion 253a of the first arm cam 253 moves along a flat second protruding surface 281b of a second protrusion 281a of the first engaged cam 281, a third protrusion 291a of the first moving cam 291 moves from a fourth depression 271c of the first fixed cam 271 toward a flat fifth protruding surface 271g along a fourth inclined surface 271e, a first protrusion 253a of the second arm cam 263 moves along a flat second protruding surface 281b of a second protrusion 281a of the second engaged cam 282, and a third protrusion 291a of the second moving cam 292 moves from a fourth depression 271c of the second fixed cam 272 toward a flat fifth protruding surface 271g along a fourth inclined surface 271e.

In various embodiments, the torque structure 202 may be configured such that as the angle A increases in an unfolding detent section defined between the free stop section and the flat state Su, the first engaged cam 281 and the second engaged cam 282 move in the first axial direction D1, the first moving cam 291 and the second moving cam 292 have fixed axial positions, and the first elastic member 293 and the second elastic member 294 are uncompressed.

In various embodiments, the torque structure 202 may be configured such that as the angle A increases in an unfolding detent section defined between the free stop section and the flat state Su, a first protrusion 253a of the first arm cam 253 moves along a second inclined surface 281d of a second protrusion 281a of the first engaged cam 281, a third protrusion 291a of the first moving cam 291 moves along a flat fifth protruding surface 271g of a fifth protrusion 271f of the first fixed cam 271, a first protrusion 253a of the second arm cam 263 moves along a second inclined surface 281d of a second protrusion 281a of the second engaged cam 282, and a third protrusion 291a of the second moving cam 292 moves along a flat fifth protruding surface 271g of a fifth protrusion 271f of the second fixed cam 272.

In various embodiments, the first cam structures 253, 381, 383, and 391 may include a first arm cam 253 that rotates together with the first arm shaft 241, a first moving cam 391 that rotates together with the first arm shaft 241 and linearly moves along the first arm shaft 241, a first engaged cam 381 engaged with the first arm cam 253, and a third cam 383 engaged with the first moving cam 391. The second cam structures 263, 382, 384, and 392 may include a second arm cam 263 that rotates together with the second arm shaft 242, a second moving cam 392 that rotates together with the second arm shaft 242 and linearly moves along the second arm shaft 242, a second engaged cam 382 engaged with the second arm cam 263, and a fourth cam 384 engaged with the second moving cam 392. The first engaged cam 381 and the third cam 383 may be formed on a first portion 380a of a cam member 380 through which the first arm shaft 241 passes. The second engaged cam 382 and the fourth cam 384 may be formed on a second portion 380b of the cam member 380 through which the second arm shaft 242 passes. The first elastic member 393 may be compressed as the first moving cam 391 and/or the cam member 380 moves in a second axial direction D2. The second elastic member 394 may be compressed as the second moving cam 392 and/or the cam member 380 moves in the second axial direction D2.

In various embodiments, the torque structure 202 may be configured such that as the angle A increases in the first section, the cam member 380 moves a first distance in the second axial direction D2, the first moving cam 391 and the second moving cam 392 move a second distance equal to the first distance in a first axial direction D1, and lengths of the first elastic member 393 and the second elastic member 394 remain substantially constant.

An electronic device according to embodiments of the disclosure may include a first housing 110, a second housing 120, and a hinge structure connected to the first hinge housing 110 and the second housing 120 such that the first housing 110 rotates about a first axis of rotation R1 parallel to an axial direction and the second housing 120 rotates about a second axis of rotation R2 parallel to the axial direction. The first housing 110 and the second housing 120 may form a predetermined angle A. The hinge structure 200 may include a first arm shaft 241 that operates in conjunction with rotation of the first housing 110, a first elastic member disposed on the first arm shaft 241 to provide an elastic force in an extension direction of the first arm shaft 241, a second arm shaft 242 that operates in conjunction with rotation of the second housing 120, and a second elastic member disposed on the second arm shaft 242 to provide an elastic force in an extension direction of the second arm shaft 242. The hinge structure 200 may include a folding detent section defined from a fully folded state Sf to a first state S1 having a first angle A1, the first elastic member and the second elastic member being compressed by a first displacement ΔL1 as the angle A increases in the folding detent section, an easy unfolding section defined from the first state S1 to a third state S3 having a third angle A3 greater than the first angle A1, the first elastic member and the second elastic member being more compressed by a second displacement ΔL2 in the third state S3 than in the first state S1, and a free stop section defined from the third state S3, the first elastic member and the second elastic member being more compressed by at least the second displacement ΔL2 in the free stop section than in the first state S1. The easy unfolding section may include a first section in which the first elastic member and the second elastic member remain in a constant compressed state independently of the angle A and a second section in which the first elastic member and the second elastic member are compressed as the angle A increases.

In various embodiments, the second section may have a larger angle than the first section.

In various embodiments, the first section may be defined from the first state S1 to a second state S2 having a second angle A2 greater than the first angle A1 and less than the third angle A3, and the second section may be defined from the second state S2 to the third state S3.

In various embodiments, in the free stop section, the first elastic member and the second elastic member may remain in a constant compressed state independently of the angle A, or may be compressed as the angle A increases.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., an internal memory or an external memory) that is readable by a machine (e.g., the electronic device 100). For example, a processor (e.g., the processor) of the machine (e.g., the electronic device 100) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The torque structure according to the embodiments of the disclosure may provide a section in which friction torque does not increase, when the hinge structure is unfolded from the fully folded state to the free stop section. Thus, a user may fold or unfold the foldable electronic device by applying relatively small rotational torque. Furthermore, the torque structure may provide the free stop section capable of maintaining folded states at various angles.

In addition, the disclosure may provide various effects that are directly or indirectly recognized.

The invention claimed is:

1. An electronic device comprising:
a first housing;
a second housing; and
a hinge structure connected to the first housing and the second housing such that the first housing rotates about a first axis of rotation parallel to a first axial direction and the second housing rotates about a second axis of rotation parallel to the first axial direction,
wherein the first housing and the second housing form an angle,
wherein the hinge structure includes:
a first arm shaft configured to operate based on rotation of the first housing, the first arm shaft being parallel to the first axial direction;
a second arm shaft configured to operate based on rotation of the second housing, the second arm shaft being parallel to the first axial direction; and
a torque structure,
wherein the torque structure includes:
first cam structures disposed on the first arm shaft, wherein at least one of the first cam structures linearly moves in the first axial direction along the first arm shaft;
a first elastic member configured to be compressed or uncompressed by at least one of the first cam structures;
second cam structures disposed on the second arm shaft, wherein at least one of the second cam structures linearly moves in the first axial direction along the second arm shaft; and
a second elastic member configured to be compressed or uncompressed by at least one of the second cam structures,
wherein the torque structure is configured to:
provide a first friction torque in a fully folded state;
provide a third friction torque greater than the first friction torque in a free stop section defined between the fully folded state and a flat state; and
provide a second friction torque independently of the angle in a first section defined between the fully folded state and the free stop section, and
wherein the second friction torque is greater than the first friction torque and less than the third friction torque.

2. The electronic device of claim 1, wherein in a folding detent section defined between the fully folded state and the first section, the torque structure provides a fourth friction torque increasing from the first friction torque to the second friction torque as the angle increases.

3. The electronic device of claim 2, wherein, in the folding detent section, the first elastic member is compressed as the angle increases, and
wherein, in the folding detent section, the second elastic member is compressed as the angle increases.

4. The electronic device of claim 2, wherein, in a second section defined between the first section and the free stop section, the torque structure provides a fifth friction torque increasing from the second friction torque to the third friction torque as the angle increases.

5. The electronic device of claim 4, wherein, in the second section, the first elastic member is compressed as the angle increases, and
wherein, in the second section, the second elastic member is compressed as the angle increases.

6. The electronic device of claim 4, wherein, in an unfolding detent section defined between the free stop section and the flat state, the torque structure provides a sixth friction torque decreasing from the third friction torque as the angle increases.

7. The electronic device of claim 6, wherein, in the unfolding detent section, the first elastic member is uncompressed as the angle increases, and
wherein, in the unfolding detent section, the second elastic member is uncompressed as the angle increases.

8. The electronic device of claim 1, wherein, in the free stop section, the third friction torque has a constant magnitude independent of the angle, or the third friction torque increases as the angle increases.

9. The electronic device of claim 1, wherein the first cam structures include:
a first arm cam configured to rotate together with the first arm shaft;
a first engaged cam engaged with the first arm cam and configured to linearly move along the first arm shaft;
a first fixed cam formed on a fixed member through which the first arm shaft passes; and
a first moving cam engaged with the first fixed cam and configured to rotate together with the first arm shaft and linearly move along the first arm shaft,
wherein the second cam structures include:
a second arm cam configured to rotate together with the second arm shaft;
a second engaged cam engaged with the second arm cam and configured to linearly move along the second arm shaft;
a second fixed cam formed on the fixed member through which the second arm shaft passes; and
a second moving cam engaged with the second fixed cam and configured to rotate together with the second arm shaft and linearly move along the second arm shaft,
wherein the first engaged cam and the second engaged cam are formed on a cam member through which the first arm shaft and the second arm shaft pass,
wherein the first elastic member is disposed between the first moving cam and the first engaged cam,
wherein the first elastic member is compressed as the first moving cam moves in a second axial direction and/or the first engaged cam moves in a third axial direction opposite to the second axial direction,
wherein the second elastic member is disposed between the second moving cam and the second engaged cam, and
wherein the second elastic member is compressed as the second moving cam moves in the second axial direction and/or the second engaged cam moves in the third axial direction.

10. The electronic device of claim 9, wherein the torque structure is configured such that as the angle increases in the first section, the first engaged cam and the second engaged cam move a first distance in the third axial direction and the first moving cam and the second moving cam move a second distance equal to the first distance in the third axial direction.

11. The electronic device of claim 9, wherein, in the first section, a length of the first elastic member and a length of the second elastic member remain substantially constant.

12. The electronic device of claim 9, wherein the torque structure is configured such that as the angle increases in the first section, a first protrusion of the first arm cam moves toward a second protruding surface along an inclined surface of a second protrusion of the first engaged cam, a third protrusion of the first moving cam moves into a fourth depression along an inclined surface of a fourth protrusion of the first fixed cam, a first protrusion of the second arm cam moves toward a second protruding surface along an inclined surface of a second protrusion of the second engaged cam, and a third protrusion of the second moving cam moves into a fourth depression along an inclined surface of a fourth protrusion of the second fixed cam.

13. The electronic device of claim 9, wherein the torque structure is configured such that as the angle increases in a folding detent section defined between the fully folded state and the first section, the first engaged cam and the second engaged cam move in the third axial direction, the first moving cam and the second moving cam have fixed axial positions, and the first elastic member and the second elastic member are compressed.

14. The electronic device of claim 9, wherein the torque structure is configured such that as the angle increases in a folding detent section defined between the fully folded state and the first section, a first protrusion of the first arm cam moves toward a second protruding surface along an inclined surface of a second protrusion of the first engaged cam, a third protrusion of the first moving cam moves along a flat fourth protruding surface of a fourth protrusion of the first fixed cam, a first protrusion of the second arm cam moves toward a second protruding surface along an inclined surface of a second protrusion of the second engaged cam, and a third protrusion of the second moving cam moves along a flat fourth protruding surface of a fourth protrusion of the second fixed cam.

15. The electronic device of claim 9, wherein the torque structure is configured such that as the angle increases in a second section defined between the first section and the free stop section, the first engaged cam and the second engaged cam have fixed axial positions, the first moving cam and the second moving cam move in the second axial direction, and the first elastic member and the second elastic member are compressed.

16. The electronic device of claim 9, wherein the torque structure is configured such that as the angle increases in a second section defined between the first section and the free stop section, a first protrusion of the first arm cam moves along a flat second protruding surface of a second protrusion of the first engaged cam, a third protrusion of the first moving cam moves from a fourth depression of the first fixed cam toward a flat fifth protruding surface along a fourth inclined surface, a first protrusion of the second arm cam moves along a flat second protruding surface of a second protrusion of the second engaged cam, and a third protrusion of the second moving cam moves from a fourth depression of the second fixed cam toward the flat fifth protruding surface along the fourth inclined surface.

17. The electronic device of claim 9, wherein the torque structure is configured such that as the angle increases in an unfolding detent section defined between the free stop section and the flat state, the first engaged cam and the second engaged cam move in the second axial direction, the first moving cam and the second moving cam have fixed axial positions, and the first elastic member and the second elastic member are uncompressed.

18. The electronic device of claim 9, wherein the torque structure is configured such that as the angle increases in an unfolding detent section defined between the free stop section and the flat state, a first protrusion of the first arm cam moves along a second inclined surface of a second protrusion of the first engaged cam, a third protrusion of the first moving cam moves along a flat fifth protruding surface of a fifth protrusion of the first fixed cam, a first protrusion of the second arm cam moves along a second inclined surface of a second protrusion of the second engaged cam, and a third protrusion of the second moving cam moves along a flat fifth protruding surface of a fifth protrusion of the second fixed cam.

19. The electronic device of claim 1, wherein the first cam structures include:
   a first arm cam configured to rotate together with the first arm shaft;
   a first moving cam configured to rotate together with the first arm shaft and linearly move along the first arm shaft;
   a first engaged cam engaged with the first arm cam; and
   a third engaged cam engaged with the first moving cam,
   wherein the second cam structures include:
   a second arm cam configured to rotate together with the second arm shaft;
   a second moving cam configured to rotate together with the second arm shaft and linearly move along the second arm shaft;
   a second engaged cam engaged with the second arm cam; and
   a fourth engaged cam engaged with the second moving cam,
   wherein the first engaged cam and the third engaged cam are formed on a first portion of a cam member through which the first arm shaft passes,
   wherein the second engage cam and the fourth engaged cam are formed on a second portion of the cam member through which the second arm shaft passes,
   wherein the first elastic member is compressed as the first moving cam and/or the cam member moves in a second axial direction, and
   wherein the second elastic member is compressed as the second moving cam and/or the cam member moves in the second axial direction.

20. The electronic device of claim 19, wherein the torque structure is configured such that as the angle increases in the first section, the cam member moves a first distance in the second axial direction, the first moving cam and the second moving cam move a second distance equal to the first distance in a third axial direction, and a length of the first elastic member and a length of the second elastic member remain substantially constant.

21. An electronic device comprising:
   a first housing;
   a second housing; and
   a hinge structure connected to the first housing and the second housing such that the first housing rotates about a first axis of rotation parallel to an axial direction and the second housing rotates about a second axis of rotation parallel to the axial direction,
   wherein the first housing and the second housing form a first angle,
   wherein the hinge structure includes:
   a first arm shaft configured to operate based on rotation of the first housing;
   a first elastic member disposed on the first arm shaft configured to provide a first elastic force in a first extension direction of the first arm shaft;
   a second arm shaft configured to operate based on rotation of the second housing; and
   a second elastic member disposed on the second arm shaft configured to provide a second elastic force in a second extension direction of the second arm shaft,
   a folding detent section defined from a fully folded state to a first state having a second angle, wherein the first elastic member and the second elastic member are compressed by a first displacement as the second angle increases in the folding detent section;

an unfolding section defined from the first state to a third state having a third angle greater than the second angle, wherein, in the third state, the first elastic member and the second elastic member have a greater depression by a second displacement than in the first state; and a free stop section defined from the third state, wherein, in the free stop section, the first elastic member and the second elastic member have a greater depression by at least the second displacement than in the first state, and wherein the unfolding section includes:
 a first section in which the first elastic member and the second elastic member remain in a constant compressed state independently of the second angle; and
 a second section in which the first elastic member and the second elastic member are compressed as the second angle increases.

22. The electronic device of claim 21, wherein the second section has a greater angle than the first section.

23. The electronic device of claim 21, wherein the first section is defined from the first state to a second state having a fourth angle greater than the second angle and less than the third angle, and wherein the second section is defined from the second state to the third state.

24. The electronic device of claim 21, wherein, in the free stop section, the first elastic member and the second elastic member remain in a constant compressed state independently of the second angle, or are compressed as the second angle increases.

* * * * *